US012136075B2

(12) United States Patent
Tomkins et al.

(10) Patent No.: US 12,136,075 B2
(45) Date of Patent: Nov. 5, 2024

(54) ALLOCATION OF TRANSACTION PROCEEDS

(71) Applicant: Block, Inc., San Francisco, CA (US)

(72) Inventors: Michael Tomkins, Oakland, CA (US); Benjamin VandenBos, Bend, OR (US); Jeremy Mawson, Elanora (AU)

(73) Assignee: Block, Inc., Oakland, CA (US)

(*) Notice: Subject to any disclaimer, the term of this patent is extended or adjusted under 35 U.S.C. 154(b) by 56 days.

(21) Appl. No.: 17/500,444

(22) Filed: Oct. 13, 2021

(65) Prior Publication Data

US 2022/0318775 A1 Oct. 6, 2022

Related U.S. Application Data

(63) Continuation of application No. 17/218,866, filed on Mar. 31, 2021, now Pat. No. 11,176,531.

(51) Int. Cl.
*G06Q 20/20* (2012.01)
*G06N 20/00* (2019.01)
*G06Q 20/00* (2012.01)
*G06Q 20/22* (2012.01)
(Continued)

(52) U.S. Cl.
CPC .......... *G06Q 20/204* (2013.01); *G06N 20/00* (2019.01); *G06Q 20/223* (2013.01); *G06Q 20/3674* (2013.01); *G06Q 20/3829* (2013.01)

(58) Field of Classification Search
CPC .............. G06Q 20/204; G06Q 20/223; G06Q 20/3674; G06Q 20/2829; G06Q 20/3829; G06N 20/00
See application file for complete search history.

(56) References Cited

U.S. PATENT DOCUMENTS 9,374,370 B1 6/2016 Bent et al.
10,817,853 B1 10/2020 Michael et al.
11,176,531 B1 11/2021 Tomkins et al.
(Continued)

FOREIGN PATENT DOCUMENTS

WO 2019/139655 A1 7/2019
WO 2020/025141 A1 2/2020
(Continued)

OTHER PUBLICATIONS

"Search Strategy", Dialog, Retrieved on Jun. 17, 2021, pp. 1-3.
(Continued)

*Primary Examiner* — Paul Danneman
(74) *Attorney, Agent, or Firm* — Lee & Hayes, P.C.

(57) ABSTRACT

A payment service configured to allocate proceeds of payment authorization requests between user accounts. In examples, the payment service receives, from a user device, a user's preference regarding how to allocate proceeds received in association with payment authorization requests. The payment service receives, from a payment application executing on the user device, a payment authorization request associated with one or more transactions between the user and another user. Based on the user's preference, the payment service determines a first portion of proceeds to be allocated for deposit into a first account of a user and a second portion to be allocated for deposit into a second account of the user. The payment service then causes the portions to be deposited accordingly.

20 Claims, 16 Drawing Sheets

(51) Int. Cl.
*G06Q 20/36* (2012.01)
*G06Q 20/38* (2012.01)

(56) References Cited

U.S. PATENT DOCUMENTS

| | | | |
|---|---|---|---|
| 11,276,054 | B1 | 3/2022 | Tomkins et al. |
| 2015/0170112 | A1 | 6/2015 | DeCastro |
| 2016/0148173 | A1 | 5/2016 | Kelley et al. |
| 2019/0259025 | A1* | 8/2019 | Hilton .................. G06Q 20/405 |
| 2019/0356638 | A1 | 11/2019 | Filter et al. |
| 2020/0027084 | A1 | 1/2020 | Peter et al. |
| 2020/0042998 | A1 | 2/2020 | Mendhi et al. |
| 2020/0082365 | A1* | 3/2020 | Brock .................... G06Q 20/06 |
| 2020/0167775 | A1 | 5/2020 | Reese et al. |
| 2020/0364686 | A1 | 11/2020 | Peter et al. |
| 2022/0156723 | A1* | 5/2022 | Lovato .................. H04L 9/3236 |
| 2022/0383417 | A1 | 12/2022 | Cummings |
| 2023/0110226 | A1 | 4/2023 | Tomkins et al. |

FOREIGN PATENT DOCUMENTS

| | | |
|---|---|---|
| WO | 2020/219590 A1 | 10/2020 |
| WO | 2022/212248 A1 | 10/2022 |

OTHER PUBLICATIONS

Non-Final Office Action mailed Jun. 23, 2021, for U.S. Appl. No. 17/219,424, of Tomkins, M., et al., filed Mar. 31, 2021.
Non-Final Office Action mailed May 21, 2021, for U.S. Appl. No. 17/218,866, of Tomkins, M., et al., filed Mar. 31, 2021.
Notice of Allowance mailed Jul. 14, 2021, for U.S. Appl. No. 17/218,866, of Tomkins, M., et al., filed Mar. 31, 2021.
Notice of Allowance mailed Oct. 28, 2021, for U.S. Appl. No. 17/219,424, of Tomkins, M., et al., filed Mar. 31, 2021.
International Search Report and Written Opinion for International Application No. PCT/US2022/022131, mailed Jul. 5, 2022.

* cited by examiner

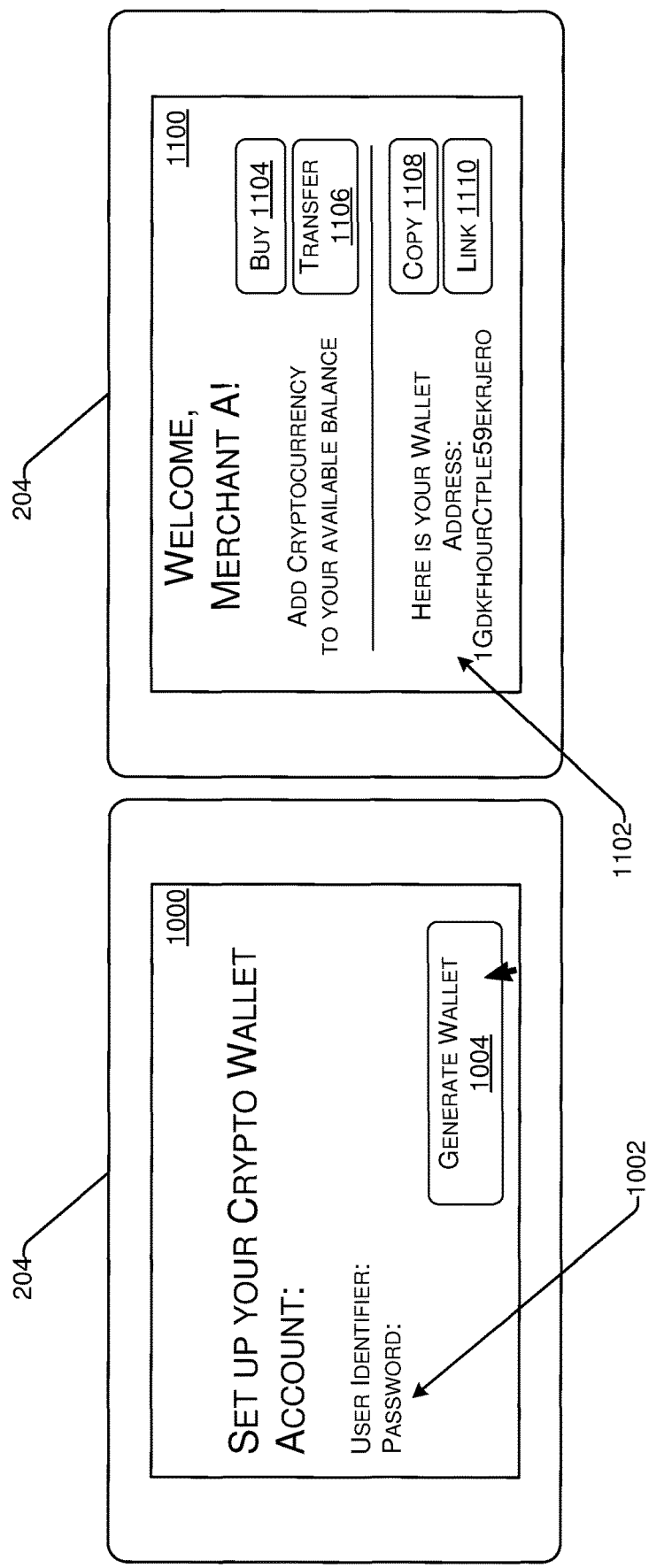

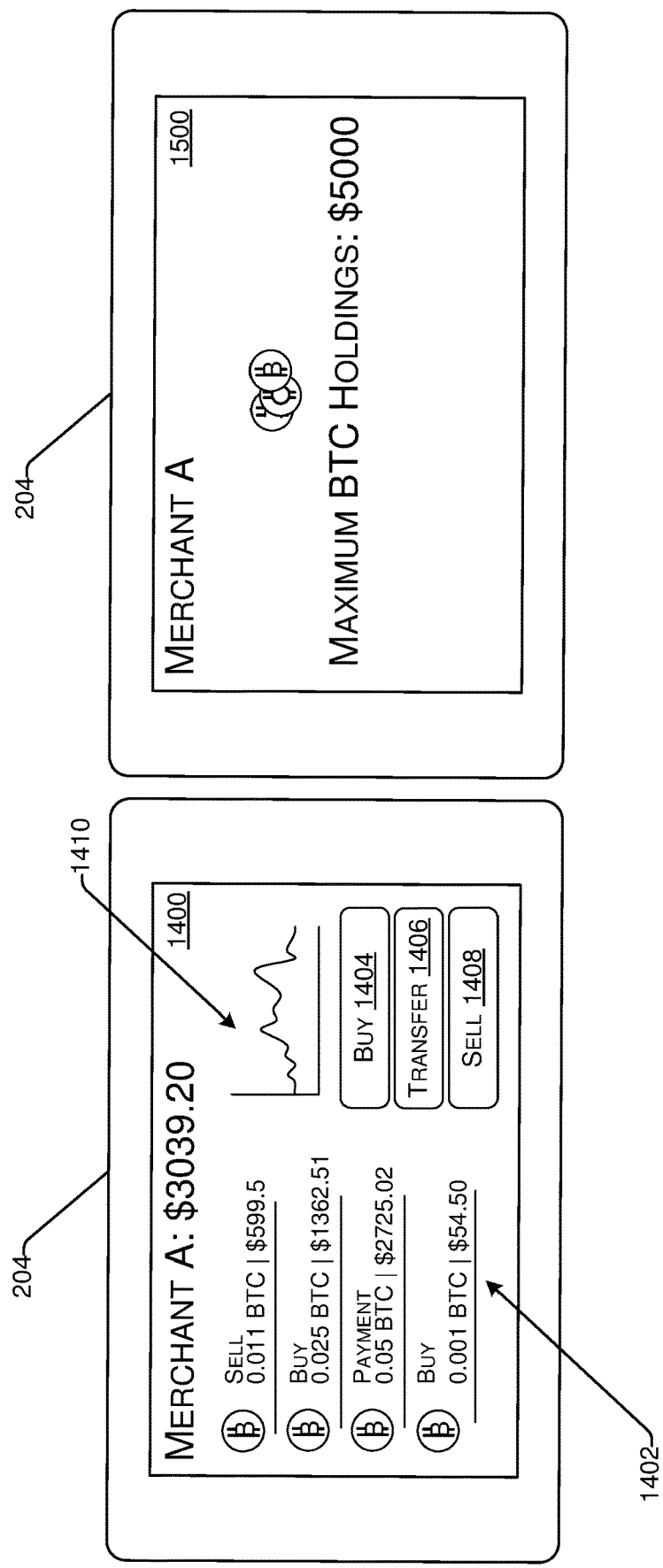

ALLOCATION OF TRANSACTION PROCEEDS

CROSS-REFERENCE TO RELATED APPLICATION(S)

This application is a continuation of and claims priority to, U.S. patent application Ser. No. 17/218,866, filed on Mar. 31, 2021, which is incorporated by reference herein in its entirety.

TECHNICAL FIELD

Cryptocurrency ("crypto") is a digital asset designed to work as a medium of exchange. In cryptocurrencies (e.g., Bitcoin, Ethereum (Ether), Litecoin, etc.), individual ownership records can be stored in a distributed ledger that exists in a form of a computerized database. Such a computerized database can use strong cryptography to secure transaction records and to verify transfers of ownership. That is, cryptocurrencies can comprise virtual and/or digital currencies that are secured by cryptography. To date, although cryptocurrencies are used by people for investments, they have not been widely used as an instrument for making everyday payments.

Cryptocurrencies and other virtual and/or digital currencies have been increasing in popularity in recent years. Cryptocurrencies are not tied to any government, are decentralized, and allow direct transactions, while still maintaining the trust and stability of fiat currencies (e.g., U.S. dollars, Euro, Rupee, etc.). Despite the popularity of cryptocurrencies to date, all cryptocurrencies face the same drawback in that they are not widely accepted. Presently, cryptocurrencies are not accepted by most retail or online merchants. The lack of mass adoption of cryptocurrencies thus far may be attributed to a number of different factors. For one, cryptocurrencies are known to be associated with long transaction times. There is research and development attempting to increase the speed of such transactions, but only with small improvements to date to such an extent that the processing time remains impractically large. For example, it is not practical for a coffee shop to sell a coffee in a transaction that could take hours before the transaction is confirmed by recording the transaction to the blockchain. A further deterrent to accepting cryptocurrencies by merchants is that cryptocurrencies are associated with anonymous identities. This feature of digital currency makes it susceptible to money laundering activities and exposes merchants to increased chances of transacting with criminals, which may put them in violation of state and federal laws. Hence, the security of transactions for merchants is currently poor.

BRIEF DESCRIPTION OF THE FIGURES

Features of the present disclosure, its nature and various advantages, will be more apparent upon consideration of the following detailed description, taken in conjunction with the accompanying drawings.

FIG. 10 illustrates an example graphical user interface for providing information to generate a cryptocurrency wallet account, as described herein.

FIG. 11 illustrates an example graphical user interface for presenting information associated with a cryptocurrency wallet, as described herein.

FIG. 14 illustrates an example graphical user interface for presenting activity information associated with a cryptocurrency wallet account of a user, as described herein.

FIG. 15 illustrates an example graphical user interface for setting parameters associated with a cryptocurrency wallet account of a user, as described herein.

DETAILED DESCRIPTION

Figure 1:
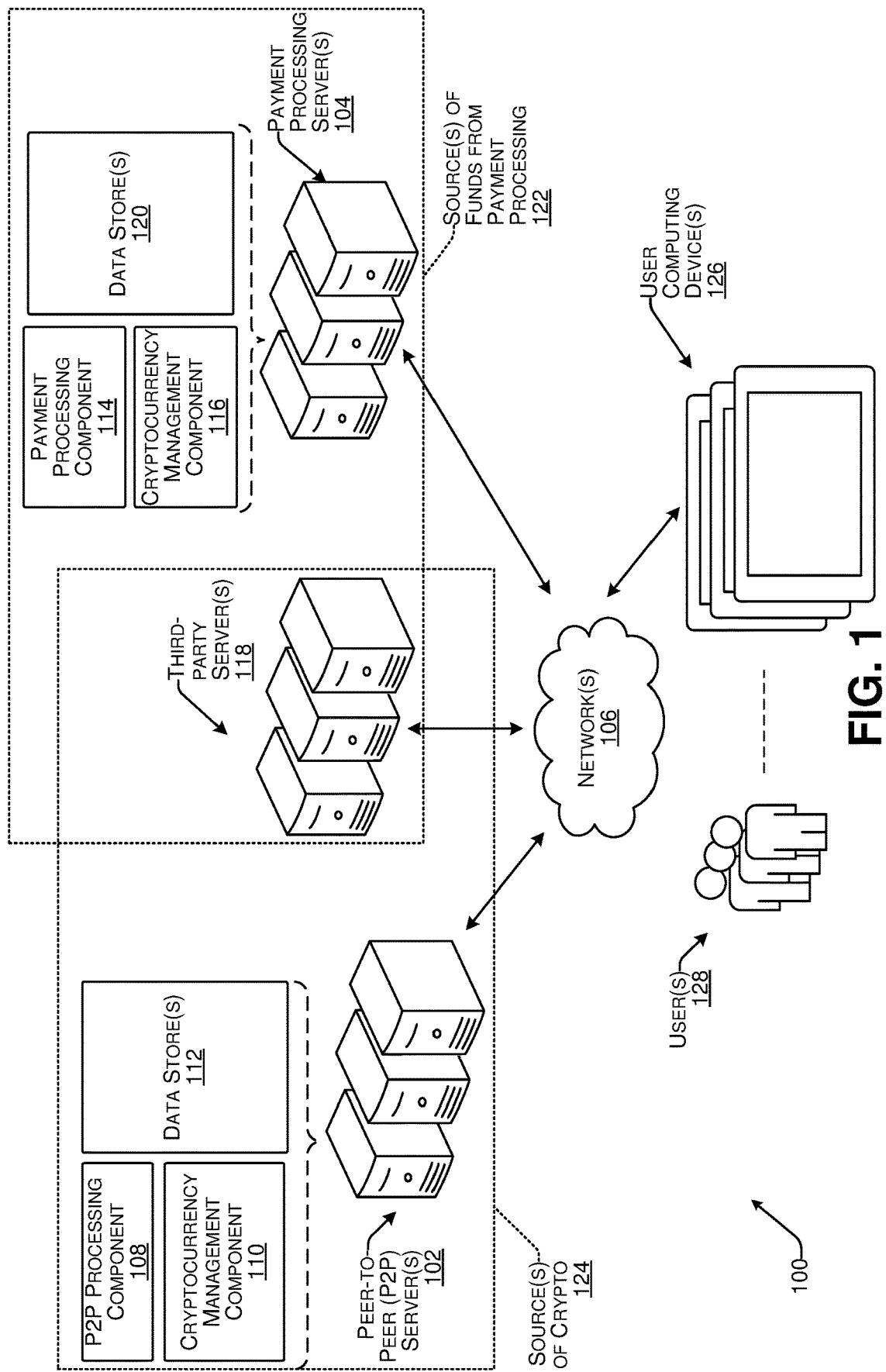
FIG. 1 illustrates an example environment, including a peer-to-peer (P2P) payment platform and a payment processing platform, within which techniques described herein can be implemented.

Integration of a payment processing platform with a payment making platform (e.g., a peer-to-peer (P2P) payment platform) to facilitate differentiated payment allocations using cryptocurrency is described. In an example, a payment processing platform can transact in one or more currencies, including fiat currencies (e.g., U.S. dollars, Euros, Rupees, etc.) and non-fiat currencies. Non-fiat currencies can include virtual and/or digital currencies such as, but not limited to, cryptocurrencies (e.g., Bitcoin, Ethereum (Ether), Litecoin, etc.), commercial paper (e.g., loans, contracts, forms, etc.), securities (e.g., stocks, bonds, derivatives, etc.), and/or the like. In at least one example, the payment processing platform can facilitate real-time (or substantially real-time) transactions between users, which can include customers and merchants. In at least one example, a customer can pay for a transaction with one or more currencies of their choice. In at least one example, the merchant can accept payment via the one or more currencies but may have a preference with respect to how funds associated with such payments are paid to the merchant. For instance, the merchant can receive payment in fiat currency but can request, through techniques described herein, that the funds associated with such a payment are allocated between a merchant account associated with fiat currency and a merchant account associated with cryptocurrency (e.g., a cryptocurrency wallet account of the merchant). That is, techniques described herein enable merchants to receive funds associated with payments in one or more currencies and, based at least in part on the integration between the P2P payment platform and the payment processing platform, can cause at least some funds to be allocated to a cryptocurrency wallet of the merchant.

In at least one example, a payment making platform, such as a P2P payment platform, can enable users to transfer funds to one another using a mobile payment application. In at least one example, the P2P payment platform can enable users to perform such transfers in one or more currencies, including fiat currencies and non-fiat currencies, as described above. In at least one example, the P2P payment platform can store a private blockchain or be configured to interact with one or more cryptocurrency networks associated with one or more public blockchains. As such, the P2P payment platform can be associated with one or more cryptocurrency wallets (or "cryptocurrency wallet accounts"), which can be associated with the P2P payment platform and/or one or more users. That is, in at least one example, the P2P payment platform can store funds associated with cryptocurrency wallet account(s) that can be accessible to and/or useable by one or more users associated with the P2P payment platform.

In some examples, when a merchant opts to receive funds associated with transaction(s) processed using the payment processing platform as cryptocurrency, the payment processing platform can exchange communications with the P2P payment platform to deposit, or otherwise associate, at least a portion of the funds into a cryptocurrency wallet of the merchant. In at least one example, to facilitate such a deposit or other association, the payment processing platform and the P2P payment platform can utilize one or more application programming interfaces (API(s)) and/or software development kits (SDK(s)). In at least one example, the payment processing platform can obtain, from the P2P platform, account information associated with a cryptocurrency wallet account of the merchant. Upon receiving the account information, the payment processing platform can associate the account information with a merchant account of the merchant. Thus, the cryptocurrency wallet account can be associated with the merchant account. As the merchant engages in one or more transactions with one or more customers, at least a portion of funds generated from such transaction(s) can be deposited into, or otherwise associated with, the cryptocurrency wallet account of the merchant. The funds can be received in fiat currency. In some examples, the payment processing platform can convert the portion of the funds to be deposited as cryptocurrency from fiat currency into cryptocurrency. In some examples, the P2P payment platform can convert the portion of the funds to be deposited as cryptocurrency from fiat currency into cryptocurrency. In some examples, the cryptocurrency assets can be held by the merchant (i.e., in the cryptocurrency wallet account). In some examples, the cryptocurrency assets can be held by the P2P payment platform (e.g., in its own cryptocurrency wallet account) and can be assigned to the merchant via one or more ledgers maintained by the P2P payment platform or a third-party payment platform.

In some examples, techniques described herein can convert a portion of each transaction into cryptocurrency and deposit the portion into the cryptocurrency wallet account of the merchant in near-real time, or on a per-transaction basis. In some examples, techniques described herein can withhold a portion of a transaction for conversion into cryptocurrency and can convert the portion of the transaction into cryptocurrency at a time after the transaction occurs. In some examples, the period of time between the transaction and the conversion can depend on conversion rates and/or trends, event(s), rule(s), and/or the like. In some examples, techniques described herein can withhold a portion of funds from a batch of transactions (e.g., multiple transactions) and can convert the portion of funds from the batch of transactions into cryptocurrency at a same time. That is, in such an example, such conversion and deposit can be performed on a per-batch basis. In at least one example, the batch of transactions can be grouped based on period of time, date, event, rule(s), conversion rates and/or trends, and/or the like.

As described above, while cryptocurrencies and other virtual and/or digital currencies have been increasing in popularity in recent years, cryptocurrencies are still not widely accepted. Presently, cryptocurrencies are not accepted by most retail merchants, or even by most online merchants, likely due to a number of different factors. For one, cryptocurrencies are known to be associated with long transaction times. There is research and development attempting to increase the speed of such transactions, but only with small improvements to date to such an extent that the processing time remains impractically large. As described above, it is not practical for a coffee shop to sell a coffee in a transaction that could take hours before the transaction is confirmed by recording the transaction to the blockchain. Techniques described herein leverage the integration of the P2P payment platform and the payment processing platform to facilitate transactions using cryptocurrency without the long processing times. In some examples, as described below, the P2P payment platform and/or the payment processing platform can utilize a set of ledgers to allocate cryptocurrency funds within the platforms separate from when cryptocurrency is actually bought and/or sold via one or more public blockchains associated with one or more cryptocurrency networks. Such ledger(s) and/or use of a private blockchain, as described below, can enable the improved efficiency and thus improvement over existing techniques.

A further deterrent to accepting cryptocurrencies by merchants is that cryptocurrencies are associated with anonymous identities. This feature of digital and/or virtual currency makes it susceptible to money laundering activities and exposes merchants to increased chances of transacting with criminals, which may put them in violation of state and federal laws. Hence, the security of transactions for merchants is currently poor. Techniques described herein enable merchants to transact with fiat currency or other currency that is less risky for such merchants, and still enables merchants to accumulate cryptocurrency.

Additionally, cryptocurrency exchange rates with fiat currencies can fluctuate widely, and immediate conversion may be undesirable at certain times. Techniques described herein enable merchants to transact using cryptocurrency and delay a cryptocurrency conversion process in the event of fluctuating cryptocurrency exchange rates. By utilizing a cryptocurrency wallet account of the P2P payment platform and/or one or more ledgers maintained by the P2P payment platform, cryptocurrency transactions can be batched and/or otherwise handled asynchronously with respect to when transactions occur at the point of sale. As such, one example of the present invention enables merchants to disassociate transactions from cryptocurrency conversion events such that merchants can intentionally postpone conversion from fiat currency to cryptocurrency to a later time when cryptocurrency exchange rate(s) may be potentially more favorable for the merchants.

Furthermore, techniques described herein relate to integrations of a payment processing platform and a P2P payment platform, two platforms that conventionally operate independently. In existing techniques, P2P payment platforms are functionally configured to facilitate P2P transactions. Such platforms are not configured—nor do they have a need—for integration with a payment processing platform. Further, in existing techniques, payment processing platforms are functionally configured to aggregate payments and communicate with card payment network(s), acquirer(s), issuer(s), and/or financial institution(s) to process payments for merchants. Such platforms are not configured—nor do they have a need—for integration with a P2P payment platform. As such, techniques described herein—which leverage APIs and/or SDKs—integrate the P2P payment platform with the payment processing platform to overcome challenges with respect to the use of cryptocurrency for retail and/or online transactions.

Further, techniques described herein utilize the conversion of fiat currency to cryptocurrency such that portions of funds generated from transactions (e.g., in fiat currency) can be allocated into cryptocurrency wallet accounts of merchants. In some examples, converting fiat currency to cryptocurrency on a per transaction basis can be computationally expensive and, in some examples, cost prohibitive. For example, the computational power required to generate small blocks for recordation on blockchains is not insignificant. However, by batching transactions together and converting from fiat currency to cryptocurrency in such batches, techniques described herein can enable a significant savings in computational power and improved network efficiency. That is, by aggregating transactions and data associated therewith for generating blocks to be recorded on blockchains, techniques described herein can provide an improvement to existing technology wherein an individual merchant receives funds in fiat currency and is required to undertake the process of converting and purchasing cryptocurrency individually. As such, by batching transactions and using funds associated with such transactions to purchase cryptocurrency, fewer transactions are required to be added to the blockchain. Thus, techniques described herein conserve computing resources and improve network efficiency and thus, offer improvements to existing blockchain technology.

Throughout this description, reference may be made toward specific currencies such as Bitcoin (BTC) or United States (U.S.) dollar. Such references should be understood to be merely examples of currencies. For example, references to Bitcoin can be understood to be interchangeable for any cryptocurrency. References to U.S. dollar can be understood to be interchangeable for any fiat currency managed by a central authority, such a country (e.g., United States, China, etc.), or regional body (e.g., European Union), etc.

FIG. 1 illustrates an example environment 100 within which techniques described herein can be implemented. The example environment can include server computing device(s) associated with a P2P payment platform ("P2P server(s) 102") that can communicate with server computing device(s) associated with a payment processing platform ("payment processing server(s) 104") via network(s) 106.

In at least one example, the P2P payment platform can be a platform (e.g., computing devices and/or components associated therewith) that enables users to transfer funds to one another using their own funds through an online or mobile application. While techniques described are described in the context of P2P payments, techniques described herein can be performed by any payment making platform (PMP) or payment making service (PMS). Additional details associated with the P2P payment platform are described below.

In at least one example, the payment processing platform (PPP), which can also be referred to as a payment processing service (PPS), can be a platform (e.g., computing devices and/or components associated therewith) that can process payments for transactions between customers and merchants associated with the payment processing platform. Such merchants can offer items (e.g., goods, services, etc.) for sale, or other means of acquisition, via brick-and-mortar stores, online stores, combinations of the forgoing, or the like. In some examples, the payment processing platform can be an intermediary payment processing platform (or an aggregator) such that the payment processing platform can receive requests to process payments for transactions from different merchants and can interact with payment services (e.g., acquirer(s), issuer(s), card payment network(s), P2P platforms(s), cryptocurrency source(s), etc.) to process the payments.

In some examples, the P2P payment platform and the payment processing platform can be associated with a payment service associated with a same service provider (e.g., first-party integration). In some examples, the P2P payment platform can be associated with a different service provider and/or platform than the payment processing platform (i.e., third-party integration). Such third-party integration can be accomplished via one or more APIs and/or SDKs. Techniques described herein are directed to integrating the P2P payment platform with the payment processing platform to facilitate differentiated payments (to merchants) using cryptocurrency.

In at least one example, the P2P server(s) 102 can include a P2P processing component 108 and a cryptocurrency management component 110. In at least one example, the P2P processing component 108 and/or the cryptocurrency management component 110 can be functional components that are executable by processor(s) associated with the P2P server(s) 102. In some implementations, functional components can comprise instructions or programs that are executable by the processor(s) and that, when executed, implement operational logic for performing the actions and services attributed above to the P2P server(s) 102 and/or P2P payment platform.

In at least one example, the P2P processing component 108 can receive requests to transfer funds between users, which can be called "peers," of the P2P payment platform. In at least one example, a request can include a first user identifier, associated with a payee (i.e., user requesting funds from another user), and a second user identifier, associated with payor (i.e., user from whom funds are being requested by another user). In such an example, the P2P processing component 108 can cause a request for funds to be presented on a computing device of the payor and, based at least in part on receiving an authorization to transfer the requested funds, the P2P processing component 108 can transfer funds from a first account of the payor to a second account of the payee. That is, in at least one example, a first user (e.g., payee) can request a payment from a second user (e.g., payor) and the P2P processing component 108 can fulfill such a request.

In an additional or alternative example, a request can include a first user identifier, associated with a payor (i.e., user sending funds to another user) and a second user identifier, associated with a payee (i.e., user receiving funds from another user). In such an example, the P2P processing component 108 can cause a request to accept funds to be presented on a computing device of the payee and, based at least in part on receiving an authorization to transfer the requested funds, the P2P processing component 108 can transfer funds from a first account of the payor to a second account of the payee. That is, in at least one example, a first user (e.g., payor) can send a payment to a second user (e.g., payee) and the P2P processing component 108 can fulfill such a request.

In at least one example, funds exchanged by the users can be fiat currency or non-fiat currency (e.g., cryptocurrency or the like). In at least one example, funds received from other users can be associated with an account of a user, in one or more stored balances or "wallet accounts" that can be managed and/or maintained by the P2P payment platform. In at least one example, each stored balance can be associated with a type of currency (e.g., cryptocurrency, fiat currency, securities, etc.). In some examples, each stored balance can be associated with a ledger (e.g., a cryptocurrency ledger, a fiat currency ledger, a securities ledger, etc.). Additional details are provided below with respect to how credits and debits are managed by the P2P payment platform. Generally, however, funds received from other users can be added (e.g., credited) to one or more stored balances. In at least one example, funds sent to other users can be removed (e.g., debited) from one or more stored balances. Ledger(s), as described herein, can be used to determine balance(s) associated with such stored balance(s). In some examples, funds associated with the stored balance(s) can be accessed via a linked debit card, a P2P payment, a payment transaction, a deposit into a linked bank account of the user, a purchase of cryptocurrency, a purchase of a security, and/or the like.

In some examples, the P2P processing component 108 can track individual transactions between users and can enable users to view their transaction history via an instance of a user interface associated with the P2P payment platform. In some examples, the P2P processing component 108 can access stored loyalty data, incentive data, and/or the like for use with the P2P payment platform, as described herein.

In at least one example, the cryptocurrency management component 110 can receive, from the payment processing server(s) 104, a request for account information associated with a cryptocurrency wallet account of a user. In at least one example, the request can include an identifier associated with the user (e.g., an alphanumeric identifier or the like). The user can be a merchant such that the user offers item(s) for purchase or other acquisition and uses the payment processing platform for processing payments for transaction (s) associated with such item(s). In at least one example, the cryptocurrency management component 110 can determine whether the identifier is associated with a cryptocurrency wallet account (e.g., in the data store(s) 112 associated therewith).

Based on a determination that the identifier is not associated with a cryptocurrency wallet account (e.g., the user has not opted into using cryptocurrency on the P2P payment platform and/or the cryptocurrency wallet account has not been generated), the cryptocurrency management component 110 can initiate a process to generate a new cryptocurrency wallet account and can send account information associated therewith to the payment processing server(s) 104. In some examples, the cryptocurrency management component 110 can send a request for information to a mobile payment application associated with the P2P payment platform and/or a POS application associated with the payment processing platform. In at least one example, the mobile payment application and/or the POS application can present a user interface to prompt the merchant to input information for generating the cryptocurrency wallet account. In some examples, the user interface can present virtual and/or digital currency terms and conditions, request information for identity verification, and/or the like. In response to receiving the requested information, the cryptocurrency management component 110 can generate a cryptocurrency wallet account for the merchant and can send the account information associated therewith to the payment processing server(s) 104.

Based on a determination that the identifier is associated with a cryptocurrency wallet account, the cryptocurrency management component 110 can send account information associated therewith to the payment processing server(s) 104.

In at least one example, the cryptocurrency management component 110 can receive, from the payment processing server(s) 104, an instruction to deposit funds associated with one or more transactions into the cryptocurrency wallet account. In some examples, the funds can be cryptocurrency funds. In some examples, the funds can be in another currency, such as fiat currency, such that the cryptocurrency management component 110 can convert the funds into cryptocurrency for depositing in a cryptocurrency wallet account of the merchant. In at least one example, such a conversion can determine, using an exchange rate, a number of cryptocurrency units equivalent to the amount of fiat currency and such units can be used to purchase cryptocurrency for or allocate cryptocurrency to the merchant. Additional details are described below.

In at least one example, the P2P server(s) 102 can include data store(s) 112, which can store, manage, and/or update data. In at least one example, the data store(s) 112 can comprise at least an asset storage, user account(s), and/or the like. In at least one example, the user account(s) can be associated with user account data and one or more ledgers associated with one or more stored balances, as described above. In at least one example, the data store(s) 112 can be associated with one or more cryptocurrency wallet account(s). Additional details are provided below.

In at least one example, the payment processing server(s) 104 can include a payment processing component 114 and a cryptocurrency management component 116. In at least one example, the payment processing component 114 and the cryptocurrency management component 116 can be functional components that are executable by processor(s) associated with the payment processing server(s) 104. In some implementations, functional components can comprise instructions or programs that are executable by the processor(s) and that, when executed, implement operational logic for performing the actions and services attributed above to the payment processing server(s) 104 and/or the payment processing platform.

In at least one example, the payment processing component 114 can process payments for transactions on behalf of merchants associated with the payment processing platform. In at least one example, the payment processing component 114 can receive transaction data associated with a transaction between a merchant and a customer. In some examples, the payment processing component 114 can receive payment data associated with a payment instrument and can process payment for the transaction based at least in part on the transaction data and the payment data. In some examples, the payment data can be associated with a debit card or credit card and the payment processing component 114 can exchange data with associated acquirer(s), issuer(s), and/or card payment network(s) to process payment for the transaction. In some examples, the payment processing component 114 can send payment authorization request(s) to the acquirer(s), issuer(s), and/or card payment network(s) to determine whether the payment instrument is authorized for the transaction.

In at least one example, when a customer and a merchant enter into an electronic payment transaction, the transaction is processed by electronically transferring funds from a financial account associated with the customer to a financial account associated with the merchant. As such, the payment processing component 114 may communicate with one or more computing devices of a card payment network over network(s) 106 to conduct financial transactions electronically. In some examples, the payment processing component 114 can also communicate with one or more computing devices of one or more banks, processing/acquiring services, or the like over the network(s) 106. For example, the payment processing component 114 can communicate with an acquirer, an issuer, financial institution and/or other service provider maintaining customer accounts for electronic payments.

An acquiring bank, or "acquirer," may be a registered member of a card association (e.g., Visa®, MasterCard®), and may be part of a card payment network. When a customer uses a credit card, an issuing bank, or "issuer," may issue a payment card to customers and may pay acquiring banks for purchases made by cardholders to which the issuing bank has issued such a card. Accordingly, in some examples, the computing device(s) of an acquiring bank may be included in the card payment network and may communicate with the computing devices of the issuing bank to obtain payment. When a customer uses a debit card instead of a credit card, computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes. In at least one example, acquirer(s), issuer(s), card payment network(s), other financial institutions and/or service providers can be associated with the third-party server(s) 118.

In some examples, payment data associated with a payment instrument provided for payment of item(s) associated with a transaction, can be associated with a stored balance managed and/or maintained by the P2P payment platform. In such an example, the payment processing component 114 can exchange data with the P2P payment platform to process payment for the transaction. For instance, in some examples, the payment data can be associated with a cryptocurrency wallet account managed by the P2P payment platform. In such an example, the payment processing component 114 can exchange data with the P2P payment platform to process payment for the transaction using cryptocurrency wallet funds. In some examples, the payment data can be associated with a stored balance associated with fiat currency (e.g., a fiat currency wallet account). In such an example, the payment processing component 114 can exchange data with the P2P payment platform to process payment for the transaction using fiat currency wallet funds.

In at least one example, funds received as payment for the transaction, or a portion thereof (e.g., less processing fees or the like), can be associated with an account of the merchant (e.g., a "merchant account") which can be associated with one or more stored balances that can be managed and/or maintained by the payment processing platform. In at least one example, each stored balance can be associated with a type of funds (e.g., cryptocurrency, fiat currency, securities, etc.) and, in some examples, a ledger (e.g., a cryptocurrency ledger, a fiat currency ledger, a securities ledger, etc.). Additional details are provided below with respect to how credits and debits are managed by the payment processing platform. Generally, however, funds received from a payment service, a P2P payment platform, and/or a third-party source can be added (e.g., credited) to a stored balance. In at least one example, funds withdrawn (e.g., via a deposit into a linked bank account of the merchant, via a purchase using a linked debit card, or the like) can be removed (e.g., debited) from a stored balance. Ledger(s), as described herein, can be used to determine balance(s) associated with such stored balance(s). In some examples, funds associated with the stored balance can be accessed via a linked debit card, a deposit into a linked bank account of the merchant, or the like.

In some examples, a merchant can opt to have funds received from transaction(s) processed by the payment processing platform to be distributed into one or more accounts of the merchant. In some examples, the merchant can opt to have a portion of funds associated with transaction(s) deposited into a cryptocurrency account and a portion of funds associated with transaction(s) deposited as fiat currency into an account of a merchant. In some examples, portions can be deposited into additional or alternative accounts of the merchant.

In at least one example, if the merchant has opted to have a portion of funds associated with a transaction deposited as cryptocurrency into a cryptocurrency wallet account, the payment processing component 114 can obtain, from the P2P server(s) 102, account information associated with a cryptocurrency wallet account of the merchant. The payment processing component 114 can determine an amount of funds associated with one or more transactions of the merchant to be deposited in the cryptocurrency wallet account of the merchant. The payment processing component 114 can send an instruction to deposit such funds into the cryptocurrency wallet account of the merchant. In some examples, the cryptocurrency management component 116 can convert funds from a received currency into cryptocurrency. In such examples, the cryptocurrency management component 116 can convert the funds into cryptocurrency units based at least in part on an exchange rate. In some examples, the cryptocurrency management component 116 can perform such a conversion on a per transaction basis or per group (of transactions) basis. In some examples, the payment processing component 114 can request the P2P payment platform perform such a conversion. In some examples, such an instruction can be sent on a per transaction basis. In some examples, such an instruction can be sent in association with funds from multiple transactions (e.g., batched). Additional details are provided below.

Additional functionality associated with the payment processing component 114 and/or cryptocurrency management component 116 is described below.

In at least one example, the payment processing server(s) 104 can include data store(s) 120, which can store, manage, and/or update data. In at least one example, the data store(s) 120 can comprise an asset storage, user accounts, and/or the like. In at least one example, the user account(s) can be associated with user account data and one or more ledgers associated with one or more stored balances, as described above. In some examples, the data store(s) 120 can be associated with one or more cryptocurrency wallet accounts. Additional details are provided below.

In at least one example, the P2P server(s) 102 and/or the payment processing server(s) 104 can exchange data with one or more third-party servers 120. In some examples, the third-party server(s) 118 can be associated with card payment network(s), acquirer(s), issuer(s), and/or other financial institutions or service providers. In some examples, the third-party server(s) 118 can be associated with a cryptocurrency network, as described below.

As illustrated in FIG. 1, the environment 100 can include one or more sources of funds from payment processing, which are represented by the dashed line 122. Such funds can be received and/or accessed by the payment processing component 114 for deposit or other association with merchant account(s) for payments processed by the payment processing platform on behalf of associated merchant(s). That is, in some examples, the payment processing platform can provide funds from its own accounts and/or a third-party service provider (e.g., a bank or other financial institution) can provide funds from its own accounts. Such funds can be received and/or accessed for deposit or other association with user account(s) as described herein. Additional details are provided below. Further, the environment 100 can include one or more sources of cryptocurrency, which are represented by the dashed line 124. In some examples, cryptocurrency can be purchased (or sold) and recorded in a public blockchain associated with a third-party service provider (e.g., Bitcoin, Ether, Litecoin, etc.). In some examples, cryptocurrency can be purchased (or sold) and recorded in a private blockchain associated with the P2P payment platform. Such cryptocurrency can be received and/or accessed for deposit or other association with user account(s) as described herein.

In at least one example, the environment 100 can include one or more user computing devices 126. In some examples, the user computing device(s) 126 can be operable by one or more users 128. As described below, the user computing device(s) 126 can present user interface(s) to enable the user(s) 128 to interact with the P2P payment platform and/or the payment processing platform. Such user interface(s) can be presented by application(s), web browser(s), and/or the like. Additional details are provided below. While three user(s) 128 and three user computing device(s) 126 are illustrated in FIG. 1, the environment 100 can have any number of user(s) 128 and/or user computing device(s) 126. In some examples, the user(s) 128 can be payees and/or payors in a P2P payment, merchants, customers, and/or the like. Additional details are provided below.

In at least one example, techniques described herein can be facilitated via one or more APIs and/or SDKs. That is, in at least one example, the "integration" between the P2P payment platform and the payment processing platform can be facilitated, in part, by one or more APIs and/or SDKs. In at least one example, an API and/or SDK can enable communications between the P2P payment platform and the payment processing platform. Such integration provides improvements over existing techniques wherein P2P payment platforms and payment processing platforms do not exchange data as described herein. Additional details are provided below.

Additional details associated with various device(s) and/or component(s) described above with reference to the example environment 100 are described below with reference to FIGS. 2-4, 18, and 19.

Figure 2:
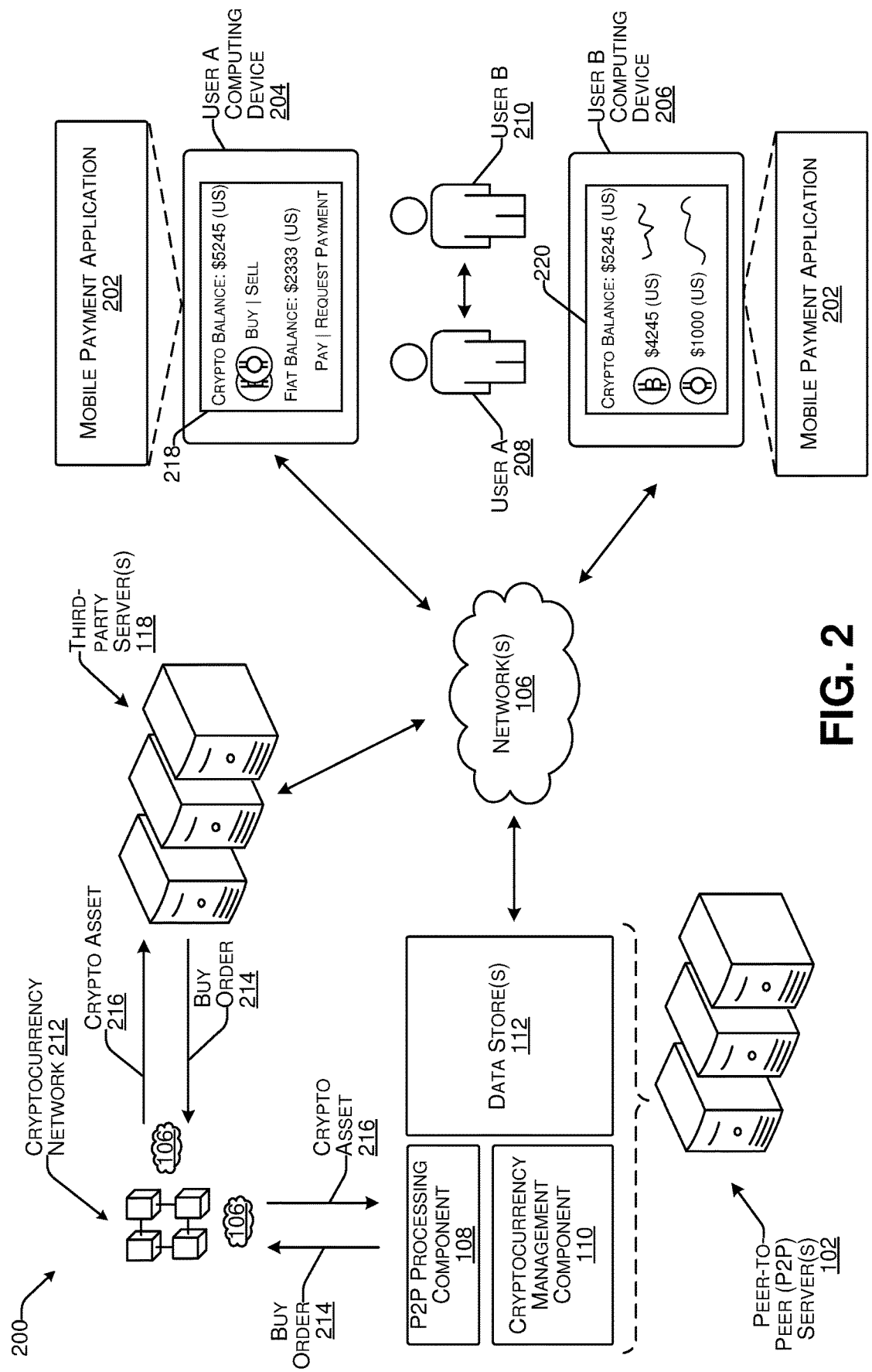
FIG. 2 illustrates additional details associated with the P2P payment platform of FIG. 1, as described herein.

FIG. 2 illustrates additional details associated with the P2P payment platform and the environment 200 associated therewith. As described in FIG. 1, the P2P platform can include the P2P server(s) 102, which can include the P2P processing component 108, the cryptocurrency management component 110, and data store(s) 112. In at least one example, the P2P payment platform can be associated with a mobile payment application 202, which can be associated with the P2P payment platform and provided by the P2P payment platform. In at least one example, a first user computing device (e.g., User A computing device 204) and a second user computing device (e.g., User B computing device 206) can each have an instance of the mobile payment application 202 stored thereon. The user computing devices 204 and 206 can comprise two of the user computing device(s) 126 of FIG. 1. In at least one example, respective users, User A 208 and User B 210, which can comprise two or the user(s) 128 of FIG. 1, can each interact with the P2P payment platform via respective instances of the user interface presented via the respective instances of the mobile payment application 202. In at least one example, the P2P payment platform can communicate with instances of the mobile payment application 202 (or other access points) to facilitate P2P transactions.

In some examples, an instance of a mobile payment application 202 can run on (e.g., is executable by) a user computing device. In at least one example, the instance of the mobile payment application 202 can be an instance of a software application downloadable via an application store. In some examples, functionality associated with the mobile payment application 202 can be accessed via an instant application, or a portion of the mobile payment application 202, that can be downloaded to a user computing device for performing the functionality. Such functionality (i.e., of the instant application) can be less than the full functionality of the mobile payment application 202. As described above, the mobile payment application 202 can comprise an installed application, or portion thereof; however, in an additional or alternative example, the mobile payment application 202 can be an authenticated or unauthenticated application on a web browser. That is, in at least one example, an instance of the mobile payment application 202 can be accessible via a web browser. In some examples, once a user has accessed or registered with the mobile payment application 202, a web browser can remember associated credentials for subsequent customer visits (for example, through web browser authentication, web cookies, web history, etc.) allowing the customer to access the mobile payment application 202 without logging-in to an account of the customer.

In at least one example, an instance of the mobile payment application 202 can present one or more user interfaces, which can include one or more user interface elements, to enable a user associated therewith to send or receive funds from other users of the P2P payment platform. That is, in at least one example, User A 208 can send or receive funds from User B 210 via one or more interactions with a user interface presented via the instance of the mobile payment application 202 on the User A computing device 204. In at least one example, an instance of the mobile payment application 202 can present one or more user interfaces to enable the user associated therewith to generate accounts for managing assets, such as cryptocurrency, securities, and/or the like. In at least one example, an instance of the mobile payment application 202 can present one or more user interfaces to enable the user associated therewith to buy and sell assets, such as cryptocurrency, securities, and/or the like. One or more assets (e.g., fiat or non-fiat currencies) can be stored in association with a user account of the user in the data store(s) 112. Additional details are described below. Non-limiting examples of user interfaces 218, 220 that enable users to manage one or more assets are illustrated in FIG. 2.

In at least one example, the P2P server(s) 102 can buy (or sell) cryptocurrency via interactions with one or more blockchains. In at least one example, a cryptocurrency network 212 can be associated with a public blockchain. Non-limiting examples of the cryptocurrency network 212 can include for example, the Bitcoin network, the Ether network, the Litecoin network, etc. Cryptocurrency networks are commonly associated with a network of parties that cryptographically verify and validate transactions and record transactions on copies of a distributed ledger commonly called the blockchain. Once a transaction has been validated, the cryptocurrency network 212 can approve the transaction by writing the transaction to the blockchain. The time for such processes to complete can be impractically long for many applications. In some examples, the cryptocurrency network 212 can be associated with the third-party server(s) 118. In some examples, the P2P server(s) 102 can be associated with a private blockchain, as described below.

In at least one example, the P2P server(s) 102 and/or third-party server(s) 118 can send a request to purchase cryptocurrency (i.e., a "buy order" 214) to the cryptocurrency network 212. In at least one example, in response to receiving the buy order 214, the cryptocurrency network 212 can send cryptocurrency (i.e., "crypto asset" 216) to the requesting entity (e.g., P2P server(s) 102 and/or third-party server(s) 118). In at least one example, the "buy order" 214 can include an address with which the "crypto asset" 216 is to be associated. In at least one example, cryptocurrency received can be associated with a cryptocurrency wallet account of the user or the P2P payment platform, as described below. In at least one example, the P2P server(s) 102 and/or third-party server(s) 118 can sell cryptocurrency via one or more interactions with the cryptocurrency network 212.

Figure 3:
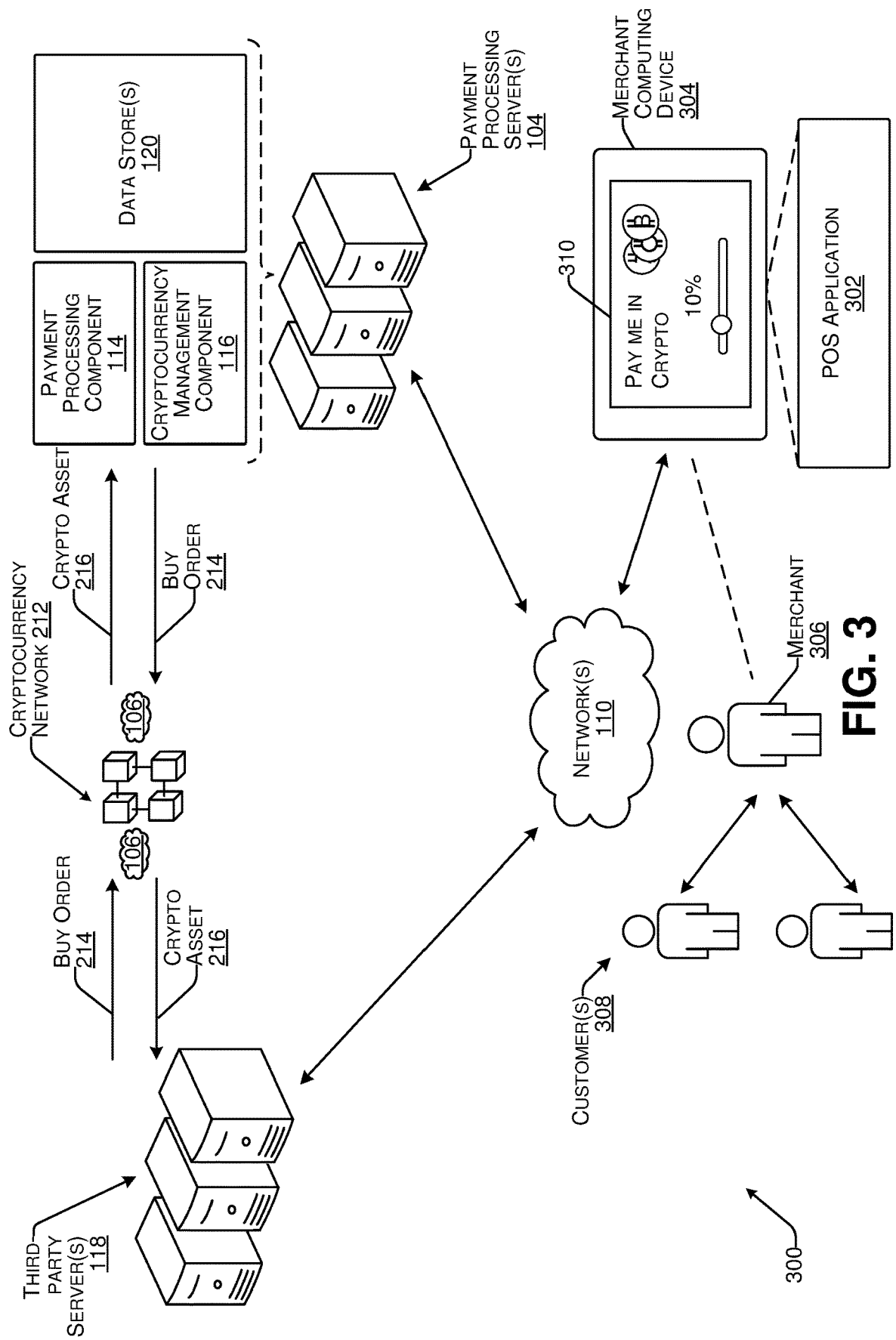
FIG. 3 illustrates additional details associated with the payment processing platform of FIG. 1, as described herein.

FIG. 3 illustrates additional details associated with the payment processing platform and the environment 300 associated therewith. In at least one example, the environment 300 can include the payment processing server(s) 104, which can include the payment processing component 114, the cryptocurrency management component 116, and the data store(s) 120.

In at least one example, the payment processing platform can be associated with a POS application 302. An instance of the POS application 302 can be executable by a computing device of a merchant ("merchant computing device" 304), which can be one of the user computing device(s) 126 of FIG. 1. In at least one example, an instance of a POS application 302 can run on (e.g., is executable by) the merchant computing device 304. In at least one example, the instance of the POS application 302 can be an instance of a software application downloadable via an application store. In some examples, functionality associated with the POS application 302 can be accessed via the merchant computing device 304 via an instant application, or a portion of the POS application 302, that can be downloaded to the merchant computing device 304 for performing the functionality. Such functionality (i.e., of the instant application) can be less than the full functionality of the POS application 302. As described above, the POS application 302 can comprise an installed application, or portion thereof; however, in an additional or alternative example, the POS application 302 can be an authenticated or unauthenticated application on a web browser. That is, in at least one example, the instance of the POS application 302 can be accessible via a web browser on the merchant computing device 304. In some examples, once a merchant has accessed or registered with the POS application 302, a web browser can remember associated credentials for subsequent merchant visits (for example, through web browser authentication, web cookies, web history, etc.) allowing the merchant to access the POS application 302 without logging-in into an account of the merchant.

In at least one example, the POS application 302 can configure the merchant computing device 304 as a POS terminal. In at least one example, the POS application 302 can generate transaction data associated with one or more transactions between a merchant 306 and one or more customers 308. A transaction can include a financial transaction for the purchase or other acquisition of item(s) that is conducted between the merchant 306 and a customer of the customer(s) 308. In at least one example, the customer(s) 308 can provide cash or any other kind of payment instrument(s) (e.g., debit card, credit card, stored-value card, check, electronic payment application, cryptocurrency, etc.) to the merchant 306 along with requests for items offered by the merchant 306.

In at least one example, the transaction data can include item(s) to be purchased (or otherwise acquired) via the transaction, detail(s) associated with such item(s), item cost(s) associated with the item(s), a total cost of the item(s), an identifier of the merchant, an identifier of the merchant computing device 304, an identifier of the instance of the POS application 302, an identifier of the transaction, a location associated with the merchant computing device 304, a timestamp associated with the transaction, a datestamp associated with the transaction, and/or the like. In some examples, the transaction data can include an identifier of a payment instrument, a name or user account of a customer, contact information of the customer, type of currency used for the transaction, and/or the like.

In some examples, the POS application 302 can configure the merchant computing device 304 to interact with a payment reader device, which can obtain payment data, for example from a payment instrument (e.g., debit card, credit card, near-field communication (NFC) payment instrument, etc.). In some examples, payment data can be obtained by the POS application 302 via an additional or alternative mechanism (e.g., manual input by the merchant 306, scanning a code or other identifier associated with a payment instrument, receipt of a unique identifier for a customer, etc.). The POS application 302 can send transaction data and/or payment data to the payment processing server(s) 104 for processing payments for transactions. In some examples, transaction data and/or payment data can be sent to the payment processing server(s) 104 in association with a request to authorize a payment instrument for payment of a transaction. In some examples, transaction data and/or payment data can be sent as part of a batched and/or periodic process, instead of directly with a request to authorize a payment instrument.

In at least one example, the POS application 302 can cause one or more user interfaces, which can include one or more user interface elements, to be presented to enable the merchant 306 (and/or agents/workers associated therewith) to interact with the payment processing platform. In at least one example, the merchant 306 can interact with a user interface presented via the POS application 302 to accept payments from the customers 308. In some examples, the merchant 306 can interact with a user interface presented via the POS application 302 to manage other aspects of their business. In at least one example, a user interface 310 can present user interface element(s) representative of one or more accounts of the merchant 306. In at least one example, the merchant 306 can interact with the user interface 310 to designate one or more accounts into which funds generated from payments for transaction(s) with the merchant 306 are to be deposited. In at least one example, the merchant 306 can interact with the user interface 310 to indicate that a portion of the funds is to be deposited into a cryptocurrency wallet account of the merchant 306. In some examples, the user interface 310 can include a control or other mechanism to enable the merchant 306 to designate a percentage or other amount of funds to be deposited into a cryptocurrency wallet account of the merchant 306. As described below, in some examples, the payment processing server(s) 104 can recommend percentages or other amounts to be deposited into a cryptocurrency wallet account of the merchant 306. In some examples, the merchant 308 may not designate a percentage or portion to withhold via the user interface 310 and, in such examples, the payment processing server(s) 104 can determine an amount to deposit into a cryptocurrency wallet account of the merchant 306. Additional details are described below.

In some examples, based at least in part on the merchant 306 indicating that at least a portion of funds generated from payment(s) for transaction(s) is to be deposited into a cryptocurrency wallet account of the merchant 306, the payment processing component 114 can exchange data with the P2P server(s) 102 and/or third-party server(s) 118 to facilitate (i) the conversion of non-cryptocurrency funds (e.g., fiat currency, securities, etc.) and/or (ii) deposit cryptocurrency funds into the cryptocurrency wallet account of the merchant 306 (e.g., which can be maintained by the P2P payment platform or a third-party platform). In some examples, the P2P server(s) 102 and/or the third-party server(s) 118 can communicate with a cryptocurrency network 212 to buy or sell cryptocurrency. In some examples, the payment processing server(s) 104 can additionally or alternatively communicate directly with the cryptocurrency network 212 (e.g., without going through the P2P server(s) 102 and/or the third-party server(s) 118) to buy or sell cryptocurrency. Additional details are provided below.

In some examples, the P2P payment platform and the payment processing platform can be integrated to perform various operations as described above. For example, in some instances, the POS application 302 can present a user interface to enable the merchant 306 to input information for generating a new cryptocurrency wallet account that is managed by the P2P payment platform. That is, even though such a user interface and/or operations associated therewith are described above as being presented and/or facilitated by the mobile payment application 202 and/or cryptocurrency management component 110, in some examples, such a user interface and/or operations can be presented and/or facilitated via an integration between the POS application 302 and the cryptocurrency management component 110. In some examples, user interfaces and/or operations described herein can be presented and/or facilitated by integrations between the P2P payment platform and/or the payment processing platform and a third-party platform (e.g., associated with the third-party server(s) 118).

Figure 4:
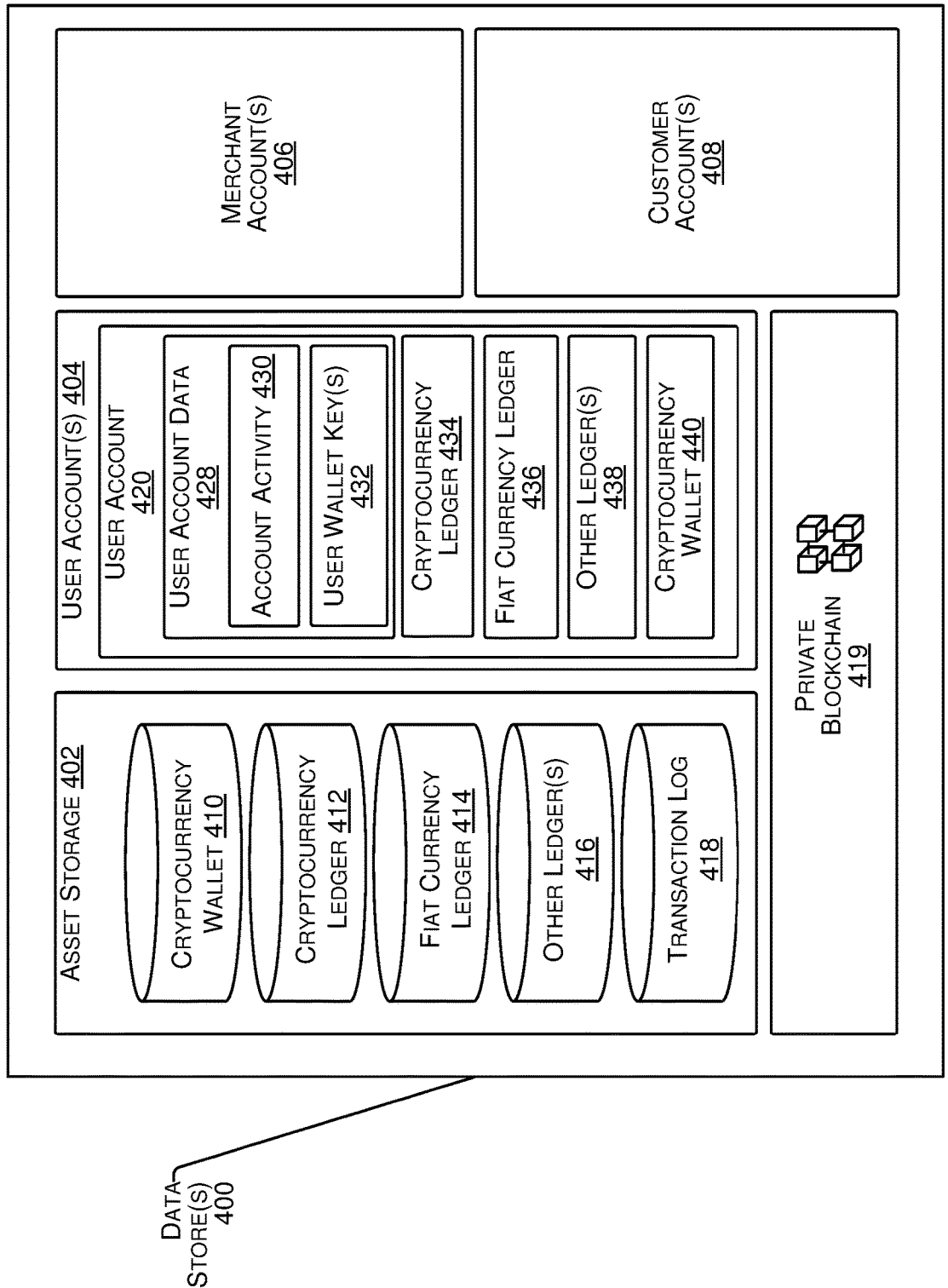
FIG. 4 illustrates example data store(s) associated with the environment of FIG. 1, as described herein.

FIG. 4 illustrates example data store(s) 400 associated with the environment 100. In at least one example, at least a portion of the data store(s) 400 can be associated with the data store(s) 112. In at least one example, at least a portion of the data store(s) 400 can be associated with the data store(s) 120. In some examples, the data store(s) 400 can be centralized such that they are accessible to the P2P server(s) 102 and/or the payment processing server(s) 104.

In at least one example, the data store(s) 400 can store digital assets in an asset storage 402, as well as data in user account(s) 404, merchant account(s) 406, and/or customer account(s) 408. In at least one example, the asset storage 402 can be used to store digital assets managed by the payment processing platform and/or the P2P payment platform. In at least one example, the asset storage 402 can be used to record whether individual of the digital assets are registered to users. For example, the asset storage 402 can include a cryptocurrency wallet 410 for storing cryptocurrency (e.g., owned by the payment processing platform and/or the P2P payment platform) and communicating with the cryptocurrency network 212. In some examples, the cryptocurrency wallet 410 can communication with the cryptocurrency network 212 via the cryptocurrency management component 110 and/or 116.

The cryptocurrency wallet 410 can be associated with one or more addresses and can vary addresses used to acquire cryptocurrency (e.g., from the cryptocurrency network 212) so that its holdings are represented under a variety of addresses on the cryptocurrency network 212. In examples where the P2P payment platform and/or the payment processing platform have their own holdings of cryptocurrency (e.g., in the cryptocurrency wallet), a user can acquire cryptocurrency directly from the P2P payment platform and/or the payment processing platform. In some examples, the P2P payment platform and/or the payment processing platform can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of cryptocurrency network 212 can be separate from any customer-merchant transaction, and therefore not necessarily time-sensitive. This can enable batching transactions to reduce computational resources and/or costs.

The asset storage 402 may contain ledgers that store records of assignments of assets to user(s) 128 of the P2P payment platform and/or the payment processing platform. Specifically, the asset storage 402 may include cryptocurrency ledger 412, fiat currency ledger 414, and other ledger(s) 416, which can be used to record transfers of assets between users 128 of the platform(s), the platform(s) (e.g., the P2P payment platform and/or the payment processing platform), and/or one or more third-parties (e.g., merchant network(s), payment card network(s), ACH network(s), equities network(s), the cryptocurrency network 212, etc.).

In doing so, the asset storage 402 can maintain a running balance of assets managed by the P2P payment platform and/or the payment processing platform. The ledger(s) of the asset storage 402 can further indicate some of the running balance for each of the ledger(s) stored in the asset storage 402 is assigned or registered to one or more user account(s) 404.

In at least one example, the asset storage 402 can include transaction logs 418, which can include records of past transactions involving the P2P payment platform and/or the payment processing platform. In at least one example, transaction data, as described herein, can be stored in association with the transaction logs 418.

While shown as a single asset storage with a single instance of the cryptocurrency wallet 410, the cryptocurrency ledger 412, the fiat currency ledger 414, other ledger(s) 416, and the transaction log 418, in some examples, the data store(s) 112 associated with the P2P payment platform can be associated with an asset storage and a first instance of the cryptocurrency wallet 410, the cryptocurrency ledger 412, the fiat currency ledger 414, other ledger(s) 416, and the transaction log 418, and the data store(s) 120 associated with the payment processing platform can be associated with a second instance of the cryptocurrency wallet 410, the cryptocurrency ledger 412, the fiat currency ledger 414, other ledger(s) 416, and the transaction log 418. In some examples, some ledger(s) and/or account(s) can be stored in the data store(s) 112 and other ledger(s) and/or account(s) can be stored in the data store(s) 120. For instance, at least the cryptocurrency ledger 412 and the user account(s) 404 can be stored in the data store(s) 112 and at least the fiat currency ledger 414, merchant account(s) 406, and customer account(s) can be stored in the data store(s) 120. In some examples, the data store(s) 112 can also store a fiat currency ledger 414. As described above, the various ledger(s) and/or account(s) described in FIG. 4 can be stored in the same or different data store(s) in the same or different groupings.

In some examples, the data store(s) 400 can store a private blockchain 419. A private blockchain 419 can function to record sender addresses, recipient addresses, public keys, values of cryptocurrency transferred, and/or can be used to verify ownership of cryptocurrency tokens to be transferred. In some examples, the P2P payment platform and/or the payment processing platform can record transactions taking place within the payment service (e.g., within the P2P payment platform and/or the payment processing platform) involving cryptocurrency until the number of transactions has exceeded a determined limit (e.g., number of transactions, storage space allocation, etc.). Based at least in part on determining that the limit has been reached, the P2P payment platform and/or the payment processing platform can publish the transactions in the private blockchain 419 to a public blockchain (e.g., associated with the cryptocurrency network 212), where miners can verify the transactions and record the transactions to blocks on the public blockchain. In at least one example, the P2P payment platform and/or the payment processing platform can participate as miner(s) at least for its transactions to be posted to the public blockchain.

In at least one example, the data store(s) 400 can store and/or manage accounts, such as user account(s) 404, merchant account(s) 406, and/or customer account(s) 408. In at least one example, the user account(s) 404 may store records of user accounts associated with the user(s) 128. In at least one example, the user account(s) 404 can include a user account 420, which can be associated with a user (of the user(s) 128). Other user accounts of the user account(s) 404 can be similarly structured to the user account 420, according to some examples. In other examples, other user accounts may include more or less data and/or account information than that provided by the user account 420. In at least one example, the user account 420 can include user account data 428, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 428 can include account activity 430 and user wallet key(s) 432. The account activity 430 may include a transaction log for recording transactions associated with the user account 420. In some examples, the user wallet key(s) 432 can include a public-private key-pair and a respective address associated with the cryptocurrency network 212 or other cryptocurrency networks. In some examples, the user wallet key(s) 432 may include one or more key pairs, which can be unique to the cryptocurrency network 212 or other cryptocurrency networks.

In addition to the user account data 428, the user account 420 can include ledger(s) for account(s) managed by the P2P payment platform and/or the payment processing platform, for the user. For example, the user account 420 may include a cryptocurrency ledger 434, a fiat currency ledger 436, and/or one or more other ledgers 438. In some examples, the other ledger(s) 438 can include securities ledger(s) and/or the like. The ledger(s) can indicate that a corresponding user utilizes the P2P payment platform and/or the payment processing platform to manage corresponding accounts (e.g., a cryptocurrency account, a fiat currency account, etc.). It should be noted that in some examples, the ledger(s) can be logical ledger(s) and the data can be represented in a single database. In some examples, individual of the ledger(s), or portions thereof, can be maintained by the P2P payment platform, the payment processing platform, or a combination of the P2P platform and the payment processing platform.

In some examples, the cryptocurrency ledger 434 can store a balance for each of one or more cryptocurrencies (e.g., Bitcoin, Ethereum, Litecoin, etc.) registered to the user account 420. In at least one example, the cryptocurrency ledger 434 can further record transactions of cryptocurrency assets associated with the user account 420. For example, the user account 420 can receive cryptocurrency from the cryptocurrency network 212 using the user wallet key(s) 432. In some examples, the user wallet key(s) 432 may be generated for the user upon request. User wallet key(s) 432 can be requested by the user in order to send, exchange, or otherwise control the balance of cryptocurrency held by the P2P payment platform and/or the payment processing platform (e.g., in the cryptocurrency wallet 410) and registered to the user. In some examples, the user wallet key(s) 432 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the P2P payment platform and/or payment processing platform and the value is credited as a balance in cryptocurrency ledger 434), by purchasing currency in the form associated with the account using currency in a different form (e.g., buying a value of cryptocurrency from the P2P payment platform and/or payment processing platform using a value of fiat currency reflected in fiat currency ledger 206, and crediting the value of cryptocurrency in cryptocurrency ledger 434), or by conducting a transaction with another user (customer or merchant) of the P2P payment platform and/or payment processing platform wherein the account receives incoming currency (which can be in the form associated with the account or a different form, in which the incoming currency may be converted to the form associated with the account). In some examples, the user account data 428 can include preferences for maintaining balances of individual of the ledgers. For example, the P2P payment platform and/or payment processing platform can automatically debit the fiat currency ledger 436 to increase the cryptocurrency ledger 434, or another account associated with the user whenever the cryptocurrency balance (e.g., of the cryptocurrency ledger 434) falls below a stated level (e.g., a threshold). Conversely, in some embodiments, the P2P payment platform and/or payment processing platform can automatically credit the fiat currency ledger 436 to decrease the cryptocurrency ledger 434 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the P2P payment platform and/or payment processing platform (i.e., an external account). In at least one example, the user can transfer all or a portion of a balance of the cryptocurrency stored in the third-party cryptocurrency wallet to the P2P payment platform and/or payment processing platform. Such a transaction can require the user to transfer an amount of the cryptocurrency in a message signed by user's private key to an address provided by the P2P payment platform and/or payment processing platform. In at least one example, the transaction can be sent to miners to bundle the transaction into a block of transactions and to verify the authenticity of the transactions in the block. Once a miner has verified the block, the block is written to a public, distributed blockchain where the P2P payment platform and/or payment processing platform can then verify that the transaction has been confirmed and can credit the user's cryptocurrency ledger 434 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the P2P payment platform and/or the payment processing platform. As described above, in some examples, the P2P payment platform and/or payment processing platform can acquire cryptocurrency from a third-party source (e.g., associated with the third-party server(s) 118). In such examples, the cryptocurrency wallet 410 can be associated with different addresses and can vary addresses used to acquire cryptocurrency so that its holdings are represented under a variety of addresses on a blockchain. When the P2P payment platform and/or payment processing platform has their own holdings of cryptocurrency, users can acquire cryptocurrency directly from the P2P payment platform and/or payment processing platform. In some examples, the P2P payment platform and/or payment processing platform can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the P2P payment platform and/or the payment processing platform have their own cryptocurrency assets, cryptocurrency transferred in a transaction (e.g., data with address provided for receipt of transaction and a balance of cryptocurrency transferred in the transaction) can be stored in the cryptocurrency wallet 410. In at least one example, the P2P payment platform and/or payment processing platform can credit the cryptocurrency ledger 434 of the user. Additionally, while the P2P payment platform and/or payment processing platform recognizes that the user retains the value of the transferred cryptocurrency through crediting the cryptocurrency ledger 434, any person that inspects the blockchain will see the cryptocurrency as having been transferred to the P2P payment platform and/or payment processing platform. In some examples, the cryptocurrency wallet 410 can be associated with many different addresses. In such examples, any person that inspects the blockchain may not easily associate all cryptocurrency stored in cryptocurrency wallet 410 as belonging to the same entity. It is this presence of a private ledger that is used for real-time transactions and maintained by the P2P payment platform and/or payment processing platform, combined with updates to the public ledger at other times, that allows for extremely fast transactions using cryptocurrency to be achieved. In some examples, the "private ledger" can refer to the cryptocurrency ledger 412, which in some examples, can utilize the private blockchain 419, as described herein. The "public ledger" can correspond to a public blockchain associated with the cryptocurrency network 212.

In at least one example, a user's cryptocurrency ledger 434, fiat currency ledger 436, or the like can be credited when conducting a transaction with another user (customer or merchant) wherein the user receives incoming currency. For example, in response to capturing funds associated with a payment of a transaction, the P2P payment platform and/or payment processing platform can deposit funds into one or more of a merchant's account, thereby causing corresponding ledgers to be credited.

In some examples, a user can receive cryptocurrency in the form of payment for a transaction with another user. In at least one example, such cryptocurrency can be used to fund the cryptocurrency ledger 434. In some examples, a user can receive fiat currency or another currency in the form of payment for a transaction with another user. In at least one example, at least a portion of such funds can be converted into cryptocurrency by the P2P payment platform and/or payment processing platform and used to fund the cryptocurrency ledger 434 of the user.

As addressed above, in some examples, users can also have other accounts maintained by the P2P payment platform and/or payment processing platform. For example, a user can also have an account in U.S. dollars, which can be tracked, for example, via the fiat currency ledger 436. Such an account can be funded by transferring money from a bank account at a third-party bank to an account maintained by the P2P payment platform and/or payment processing platform as is conventionally known. In some examples, a user can receive fiat currency in the form of payment for a transaction with another user. In such examples, at least a portion of such funds can be used to fund the fiat currency ledger 436.

In some examples, a user can have one or more internal payment cards registered with the P2P payment platform and/or payment processing platform. Internal payment cards can be linked to one or more of the accounts associated with the user account 420. In some embodiments, options with respect to internal payment cards can be adjusted and managed using an application (e.g., the mobile payment application 202 and/or the POS application 302).

In at least one example, as described above, each ledger can correspond to an account of the user that is managed by the P2P payment platform and/or the payment processing platform. In at least one example, individual of the accounts can be associated with a wallet or a stored balance for use in payment transactions, P2P transactions, payroll payments, etc.

In at least one example, the user account 420 can be associated with a cryptocurrency wallet 440. The cryptocurrency wallet 440 of the user can be associated with account information that can be stored in the user account data 428 and, in some examples, can be associated with the user wallet key(s) 432. In at least one example, the cryptocurrency wallet 440 can store data indicating an address provided for receipt of a cryptocurrency transaction. In at least one example, the balance of the cryptocurrency wallet 440 can be based at least in part on a balance of the cryptocurrency ledger 434. In at least one example, funds availed via the cryptocurrency wallet 440 can be stored in the cryptocurrency wallet 440 or the cryptocurrency wallet 410. Funds availed via the cryptocurrency wallet 410 can be tracked via the cryptocurrency ledger 434. The cryptocurrency wallet 440, however, can be associated with additional cryptocurrency funds.

In at least one example, when the P2P payment platform and/or the payment processing platform includes a private blockchain 419 for recording and validating cryptocurrency transactions, the cryptocurrency wallet 440 can be used instead of, or in addition to, the cryptocurrency ledger 434. For example, at least one example, a merchant can provide the address of the cryptocurrency wallet 440 for receiving payments. In an example where a customer is paying in cryptocurrency and the customer has their own cryptocurrency wallet account associated with the P2P payment platform and/or payment processing platform, the customer can send a message signed by its private key including its wallet address (i.e., of the customer) and identifying the cryptocurrency and value to be transferred to the merchant's cryptocurrency wallet 440. The P2P payment platform and/or the payment processing platform can complete the transaction by reducing the cryptocurrency balance in the customer's cryptocurrency wallet and increasing the cryptocurrency balance in the merchant's cryptocurrency wallet 440. In addition to recording the transaction in the respective cryptocurrency wallets, the transaction can be recorded in the private blockchain 419 and the transaction can be confirmed. A user can perform a similar transaction with cryptocurrency in a peer-to-peer transaction as described above. In at least one example, the cryptocurrency wallet account 440 can be funded by a balance transfer from a third-party cryptocurrency wallet, as described above. Such a transaction can require a user to transfer an amount of cryptocurrency in a message signed by the user's private key to an address of the cryptocurrency wallet account 440. The transferred amount of cryptocurrency can then be within the cryptocurrency wallet account 440 for use in later transactions.

In at least one example, the merchant account(s) 406 can be associated with individual of the user(s) 128 that utilize the payment processing platform. The merchant account(s) 406 can comprise one or more merchant accounts associated with one or more merchants. In some examples, a merchant account can have the same or similar structure as the user account 420. In some examples, a merchant account can be integrated with a user account or mapped to, or otherwise associated with, the user account. In some examples, a merchant account can be associated with merchant data, which can include, but is not limited to, merchant identifying information (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. In some examples, a merchant account can store payment information associated with a payment instrument linked to individual of the stored balances (e.g., ledgers) of the merchant. In at least one example, P2P user information (e.g., alphanumeric identifier, or the like) can be mapped to, or otherwise associated with, such a merchant profile.

In at least one example, the customer account(s) 408 can be associated with individual of the user(s) 128 that utilize the payment platform. The customer account(s) 408 can comprise one or more customer accounts associated with one or more customers. In some examples, a customer account can have the same or similar structure as the user account 420. In some examples, a customer account can be integrated with a user account or mapped to, or otherwise associated with, the user account. In some examples, a customer account can be associated with customer data, which can include, but is not limited to, customer identifying information (e.g., name, phone number, address, banking information, etc.), customer preferences (e.g., learned or customer-specified), purchase history data (e.g., identifying one or more items purchased (and respective item information), payment instruments used to purchase one or more items (which can include P2P payment transactions), returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc. In some examples, a customer account can store payment information associated with a payment instrument linked to individual of the stored balances (e.g., ledgers) of the customer. In at least one example, P2P user information (e.g., alphanumeric identifier, or the like) can be mapped to, or otherwise associated with, such a customer profile.

It should be noted that user(s) having accounts managed by the P2P payment platform and/or payment processing platform is an aspect of the technology disclosed that enables technical advantages of increased processing speed and improved security.

Figure 5:
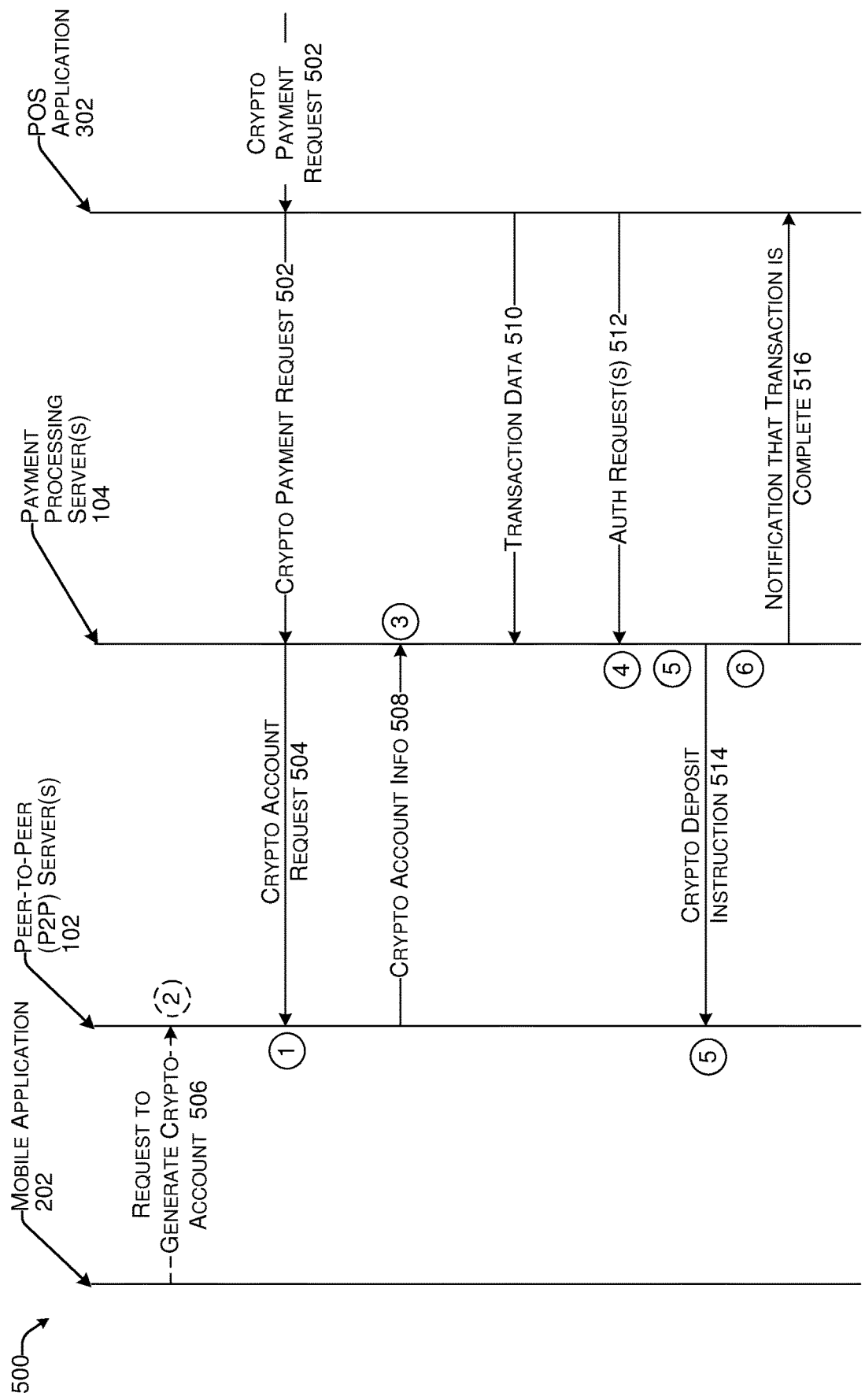
FIG. 5 illustrates a swim lane diagram illustrating a process for differentiating payment allocations to a merchant using cryptocurrency, as described herein.

FIG. 5 illustrates a swim lane diagram illustrating a process 500 for differentiating payment allocations to a merchant using cryptocurrency. Operations of the process 500 can be performed by one or more components of the environments 100, 200, and/or 300. As illustrated, the process 500 can be performed in part by the P2P server(s) 102, the payment processing server(s) 104, the mobile application 202, and the POS application 302. In some examples, the mobile payment application 202 and the POS application 302 can be associated with a same user computing device of a user (i.e., the merchant 306). In some examples, the mobile payment application 202 and the POS application 302 can be associated with different user computing devices, which can both be associated with the same user (i.e., the merchant 306).

In at least one example, a crypto payment request 502 can be received via the POS application 302 on the merchant computing device 304. In at least one example, the POS application 302 can present a user interface, with one or more user interface elements, to enable a merchant 306 to designate which account(s) are to receive funds generated from payment(s) associated with transaction(s) of the merchant 306. In some examples, the merchant 306 can be associated with one or more accounts, as described above. For example, the merchant 306 can be associated with a fiat currency account (associated with a fiat currency ledger), a cryptocurrency wallet account (e.g., associated with a cryptocurrency ledger), and/or the like.

In at least one example, the POS application 302 can receive an input indicating that at least a portion of funds generated from payment(s) associated with transaction(s) of the merchant 306 are to be deposited into a cryptocurrency wallet account of the merchant 306. In some examples, the user interface can include a mechanism (e.g., a slider, a freeform text box, a drop down, etc.) to enable the merchant 306 to designate a percentage or other portion of the funds that are to be deposited into the cryptocurrency wallet account of the merchant 306. In some examples, the input can therefore be associated with an indication of the percentage or other portion of the funds that are to be deposited. In some examples, the merchant 306 may not provide such a designation and may rely on recommendations and/or automatic determinations (e.g., based on logic associated with the payment processing component 114) of an amount of the funds to be deposited into the cryptocurrency wallet account of the merchant 306. Additional details are described below.

In at least one example, the POS application 302 can send the crypto payment request 502 to the payment processing server(s) 104. The payment processing server(s) 104 can receive the crypto payment request 502. In at least one example, the payment processing server(s) 104 can determine whether a merchant account of the merchant 306 is associated with a cryptocurrency wallet account. In at least one example, based at least in part on determining that the merchant account is not associated with the cryptocurrency wallet account, the payment processing component 114 can send a crypto account request 504 to the P2P server(s) 102. In at least one example, the crypto account request 504 can include an identifier associated with the merchant 306, which in some examples can be a unique identifier to the merchant 306 (e.g., an alphanumeric identifier selected by the merchant 306 and/or the like). In some examples, the identifier can be stored in association with a merchant account of the merchant 306 and/or can be provided by the merchant 306 with the crypto payment request 502. In at least one example, the cryptocurrency management component 110 can receive the crypto account request 504 and can determine whether the merchant 306 is associated with a cryptocurrency wallet account (e.g., in the data store(s) 112).

In at least one example, if the merchant 306 is not associated with a cryptocurrency wallet account, the cryptocurrency management component 110 can initiate an account generation process, as illustrated by the encircled one in FIG. 5. In at least one example, the cryptocurrency management component 110 can cause a user interface to be presented via the mobile payment application 202, which can prompt the merchant 306 to input information for generating a cryptocurrency wallet account. In at least one example, based at least in part on receiving such information, the cryptocurrency management component 110 can generate a cryptocurrency wallet account for the merchant 306. In at least one example, such an account can be associated with user wallet key(s) that can be stored in user account data associated with a user account of the merchant 306. In at least one example, such an account can be associated with a cryptocurrency ledger, that can be associated with a user account of the merchant 306. In at least one example, the cryptocurrency wallet account can be associated with account information, such as an address or other account identifier.

In some examples, a cryptocurrency wallet account can be generated prior to having received the crypto account request 504. For example, the merchant 306 can interact with an instance of the mobile payment application 202 to provide information for generating a cryptocurrency wallet account. In at least one example, the mobile payment application 202 can present a user interface to enable the merchant 306 to input such information and send a request to generate a cryptocurrency wallet account 506. In such an example, based at least in part on receiving such information, the cryptocurrency management component 110 can generate a cryptocurrency wallet account for the merchant 306, as illustrated by the encircled two in FIG. 5. In at least one example, such an account can be associated with user wallet key(s) that can be stored in user account data associated with a user account of the merchant 306. In some examples, the user account can be managed by the P2P server(s) 102 (e.g., associated with the data store(s) 112) and may or may not be mapped to, or otherwise associated with, a merchant account of the merchant managed by the payment processing server(s) 104. In at least one example, the user account can be associated with a cryptocurrency ledger. In at least one example, the cryptocurrency wallet account can be associated with account information, such as an address or other account identifier.

While described above as being performed by the mobile payment application 202 and the cryptocurrency management component 110, in some examples, such functionality can be integrated into the POS application 302 such that the information can be input via a user interface presented by the POS application 302 and the payment processing component 114 can receive the information from the POS application 302. The payment processing component 114 can then send the information to the P2P server(s) 102 and the cryptocurrency management component 110 can generate the cryptocurrency wallet account.

In at least one example, the cryptocurrency management component 110 can send the crypto account info 508 to the payment processing server(s) 104. In at least one example, the payment processing component 114 can receive the crypto account info 508 and can associate the crypto account info 508 with a merchant account of the merchant, as illustrated by the encircled three in FIG. 5. In at least one example, the crypto account info 508 can be mapped to, or otherwise associated with, a merchant account of the merchant 306 (e.g., in the data store(s) 120).

In at least one example, the merchant 306 can utilize the POS application 302 to process payment(s) for transaction(s) with customer(s) 308. In at least one example, the POS application 302 can generate transaction data 510, which can be sent to the payment processing server(s) 104. In at least one example, the transaction data 510 can be associated with payment data and an authorization request 512 to authorize a payment instrument associated with the payment data for a cost of a transaction. In some examples, the transaction data 510 can be sent on a per transaction basis. In some examples, the transaction data 510 can be batched and can be sent with authorization requests 512 associated with multiple transactions.

In at least one example, as illustrated at the encircled four in FIG. 5, the payment processing component 114 can receive the transaction data 510 and authorization request(s) 512 and can exchange communications with the third-party server(s) 118, if applicable, to determine whether the payment instrument(s) associated with the authorization request(s) 512 are authorized and/or to capture funds associated therewith. In at least one example, the payment processing component 114 can determine a portion of funds associated with such transaction(s) to allocate to individual accounts of the merchant 306. That is, the payment processing component 114 can determine a distribution of the funds associated with the transaction between one or more accounts of the merchant. In at least one example, such allocation can be determined based at least in part on an input from the merchant 306 (e.g., with the crypto payment request 502). In some examples, such an allocation can be automatically determined by the payment processing component 114.

In at least one example, the payment processing component 114 can utilize one or more rules to determine an amount of funds from one or more transactions to deposit into a cryptocurrency wallet account. In at least one example, one or more rules can be designated by a merchant with respect to an amount of funds to deposit into a cryptocurrency wallet account. Such rules can indicate a percentage, a flat rate, or the like, that can be deposited as cryptocurrency into a cryptocurrency wallet account of the merchant 306. In some examples, rules can be learned, for example, based on merchant data associated with other merchants that utilize the payment processing platform. In some examples, learned rules can be learned based on merchant data associated with other merchants that are similar to the merchant 306 (e.g., as determined based on a similarity algorithm or other indications of similarity between merchants).

In some examples, the payment processing component 114 can utilize machine-trained models to determine an amount of funds from one or more transactions to deposit into a cryptocurrency wallet account. In some examples, such model(s) can be trained using merchant data associated with merchants that utilize the payment processing platform for payment processing, previous cryptocurrency deposits, cryptocurrency conversion rates or trends (e.g., historical), and/or the like. Merchant data can include transaction data associated with transactions previously processed using the payment processing platform. Such transaction data, as described above, can indicate merchants associated with the transactions, customers associated with the transactions, items purchased via the transactions, dates of the transactions, times of the transactions, payment instruments used for payment of the transactions, allocations of funds associated with the transactions, and/or the like. Previous cryptocurrency deposits can indicate percentages of funds previously deposited into cryptocurrency wallet account(s), which cryptocurrency wallet account(s) fund were deposited, conversion rates and/or trends at the time of such transactions and/or the like. In at least one example, such transaction data, previous cryptocurrency deposits, and/or cryptocurrency rates and/or trends can be used for training the model(s). In some examples, model(s) can be trained on a subset of the merchant data, which can be associated with merchants that are similar to the merchant. In some examples, model(s) can be trained using one or more machine learning mechanisms, such as supervised learning algorithms, unsupervised learning algorithms, semi-supervised learning algorithms, or the like. In at least one example, a machine-trained model can analyze characteristics of a transaction or group of transactions (e.g., based at least in part on transaction data and/or cryptocurrency conversion rates and/or trends) using a machine-trained model and can output a recommendation of an amount of funds associated with the transaction or the group of transactions to deposit as cryptocurrency.

As an example, the merchant 306 can be a seasonal merchant wherein transactions tend to be lower during one season (e.g., an offseason) than in another season (e.g., a high season) as determined from transaction data. In at least one example, during an offseason, the payment processing component 114 can utilize one or more machine-trained models to output a recommendation to increase an amount of funds to allocate to a cryptocurrency wallet account, decrease an amount of funds to allocate to a cryptocurrency wallet account, a specific amount of funds to allocate to a cryptocurrency wallet account, and/or the like. In at least one example, such an output can be based at least in part on current cryptocurrency conversion rates and/or trends and current and/or historical transaction data associated with the merchant 306.

In at least one example, based at least in part on capturing funds associated with the authorization request(s) 512, the payment processing component 114 can send a crypto deposit instruction 514 to the P2P server(s) 102. That is, the payment processing component 114 can send an instruction to the P2P server(s) 102 to deposit at least a portion of the funds captured into the cryptocurrency wallet account of the merchant 306.

In some examples, the funds can be received in a currency different than cryptocurrency. As such, in at least one example, the payment processing server(s) 104 and/or the P2P server(s) 102 can convert the funds into cryptocurrency, as illustrated by the encircled fives, in FIG. 5. For example, if the funds are received in a fiat currency and are to be deposited, at least in part, as cryptocurrency (e.g., into the cryptocurrency wallet account of the merchant 306), the payment processing component 114 can determine, for the portion of the funds that is to be deposited as cryptocurrency, a value owed to the merchant in cryptocurrency using an exchange rate between the fiat currency and the cryptocurrency. That is, the payment processing component 114 can determine a number of cryptocurrency units equivalent to the portion of fiat currency funds to be deposited into the cryptocurrency wallet account of the merchant 306. In some examples, the payment processing component 114 can send an indication of the value owed to the merchant in cryptocurrency to the P2P server(s) 102.

In some examples, the cryptocurrency management component 110 can receive the indication and can debit the cryptocurrency ledger associated with the P2P payment platform and credit the cryptocurrency ledger associated with the account of the merchant 306 with the same value or a value based on the same value. In some examples, the amount credited to the cryptocurrency ledger can be less than the same value based on processing fees. In some examples, the amount credited to the cryptocurrency ledger can be more than the same value based on incentives or rewards. By crediting the cryptocurrency ledger of the merchant 306, the balance of the cryptocurrency wallet account of the merchant 306 can increase. In some examples, the credit can be applied to the cryptocurrency ledger at the time the funds and/or instruction is received. In some examples, the credit can be applied to the cryptocurrency ledger at a later time, which can be determined based on a current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like.

In some examples, the cryptocurrency management component 110 can buy cryptocurrency, using the funds received from the payment processing server(s) 104. In some examples, the cryptocurrency management component 110 can purchase the cryptocurrency at the time the funds and/or instruction is received. In some examples, the cryptocurrency management component 110 can associate the funds with the appropriate ledger and purchase the cryptocurrency at a later time, which can be determined based on a current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like.

In some examples, the cryptocurrency management component 116 can buy cryptocurrency based on the conversion described above or otherwise allocate cryptocurrency to the user (e.g., based on balancing ledgers of the payment processing platform) and can associate such cryptocurrency with the crypto deposit instruction 514. In such an example, the cryptocurrency management component 110 can receive the funds in the currency to be deposited in the cryptocurrency wallet account and can deposit the funds in the cryptocurrency wallet account of the merchant 306.

In some examples, the payment processing component 114 can send one or more additional instructions to other component(s) to deposit one or more other portions of the funds into one or more other accounts, as illustrated by the encircled six in FIG. 5. For example, in at least one example, a portion of the funds can be deposited into a fiat currency account of the merchant 306. In at least one example, after each of the instructions have been sent and portions of funds deposited, the payment processing component 114 can send a notification that the transaction is complete 516 to the merchant computing device 304. The POS application 302 can cause the notification to be presented via a user interface. In some examples, the notification that the transaction is complete 516 can be sent in response to receiving an authorization response (e.g., from an acquirer, issuer, card payment network, bank, etc.). In some examples, the notification can be sent in response to receiving captured funds associated with the transaction. In some examples, the notification can be sent prior to the cryptocurrency being deposited into the cryptocurrency wallet account of the merchant 306, for example, if the cryptocurrency deposit is intentionally delayed due to the current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like.

Figure 6:
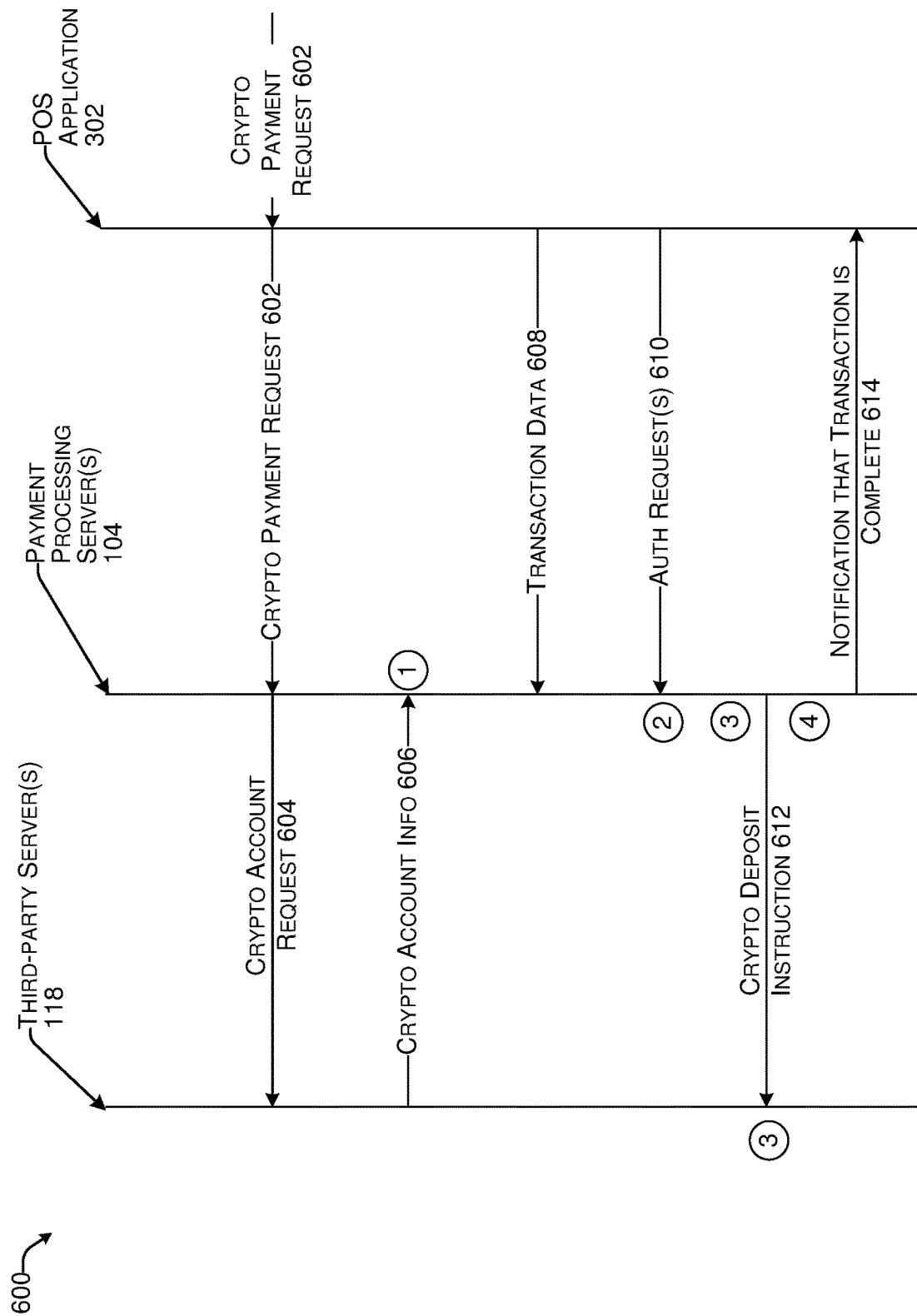
FIG. 6 illustrates a swim lane diagram illustrating another process for differentiating payment allocations to a merchant using cryptocurrency, as described herein.

FIG. 6 illustrates a swim lane diagram illustrating another process 600 for differentiating payment allocations to a merchant using cryptocurrency. Operations of the process 600 can be performed by one or more components of the environments 100 and/or 300. As illustrated, the process 600 can be performed in part by the payment processing server(s) 104, the POS application 302, and the third-party server(s) 118. As described above, in some examples, the merchant 306 can have one or more cryptocurrency wallet accounts. In some examples, one or more of the cryptocurrency wallet accounts can be associated with a third-party service provider, associated with the third-party server(s) 118.

In at least one example, a crypto payment request 602 can be received via the POS application 302 on the merchant computing device 304. In at least one example, the POS application 302 can present a user interface, with one or more user interface elements, to enable a merchant 306 to designate which account(s) are to receive funds generated from payment(s) associated with transaction(s) of the merchant 306. In some examples, the merchant 306 can be associated with one or more accounts, as described above. For example, the merchant 306 can be associated with a fiat currency account (associated with a fiat currency ledger), a cryptocurrency wallet account (e.g., associated with a cryptocurrency ledger), and/or the like.

In at least one example, the POS application 302 can receive an input indicating that at least a portion of funds generated from payment(s) associated with transaction(s) of the merchant 306 are to be deposited into a cryptocurrency wallet account of the merchant 306. In some examples, the user interface can include a mechanism (e.g., a slider, a freeform text box, a drop down, etc.) to enable the merchant 306 to designate a percentage or other portion of the funds that are to be deposited into the cryptocurrency wallet account of the merchant 306. In some examples, the input can therefore be associated with an indication of the percentage or other portion of the funds that are to be deposited. In some examples, the merchant 306 may not provide such a designation and may rely on recommendations and/or automatic determinations (e.g., based on logic associated with the payment processing component 114) of an amount of the funds to be deposited into the cryptocurrency wallet account of the merchant 306.

In some examples, if the merchant 306 is associated with more than one cryptocurrency wallet account, the user interface can include mechanisms for the merchant 306 to select which cryptocurrency wallet account(s) in which such funds are to be deposited. For example, the merchant 306 can select a cryptocurrency wallet account from a plurality of cryptocurrency wallet accounts and/or the merchant 306 can provide an address or other account identifier associated with the selected cryptocurrency wallet account.

In at least one example, the POS application 302 can send the crypto payment request 602 to the payment processing server(s) 104. The payment processing server(s) 104 can receive the crypto payment request 602. In at least one example, the payment processing server(s) 104 can determine whether a merchant account of the merchant 306 is associated with a cryptocurrency wallet account into which the portion of the funds is to be deposited. In at least one example, based at least in part on determining that the merchant account is not associated with the cryptocurrency wallet account, the payment processing component 114 can send a crypto account request 604 to third-party server(s) 118, which can be associated with a third-party cryptocurrency wallet account of the merchant 306. In at least one example, the crypto account request 604 can include an identifier associated with the merchant 306, which in some examples can be a unique identifier to the merchant 306 (e.g., an alphanumeric identifier selected by the merchant 306, and/or the like). As described above, in some examples, the identifier can be stored in association with a merchant account of the merchant 306 (e.g., in the data store(s) 120) and/or provided in association with the crypto account request 604. In at least one example, the third-party server(s) 118 can receive the crypto account request 604 and can access account information associated with a cryptocurrency wallet account of the merchant 306 (e.g., using the identifier).

In at least one example, the third-party server(s) 118 can send the crypto account info 606 to the payment processing server(s) 104. In at least one example, the payment processing component 114 can receive the crypto account info 606 and can associate the crypto account info 606 with a merchant account of the merchant, as illustrated by the encircled one in FIG. 6. In at least one example, the crypto account info 608 can be mapped to, or otherwise associated with, a merchant account of the merchant 306 (e.g., in the data store(s) 120).

In at least one example, the merchant 306 can utilize the POS application 302 to process payment(s) for transaction(s) with customer(s) 308. In at least one example, the POS application 302 can generate transaction data 608, which can be sent to the payment processing server(s) 104. In at least one example, the transaction data 608 can be associated with payment data and an authorization request 610 to authorize a payment instrument associated with the payment data for a cost of a transaction. In some examples, the transaction data 608 can be sent on a per transaction basis. In some examples, the transaction data 608 can be batched and can be sent with authorization requests 610 associated with multiple transactions.

In at least one example, as illustrated by the encircled two in FIG. 6, the payment processing component 114 can receive the transaction data 608 and authorization request(s) 610 and can determine a portion of funds associated with such transaction(s) to allocate to individual accounts of the merchant 306. That is, the payment processing component 114 can determine a distribution of the funds associated with the transaction between one or more accounts of the merchant, as described above. In at least one example, such allocation can be determined based at least in part on an input from the merchant 306 (e.g., with the crypto payment request 602). In some examples, such an allocation can be automatically determined by the payment processing component 114, as described above.

In at least one example, based at least in part on capturing funds associated with the authorization request(s) 610, the payment processing component 114 can send a crypto deposit instruction 612 to the third-party server(s) 118. That is, the payment processing component 114 can send an instruction to the third-party server(s) 118 to deposit at least a portion of the funds captured into the cryptocurrency wallet account of the merchant 306.

In some examples, the funds are received in a currency different than cryptocurrency. As such, in at least one example, the payment processing server(s) 104 and/or the third-party server(s) 118 can convert the funds into cryptocurrency, as illustrated by the encircled threes, in FIG. 6. For example, if the funds are received in a fiat currency and are to be deposited, at least in part, as cryptocurrency (e.g., into the cryptocurrency wallet account of the merchant 306), the payment processing component 114 can send the portion of funds in fiat currency to the third-party server(s) 118. In such an example, the third-party server(s) 118 can perform a conversion and associate the value owed to the merchant in cryptocurrency with the cryptocurrency wallet account of the merchant 306.

In some examples, the cryptocurrency management component 116 can buy cryptocurrency based on the conversion described above or otherwise allocate cryptocurrency to the user (e.g., based on balancing ledgers of the payment processing platform) and can associate such cryptocurrency with the crypto deposit instruction 612. In such an example, the third-party server(s) 118 can receive the funds in the currency to be deposited in the cryptocurrency wallet account.

In some examples, the payment processing component 114 can send one or more additional instructions to other component(s) to deposit one or more other portions of the funds into one or more other accounts, as illustrated by the encircled four in FIG. 6. For example, in at least one example, a portion of the funds can be deposited into a fiat currency account of the merchant 306. In at least one example, after each of the instructions have been sent and portions of funds deposited, the payment processing component 114 can send a notification that the transaction is complete 614 to the merchant computing device 304. The POS application 302 can cause the notification to be presented via a user interface. In some examples, the notification that the transaction is complete 614 can be sent in response to receiving an authorization response (e.g., from an acquirer, issuer, card payment network, bank, etc.). In some examples, the notification can be sent in response to receiving captured funds associated with the transaction. In some examples, the notification can be sent prior to the cryptocurrency being deposited into the cryptocurrency wallet account of the merchant 306, for example, if the cryptocurrency deposit is intentionally delayed due to market conditions, events, rules, and/or the like.

In some examples, as referenced in FIGS. 5 and 6, one or more transactions can be batched for processing. That is, in at least one examples, transaction data and authorization requests associated with a group of transactions can be received and processed at a same time. In some examples, determinations with respect to an amount of funds associated with the group of transactions to be deposited as cryptocurrency can be made at the group level instead of, or in addition to, the transaction level.

Figure 7:
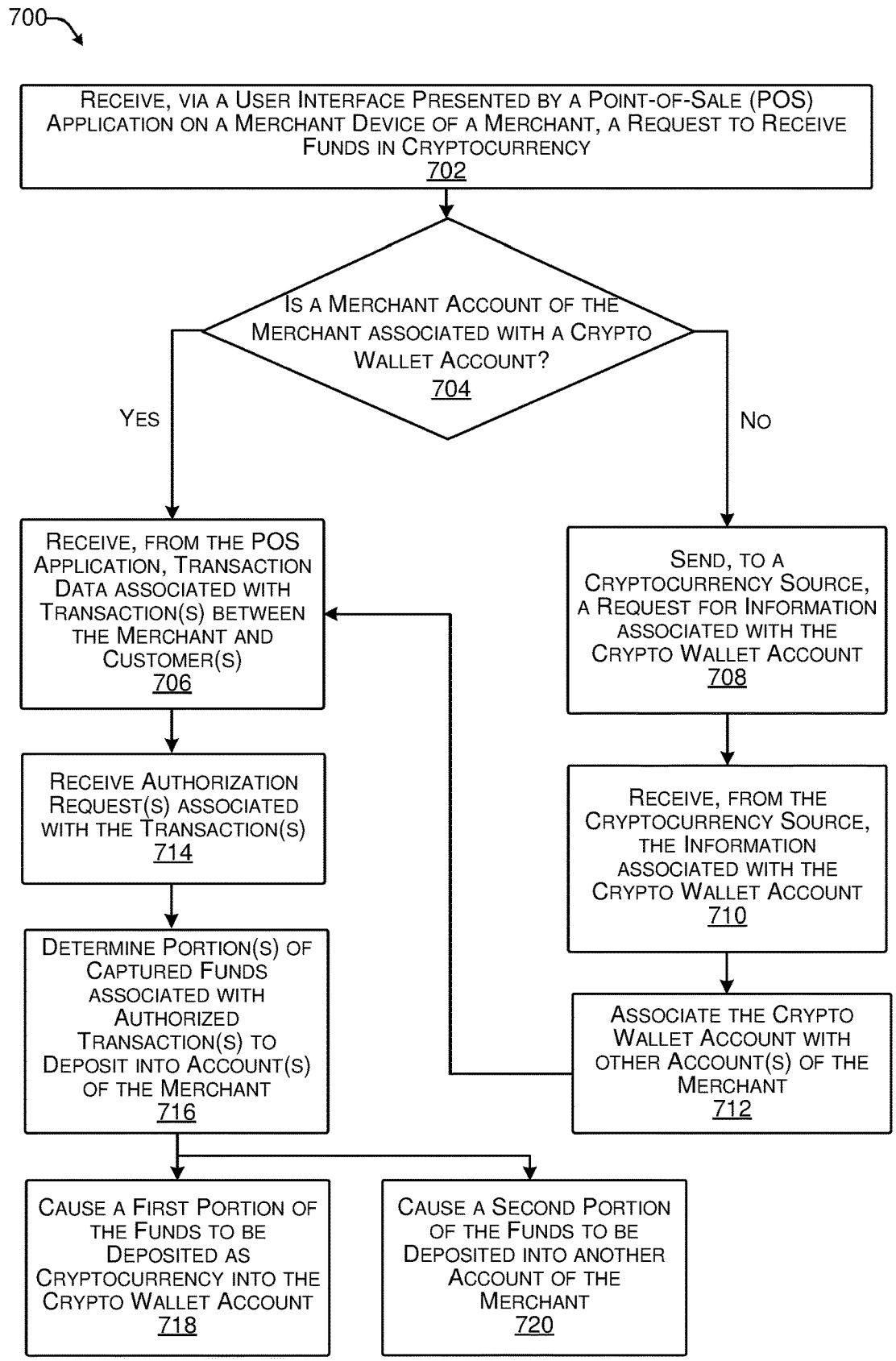
FIG. 7 illustrates an example process for allocating portions of funds from transaction(s) of a merchant into different accounts of the merchant, wherein at least one account is a cryptocurrency wallet account of the merchant, as described herein.

FIG. 7 illustrates an example process 700 for allocating portions of funds from transaction(s) of a merchant into different accounts of the merchant, wherein at least one account is a cryptocurrency wallet account of the merchant 306.

At operation 702, the payment processing component 114 can receive, via a user interface presented by the POS application 302 on the merchant device 304 of the merchant 306, a request to receive funds in cryptocurrency. In at least one example, the POS application 302 can present a user interface, with one or more user interface elements, to enable a merchant 306 to designate which account(s) are to receive funds generated from payment(s) associated with transaction(s) of the merchant 306. In some examples, the merchant 306 can be associated with one or more accounts, as described above. For example, the merchant 306 can be associated with a fiat currency account (associated with a fiat currency ledger), a cryptocurrency wallet account (e.g., associated with a cryptocurrency ledger), and/or the like.

In at least one example, the POS application 302 can receive an input indicating that at least a portion of funds generated from payment(s) associated with transaction(s) of the merchant 306 are to be deposited into a cryptocurrency wallet account of the merchant 306. In some examples, the user interface can include a mechanism (e.g., a slider, a freeform text box, a drop down, etc.) to enable the merchant 306 to designate a percentage or other portion of the funds that are to be deposited into the cryptocurrency wallet account of the merchant 306. In some examples, the input can therefore be associated with an indication of the percentage or other portion of the funds that are to be deposited. In some examples, the merchant 306 may not provide such a designation and may rely on recommendations and/or automatic determinations (e.g., based on logic associated with the payment processing component 114) of an amount of the funds to be deposited into the cryptocurrency wallet account of the merchant 306.

In at least one example, the POS application 302 can send the request to the payment processing server(s) 104. The payment processing server(s) 104 can receive the request. In at least one example, the payment processing component 114 of the payment processing server(s) 104 can receive the request. In some examples, the request can be associated with an identifier of the merchant 306 (e.g., an alphanumeric identifier that is unique to the merchant 306).

At operation 704, the payment processing component 114 can determine whether the merchant account of the merchant 306 is associated with a cryptocurrency ("crypto") wallet account. In at least one example, the payment processing component 114 can determine whether a merchant account of the merchant 306 is mapped to, or otherwise associated with, account information of a cryptocurrency wallet account. In at least one example, based at least in part on determining that the merchant account is associated with a cryptocurrency wallet account (i.e., "yes" at operation 704), the process 700 can proceed to operation 706. However, based at least in part on determining that the merchant account is not associated with a cryptocurrency wallet account (i.e., "no" at operation 704), the payment processing component 114 can send, to a cryptocurrency source, a request to information associated with a cryptocurrency wallet account, as illustrated at operation 708. In at least one example, the cryptocurrency source can be the P2P payment platform. In such an example, the payment processing component 114 can send the request to the P2P server(s) 102. In an alternative example, the cryptocurrency source can be associated with a third-party platform and the request can be sent to the third-party server(s) 118. In at least one example, the request can include an identifier associated with the merchant 306, which in some examples can be a unique identifier to the merchant 306 (e.g., an alphanumeric identifier selected by the merchant 306 and/or the like). In some examples, the identifier can be stored in association with a merchant account of the merchant 306 and/or can be provided by the merchant 306 with the request received at operation 702.

At operation 710, the payment processing component 114 can receive, from the cryptocurrency source, the information associated with the cryptocurrency wallet account. In at least one example, the cryptocurrency source (e.g., the cryptocurrency management component 110) can send account information associated with the cryptocurrency wallet account to the payment processing server(s) 104. In at least one example, the payment processing component 114 can receive the account information and can associate the account information associated with the cryptocurrency wallet account with a merchant account of the merchant 306, as illustrated at operation 712. In at least one example, the account information associated with the cryptocurrency wallet account can be mapped to, or otherwise associated with, a merchant account of the merchant 306 (e.g., in the data store(s) 120).

At operation 706, the payment processing component 114 can receive, from the POS application 302, transaction data associated with transaction(s) between the merchant and customer(s). As described above, in at least one example, the merchant 306 can utilize the POS application 302 to process payment(s) for transaction(s) with customer(s) 308. In at least one example, the POS application 302 can generate transaction data, which can be sent to the payment processing server(s) 104. In some examples, the transaction data can be sent on a per transaction basis. In some examples, the transaction data can be batched in association with multiple transactions.

At operation 714, the payment processing component 114 can receive, from the POS application 302, authorization request(s) associated with the transaction(s). In at least one example, transaction data can be associated with payment data and an authorization request to authorize a payment instrument associated with the payment data for a cost of a transaction. In at least one example, the payment processing component 114 can receive the transaction data and authorization request(s) and can exchange communications with the third-party server(s) 118, if applicable, to determine whether the payment instrument(s) associated with the authorization request(s) are authorized and/or to capture funds associated therewith. In some examples, the authorization request(s) can be sent on a per transaction basis. In some examples, the authorization request(s) can be batched in association with multiple transactions.

At operation 716, the payment processing component 114 can determine portion(s) of captured funds associated with authorized transaction(s) to deposit into account(s) of the merchant 306. In at least one example, the payment processing component 114 can determine a portion of funds associated with such transaction(s) to allocate to individual accounts of the merchant 306. That is, the payment processing component 114 can determine a distribution of the funds associated with the transaction between one or more accounts of the merchant. In at least one example, such allocation can be determined based at least in part on an input from the merchant 306 (e.g., as received at operation 702). In some examples, such an allocation can be automatically determined by the payment processing component 114.

In at least one example, the payment processing component 114 can utilize one or more rules to determine an amount of funds from one or more transactions to deposit into a cryptocurrency wallet account. In at least one example, one or more rules can be designated by a merchant with respect to an amount of funds to deposit into a cryptocurrency wallet account. Such rules can indicate a percentage, a flat rate, or the like, that can be deposited as cryptocurrency into a cryptocurrency wallet account of the merchant 306. In some examples, rules can be learned, for example, based on merchant data associated with other merchants that utilize the payment processing platform. In some examples, learned rules can be learned based on merchant data associated with other merchants that are similar to the merchant 306 (e.g., as determined based on a similarity algorithm or other indications of similarity between merchants).

In some examples, the payment processing component 114 can utilize machine-trained models to determine an amount of funds from one or more transactions to deposit into a cryptocurrency wallet account, as described above. In at least one example, a machine-trained model can analyze characteristics of a transaction or group of transactions (e.g., based at least in part on transaction data and/or cryptocurrency conversion rates and/or trends) using a machine-trained model and can output a recommendation of an amount of funds associated with the transaction or the group of transactions to deposit as cryptocurrency.

In at least one example, based at least in part on capturing funds associated with the authorization request(s) (e.g., received at operation 714), the payment processing component 114 can cause a first portion of the funds to be deposited as cryptocurrency into the cryptocurrency wallet account, as illustrated at operation 718, and can cause a second portion of the funds to be deposited into another account of the merchant 306, as illustrated at operation 720. That is, in at least one example, the payment processing component 114 can send an instruction to the P2P server(s) 102 to deposit the first portion of the funds captured into the cryptocurrency wallet account of the merchant 306. In some examples, the funds can be received in a currency different than cryptocurrency. In at least one example, the payment processing component 114 can convert the funds into cryptocurrency. For example, if the funds are received in a fiat currency and are to be deposited, at least in part, as cryptocurrency (e.g., into the cryptocurrency wallet account of the merchant 306), the payment processing component 114 can determine, for the portion of the funds that is to be deposited as cryptocurrency, a value owed to the merchant 306 in cryptocurrency using an exchange rate between the fiat currency and the cryptocurrency. That is, the payment processing component 114 can determine a number of cryptocurrency units equivalent to the portion of fiat currency funds to be deposited into the cryptocurrency wallet account of the merchant 306. In some examples, the payment processing component 114 can send an indication of the value owed to the merchant in cryptocurrency to the P2P server(s) 102.

In some examples, the payment processing component 114 can send an indication of the funds that are to be deposited into the cryptocurrency wallet account to the P2P server(s) 102 and the cryptocurrency management component 110 can convert the funds into cryptocurrency for deposit into the cryptocurrency wallet account of the merchant 306.

In some examples, the funds can be converted and deposited into the cryptocurrency wallet account of the merchant 306 at the time the funds and/or instruction is received. In some examples, the funds can be converted and deposited into the cryptocurrency wallet account of the merchant 306 at a later time, which can be determined based on a current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like. That is in some examples, the payment processing component 114 and/or the cryptocurrency management component 110 can determine an amount of funds to withhold for deposit into the cryptocurrency wallet account at operation 716 but can refrain from converting the funds into cryptocurrency or otherwise allocating cryptocurrency to the cryptocurrency wallet account until a later time. In some examples, that "later time" can be a default time and, as described below, the merchant 306 can override such a default either by providing a rule and/or input to effectuate the conversion. In some examples, the conversion can be made on per transaction basis or a per batch basis as described above.

In some examples, the payment processing component 114 can send one or more additional instructions to other component(s) to deposit one or more other portions of the funds into one or more other accounts. For example, in at least one example, the second portion of the funds can be deposited into a fiat currency account of the merchant 306.

Figure 8:
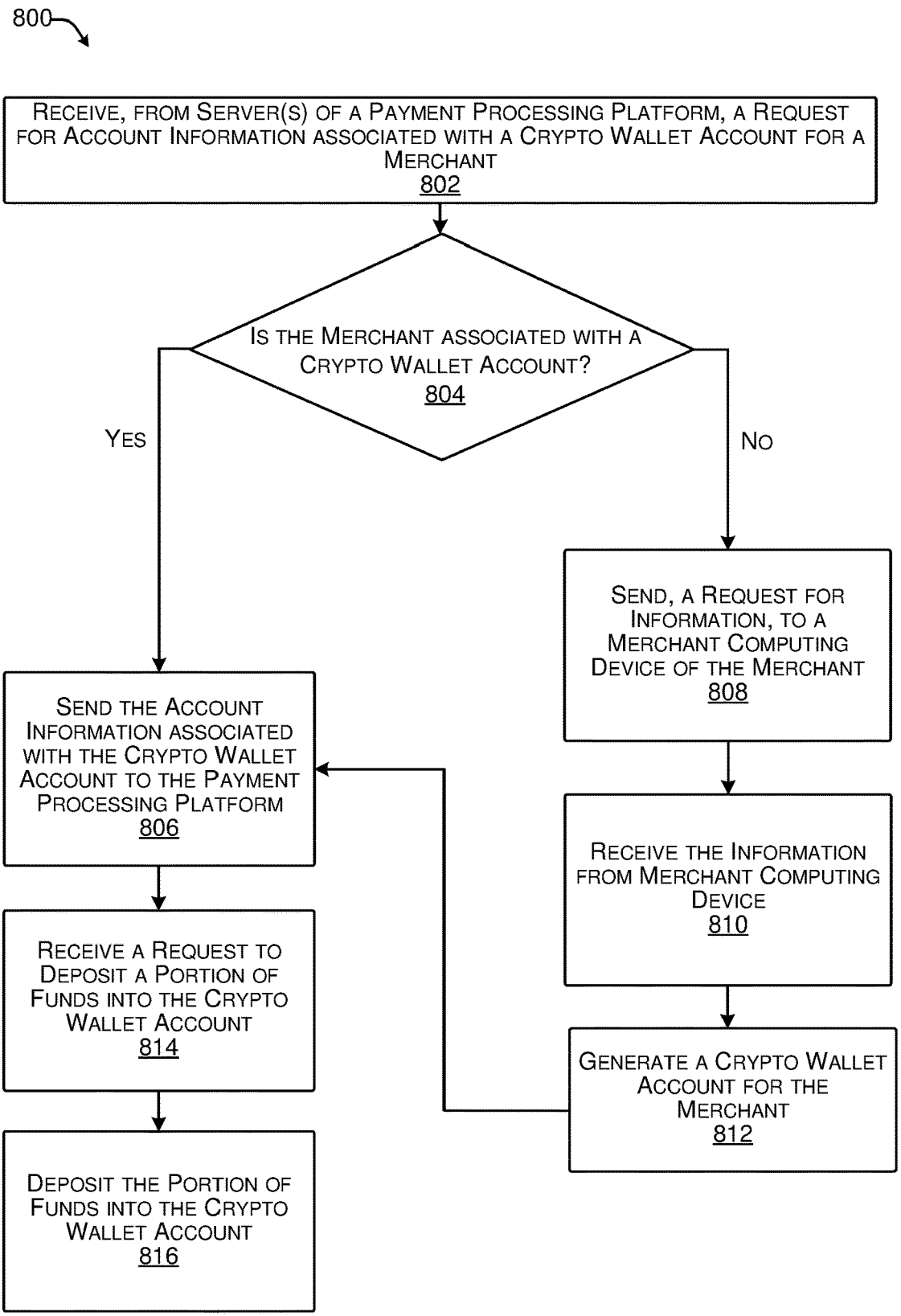
FIG. 8 illustrates another example process for allocating portions of funds from transaction(s) of a merchant into different accounts of the merchant, wherein at least one account is a cryptocurrency wallet account of the merchant, as described herein.

FIG. 8 illustrates another example process 800 for allocating portions of funds from transaction(s) of a merchant into different accounts of the merchant, wherein at least one account is a cryptocurrency wallet account of the merchant 306.

At operation 802, the cryptocurrency management component 110 can receive a request for account information associated with a cryptocurrency wallet account of a merchant 306. In at least one example, the payment processing component 114 can send such a request, as described above with reference to operation 708 of FIG. 7. In at least one example, the request can include an identifier of the merchant 306, such as a unique identifier that can be linked to a user account of a user of the P2P payment platform. In at least one example, the cryptocurrency management component 110 can determine whether the merchant 306 (e.g., the identifier) is associated with a cryptocurrency wallet account (e.g., in the data store(s) 112 associated therewith), as illustrated at operation 804.

In at least one example, based on a determination that the merchant 306 (e.g., the identifier) is associated with a cryptocurrency wallet account (i.e., "yes" at operation 804), the cryptocurrency management component 110 can send account information associated therewith to the payment processing server(s) 104, as illustrated at operation 806. In some examples, a cryptocurrency wallet account can be generated prior to having received the request at operation 802. For example, the merchant 306 can interact with an instance of the mobile payment application 202 and/or the POS application 302 to provide information for generating a cryptocurrency wallet account prior to receiving the request at operation 802.

In at least one example, based on a determination that the identifier is not associated with a cryptocurrency wallet account (i.e., "no" at operation 804), the cryptocurrency management component 110 can initiate a process to generate a new cryptocurrency wallet account. That is, in some examples, the merchant 306, may not have an account with the P2P payment platform. In some examples, the merchant 306 may have an account with the P2P payment platform but may not have opted into using cryptocurrency on the P2P payment platform and/or the cryptocurrency wallet account has not been generated.

At operation 808, the cryptocurrency management component 110 can send a request for information to a merchant computing device 304 of the merchant 306. In some examples, the cryptocurrency management component 110 can send a request for information to the mobile payment application 202 associated with the P2P payment platform and/or the POS application 302 associated with the payment processing platform. In at least one example, the mobile payment application 202 and/or the POS application 302 can present a user interface to prompt the merchant to input information for generating the cryptocurrency wallet account. In some examples, the user interface can present virtual and/or digital currency terms and conditions, request information for identity verification, and/or the like. In response to receiving the requested information (e.g., from the mobile payment application 202 and/or the POS application 302 (via the payment processing component 114)), as illustrated at operation 810, the cryptocurrency management component 110 can generate a cryptocurrency wallet account for the merchant 306, as illustrated at operation 812, and can send the account information associated therewith to the payment processing server(s) 104. In at least one example, the cryptocurrency wallet account can be associated with user wallet key(s) that can be stored in user account data associated with a user account of the merchant 306. In at least one example, such an account can be associated with a cryptocurrency ledger, that can be associated with a user account of the merchant 306. In at least one example, the cryptocurrency wallet account can be associated with account information, such as an address or other account identifier.

At operation 806, the cryptocurrency management component 110 can send account information associated with the cryptocurrency wallet account to the payment processing server(s) 104.

At operation 814, the cryptocurrency management component 110 can receive a request to deposit a portion of funds into the cryptocurrency wallet account. In at least one example, based at least in part on capturing funds associated with authorization request(s), the payment processing component 114 can send such a request to the P2P server(s) 102, as illustrated at operation 718 of FIG. 7 above. That is, the payment processing component 114 can send an instruction to the P2P server(s) 102 to deposit at least a portion of the funds captured into the cryptocurrency wallet account of the merchant 306.

In some examples, the funds can be received in a currency different than cryptocurrency. As such, in at least one example, the cryptocurrency management component 110 can convert the funds into cryptocurrency. For example, if the funds are received in a fiat currency and are to be deposited, at least in part, as cryptocurrency (e.g., into the cryptocurrency wallet account of the merchant 306), the cryptocurrency management component 110 can determine, for the portion of the funds that is to be deposited as cryptocurrency, a value owed to the merchant in cryptocurrency using an exchange rate between the fiat currency and the cryptocurrency. That is, the cryptocurrency management component 110 can determine a number of cryptocurrency units equivalent to the portion of fiat currency funds to be deposited into the cryptocurrency wallet account of the merchant 306. In some examples, the request can be associated with an indication of the value owed to the merchant in cryptocurrency (e.g., the payment processing component 114 can have already performed the conversion).

At operation 816, the cryptocurrency management component 110 can deposit the portion of funds into the cryptocurrency wallet account. In some examples, the cryptocurrency management component 110 can receive the indication and can debit the cryptocurrency ledger associated with the P2P payment platform and credit the cryptocurrency ledger associated with the account of the merchant 306 with the same value or a value based on the same value. In some examples, the amount credited to the cryptocurrency ledger can be less than the same value based on processing fees. In some examples, the amount credited to the cryptocurrency ledger can be more than the same value based on incentives or rewards. By crediting the cryptocurrency ledger of the merchant 306, the balance of the cryptocurrency wallet account of the merchant 306 can increase. In some examples, the credit can be applied to the cryptocurrency ledger at the time the funds and/or instruction is received. In some examples, the credit can be applied to the cryptocurrency ledger at a later time, which can be determined based on a current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like.

In some examples, the cryptocurrency management component 110 can buy cryptocurrency, using the funds received from the payment processing server(s) 104. In some examples, the cryptocurrency management component 110 can purchase the cryptocurrency at the time the funds and/or instruction is received. In some examples, the cryptocurrency management component 110 can associate the funds with the appropriate ledger and purchase the cryptocurrency at a later time, which can be determined based on a current exchange rate, exchange rate trends, events (e.g., an instruction from the merchant 306, a number of transactions, a value of the cryptocurrency, at a particular date and/or time, etc.), rules (e.g., after a period of time has lapsed, at a particular frequency, etc.), and/or the like.

In some examples, the cryptocurrency management component 116 can buy cryptocurrency based on the conversion described above or otherwise allocate cryptocurrency to the user (e.g., based on balancing ledgers of the payment processing platform) and can associate such cryptocurrency with the crypto deposit instruction 514. In such an example, the cryptocurrency management component 110 can receive the funds in the currency to be deposited in the cryptocurrency wallet account and can deposit the funds in the cryptocurrency wallet account of the merchant 306.

FIGS. 9A-17 illustrate example graphical user interfaces (GUIs) that can present information for facilitating techniques described herein. The GUIs illustrated in FIGS. 9A-17 are merely examples and, in additional or alternative examples, the content and/or configurations can be different than illustrated. Further, while described as graphical user interfaces, in additional or alternative examples, the same or similar data can be output via an additional or alternative interface such as sonic user interface (e.g., sound) and/or the like. The GUIs are described below with reference to user interface elements. Such elements can be graphics, text, logos, images, videos, etc. In some examples, such elements can be associated with actuation mechanisms and can therefore be interactable or selectable. Additional details are described below.

Figures 9A, 9B:
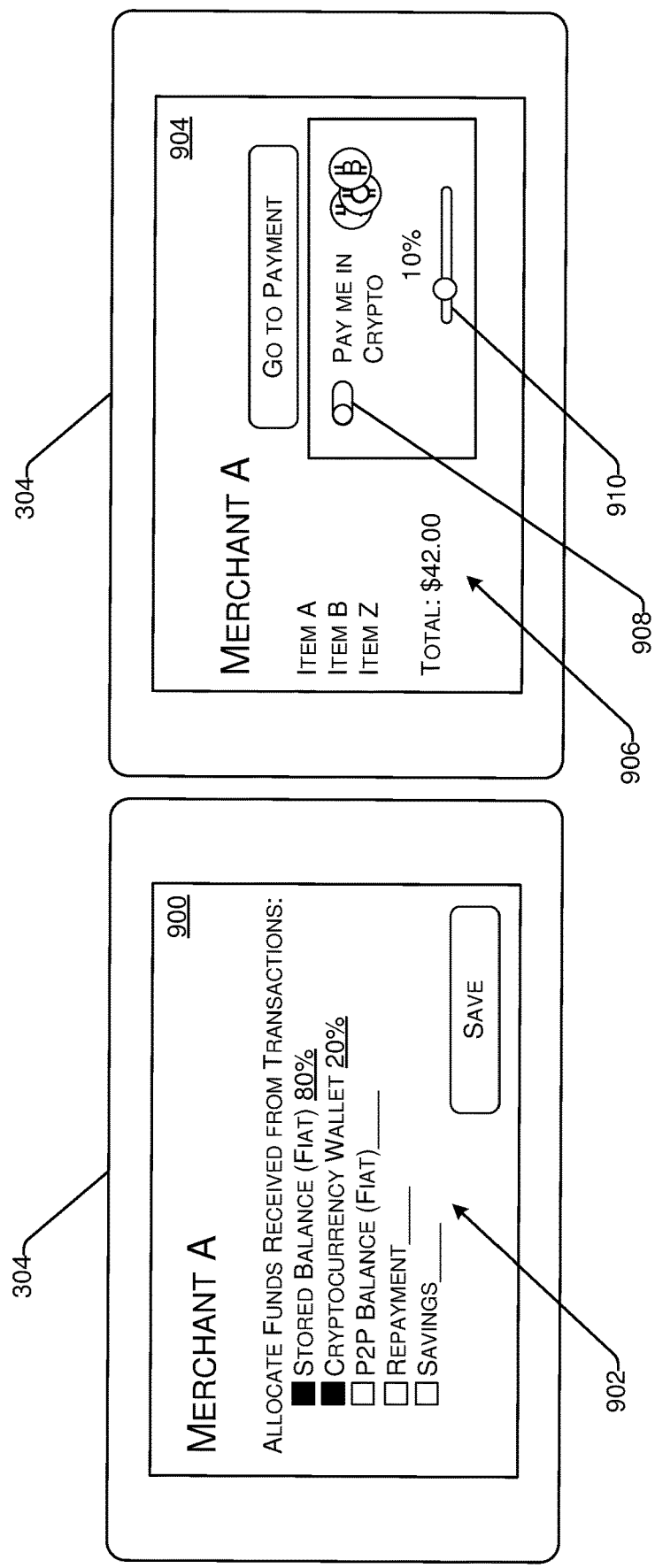
FIG. 9A illustrates an example of a graphical user interface for receiving merchant input associated with payment allocation, as described herein.
FIG. 9B illustrates another example of a graphical user interface for receiving merchant input associated with payment allocation, as described herein.

FIG. 9A illustrates an example of a GUI 900 for receiving merchant input associated with payment allocation. As described herein, the POS application 302 can present, via the merchant computing device 304, information via a user interface, such as the GUI 900. In at least one example, the GUI 900 can include one or more user interface elements 902 that enable the merchant 306 to designate how funds received from payments for transaction(s) processed by the payment processing platform are to be allocated among accounts of the merchant 306. In some examples, if the merchant 306 only has one account, the merchant 306 may not have the option to allocate funds among accounts. In some examples, the merchant 306 can be presented with the option to allocate funds among accounts and, if the merchant 306 does not have an account configured, techniques described herein can facilitate account generation for the merchant 306. For example, if the merchant 306 (e.g., an account of the merchant) is not associated with a cryptocurrency wallet account, as described above the P2P payment platform can facilitate the generation of such an account. Additional details are described below.

In some examples, the GUI 900 can be presented such that the merchant 306 can designate percentages, or other portions, of funds to be allocated to different accounts. In some examples, such a setting can be associated with the merchant account so that when the payment processing component 114 determines an amount to allocate to one or more accounts (e.g., at the encircled 4 of FIG. 5 or the encircled 2 of FIG. 6), such a setting can indicate the amount. In some examples, if the merchant 306 has multiple of a same type of account (e.g., multiple cryptocurrency wallet accounts), the merchant 306 can designate which cryptocurrency wallet account(s) the funds are to be deposited in.

In some examples, as described above, the merchant 306 can indicate that they want funds allocated among multiple accounts but may not designate percentages or the like. In some examples, the payment processing component 114 can utilize machine-trained model(s) or the like to determine how to allocate funds among multiple accounts, as described above.

In at least one example, inputs to the GUI 900 can be sent from the POS application 302 to the payment processing server(s) 104 and, in some examples, can be stored in association with a merchant account of the merchant 306. In some examples, the GUI 900 can apply a setting that applies to all transactions until the setting is updated or overridden.

In some examples, the merchant 306 can provide input on a per-transaction basis. That is, in some examples, as illustrated in FIG. 9B, the POS application 302 can present a GUI 904 that enables the merchant 306 to indicate that a portion of funds associated with the current transaction is to be deposited into a cryptocurrency wallet account of the merchant 306. As illustrated in FIG. 9B, the GUI 904 can include one or more user interface elements 906 representative of transaction data associated with the transaction. In at least one example, the GUI 904 can include a user interface element 908 that enables the merchant 306 to toggle on or off payment, or partial payment, in cryptocurrency. In at least one example, the GUI 904 can include a user interface element 910 that enables the merchant 306 to designate a percentage of funds associated with the transaction to be deposited into a cryptocurrency wallet account of the merchant 306. In FIG. 9B, the user interface element 910 can comprise a slider wherein a first user interface element (e.g., the knob or lever) can move relative to a second user interface element (e.g., a bar) to control a variable (e.g., a percentage of funds to be deposited into a cryptocurrency wallet account of the merchant 306). In at least one example, based at least in part on the merchant 306 interacting with the user interface element 910, the POS application 302 can send an indication of such (e.g., that the merchant 306 desires to have a portion of the funds associated with this transaction allocated to their cryptocurrency wallet account and, in some examples, an amount as designated by the merchant 306).

In some examples, a radio control, a check box, or other actuation mechanism can be presented via the GUI 904 to enable the merchant 306 to indicate that they would like to receive at least a portion of funds associated with the transaction via cryptocurrency. In some such examples, the payment processing component 114 can look to the merchant's account to determine if the account is associated with a setting or other rule indicating a default amount to allocate to the cryptocurrency wallet account of the merchant 306. In some such examples, the payment processing component 114 can use one or more machine-trained models to automatically determine the amount to allocate to the cryptocurrency wallet account of the merchant 306, as described above.

While FIGS. 9A and 9B illustrate GUIs that can be presented via the POS application 302, in some examples, the merchant 306 can provide an instruction to allocate a portion of funds received from their transactions to their cryptocurrency wallet account via the mobile payment application 202. Further, in some examples, such an instruction can be provided via a third-party platform integrated with the P2P payment platform and/or the payment processing platform.

FIG. 10 illustrates an example GUI 1000 for providing information to generate a cryptocurrency wallet, as described herein. In some examples, the P2P payment platform can cause the GUI 1000 to be presented via the mobile application 202 on a user computing device 204. In some examples, the user computing device 204 is the same computing device as the merchant computing device 304. In at least one example, the GUI 1000 can include one or more user interface elements 1002 to prompt the merchant 306 to provide information (e.g., user identifier, password, name, account number, etc.) to facilitate account generation. In at least one example, the GUI 1000 can correspond to a "configuration user interface," which enables the merchant 306 to input information for generating a cryptocurrency wallet account. In at least one example, the GUI 1000 can include an actuation mechanism 1004 that, when actuated, can cause the mobile payment application 202 to send an indication of such (and the information input via the GUI 1000) to the cryptocurrency management component 110.

The cryptocurrency management component 110 can generate a cryptocurrency wallet account for the merchant 306. In at least one example, generating such a wallet account can cause a data structure to be generated and associated with an address to indicate the location of the data structure. In at least one example, one or more cryptocurrency ledgers can be mapped to, or otherwise associated with, the data structure. In at least one example, based at least in part on generating the cryptocurrency wallet account, the cryptocurrency management component 110 can cause a new GUI 1100 to be presented via the mobile payment application 202, as illustrated in FIG. 11.

FIG. 11 illustrates an example GUI 1100 for presenting information associated with a cryptocurrency wallet account of the merchant 306. In at least one example, the GUI 1100 can include one or more user interface elements 1102 indicating account details associated with the cryptocurrency wallet account of the merchant 306. In some examples, the GUI 1100 can include one or more actuation mechanisms 1104, 1106, 1108, 1110 to enable the merchant 306 to fund the cryptocurrency wallet account (e.g., "buy" 1104 or "transfer" 1106), share the address of the cryptocurrency wallet account with other users or service providers (e.g., "copy" 1108), and/or link the cryptocurrency wallet account to one or more other accounts of the merchant 306 (e.g., "link" 1110).

While described as being presented via the mobile payment application 202, in some examples, the same or similar GUI(s) 1000 and/or 1100 can be presented via the POS application 302, for example, via the merchant computing device 304.

Figures 12, 13:
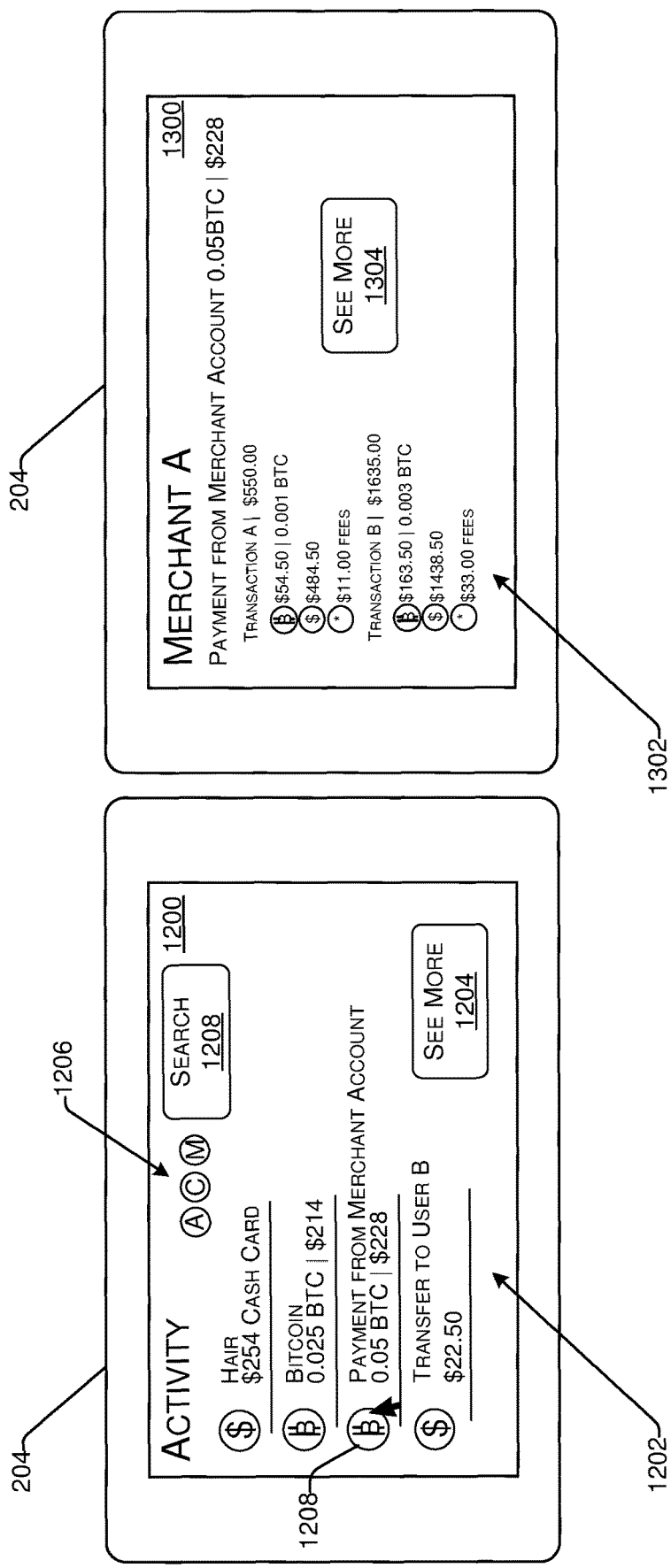
FIG. 12 illustrates an example graphical user interface for presenting activity information associated with a user account, as described herein.
FIG. 13 illustrates an example graphical user interface for enabling a user to view one or more transactions associated with an entry of activity information in FIG. 12, as described herein.

FIG. 12 illustrates an example GUI 1200 for presenting activity information associated with a user account, as described herein. In at least one example, the P2P payment platform can aggregate data associated with one or more accounts of users for presentation via such a GUI 1200. In at least one example, the GUI 1200 can include one or more user interface elements 1202 representative of one or more transactions associated with one or more accounts of the user. In FIG. 12, two of the illustrated transactions are associated with the cryptocurrency wallet account of the merchant 306 (e.g., BTC transactions) and two of the illustrated transactions are associated with another account of the merchant 306 (e.g., fiat currency). In some examples, the GUI 1200 may not be able to present all of the transactions of the merchant 306 (e.g., due to space/size constraints of the display). As such, in some examples, the GUI 1200 can include an actuation mechanism 1204 that enables the merchant 306 to view additional or alternative transactions and associated transaction data. In some examples, the merchant 306 can scroll or pan to view additional or alternative data. In some examples, the GUI 1200 can include one or more user interface elements 1206 representative of other users with which the merchant 306 has recently interacted (e.g., sent or received funds, participated in a transaction, etc.). In some examples, the user interface element(s) 1206 can be selectable such that when selected, the merchant 306 can access information associated with the corresponding user (e.g., user identifier, user contact information, transaction history with that user, etc.). In some examples, the GUI 1208 can include an actuation mechanism 1208 to enable the merchant 306 to search for transactions, users, or other information associated with the P2P payment platform.

In some examples, individual of the user interface elements 1202 can represent a batch of transactions. For example, the entry associated with user interface element 1208 can represent cryptocurrency funds deposited based on allocation from a plurality of transactions associated with the merchant 306. As described above, the payment processing component 114 and/or the cryptocurrency management component 110 can cause a portion of funds generated from a plurality of transactions to be deposited into a cryptocurrency wallet account of the merchant 306. Batching transactions together and performing the conversion described above (e.g., from fiat currency to cryptocurrency) on the batch of transactions can provide efficiencies with respect to how those transactions are recorded on the blockchain. For example, recording each of the transactions individually can be computationally intensive (due to the amount of data associated with generating a block to be added to the blockchain) and costly. In contrast, by batching transactions together, the amount of data required to record the associated transactions together on the blockchain is less than if done individually.

In at least one example, the merchant 306 can interact with the user interface element 1208 (e.g., actuate an actuation mechanism associated therewith) to view details associated with the batch of transactions represented by the entry associated with the user interface element 1208. FIG. 13 illustrates an example GUI 1300 for enabling a user to view activity associated with multiple transactions that are batched as described above. In at least one example, the GUI 1300 can include one or more user interface elements 1302 representative of transaction data associated with each of the transactions associated with the batch. If user interface elements associated with each of the transactions do not fit on the GUI 1300, the merchant 306 can interact with the GUI 1300 to view additional data, for example, by interacting with an actuation mechanism 1304, scrolling, panning, or the like.

As described herein, the P2P payment platform can manage one or more accounts for users associated therewith. In some examples, a user, such as the merchant 306, can desire to view information associated with one of the accounts (e.g., instead of an aggregated view as illustrated and described in FIG. 12). FIG. 14 illustrates an example GUI 1400 that can be presented to enable the merchant 306 to view activity data associated with a single account. That is, the GUI 1400 can present activity information associated with a cryptocurrency wallet account of the merchant 306. In at least one example, the GUI 1400 can include one or more user interface elements 1402 that can represent one or more transactions involving the particular account of the merchant (e.g., the cryptocurrency wallet account). As described above, the merchant 306 can buy or sell cryptocurrency via a private blockchain associated with the P2P payment platform or a public blockchain associated with a cryptocurrency network 212. In some examples, the P2P server(s) 102 can facilitate such transactions. In at least one example, such transactions can be represented by the user interface element(s) 1402. As described above, the merchant 306 can transfer cryptocurrency funds from other cryptocurrency wallet accounts (e.g., third-party cryptocurrency wallet accounts) and such transactions can be represented by the user interface element(s) 1402. In some examples, at least a portion of funds generated from payments for transaction(s) processed by the payment processing platform can be deposited into the cryptocurrency wallet account of the merchant 306. Such transactions can be represented by the user interface element(s) 1402. In at least one example, the GUI 1400 can include one or more mechanisms to enable the merchant 306 to buy cryptocurrency (e.g., actuation mechanism 1404), transfer cryptocurrency (e.g., actuation mechanism 1406), and/or sell cryptocurrency (e.g., actuation mechanism 1408). In some examples, the GUI 1400 can include one or more user interface elements 1410 that can provide information associated with exchange rates and/or trends to enable the merchant 306 to determine when to buy, transfer, and/or sell such funds.

FIG. 15 illustrates an example GUI 1500 for setting parameters associated with a cryptocurrency wallet account of a user, as described herein. In some examples, as described above, the merchant 306 can set parameters associated with individual of their accounts such that the P2P payment platform can utilize logic to ensure compliance with such parameters. The GUI 1500 is an example of a GUI wherein the merchant 306 can designate a maximum amount of cryptocurrency to be held at a particular time. Such a designation can be provided to the cryptocurrency management component 110 to ensure that cryptocurrency is sold when the balance of the cryptocurrency wallet account of the merchant 306 exceeds $5000.

Figures 16A, 16B:
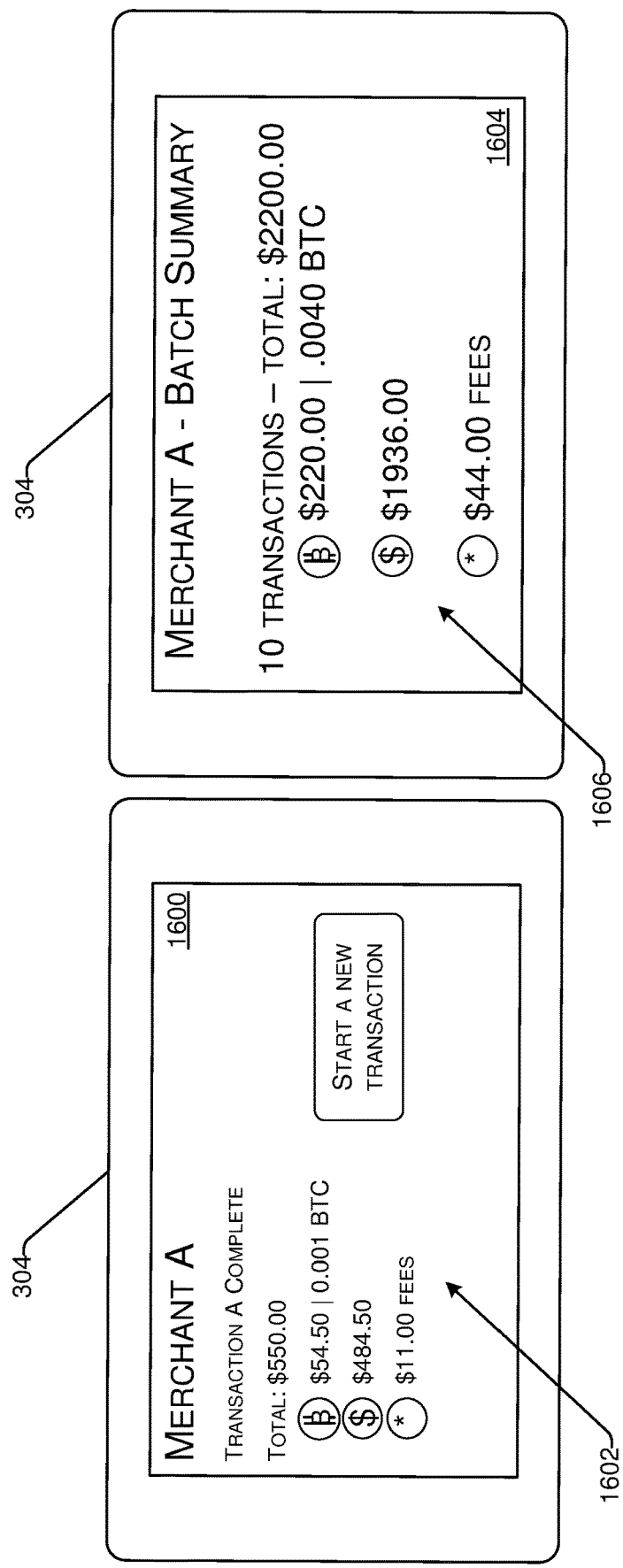
FIG. 16A illustrates an example graphical user interface for presenting a notification of a completion of a transaction and/or a summary of payment allocation associated with the transaction, as described herein.
FIG. 16B illustrates an example graphical user interface for presenting a notification of a completion of a batch of transactions and/or a summary of payment allocation associated with the batch of transactions, as described herein.

FIG. 16A illustrates an example GUI 1600 for presenting a notification of a completion of a transaction and/or a summary of payment allocation associated with the transaction. In at least one example, as described above, the payment processing component 114 can send a notification to the merchant computing device 304 indicating that the transaction has been completed. In at least one example, the notification or a GUI generated based thereon can be presented via the POS application 302. The GUI 1600 is an example of such a GUI. In at least one example, the GUI 1600 can include one or more user interface elements 1602 representative of one or more accounts to which funds were allocated. The GUI 1600 is an example of a GUI 1600 that provides information associated with a single transaction. However, as described above, in some example, the payment processing component 114 can process multiple transactions (i.e., a batch of transactions) at the same time. FIG. 16B illustrates an example GUI 1604 for presenting a notification of a completion of a batch of transactions and/or a summary of payment allocation associated with the batch of transactions. The GUI 1604 can include one or more user interface elements 1606 representative of one or more accounts to which funds were allocated. In some examples, the merchant 306 can interact with individual of the user interface element(s) 1606 to view additional transaction data, such as a breakdown of the individual allocations per transaction or the like.

Figure 17:
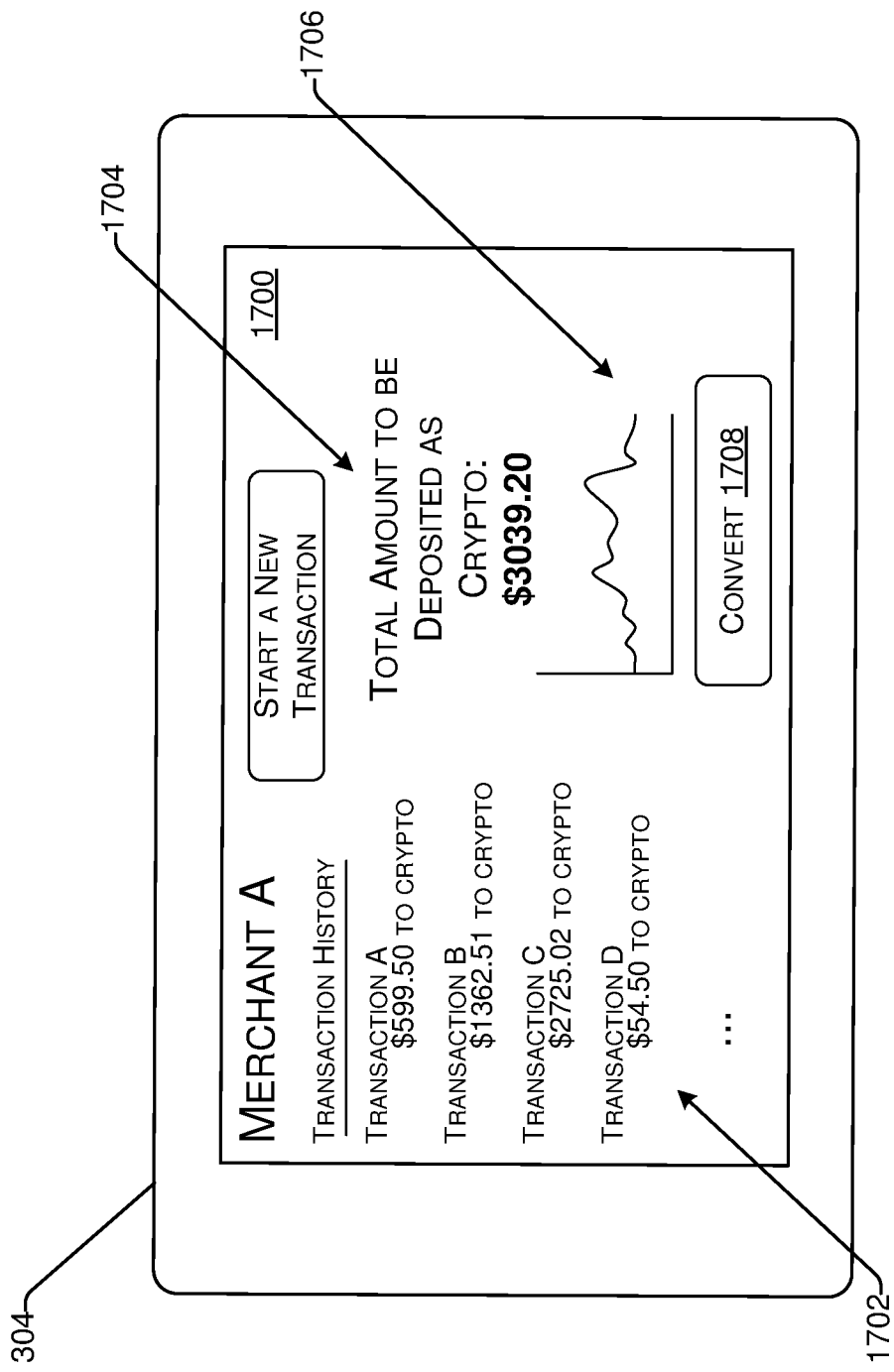
FIG. 17 illustrates an example graphical user interface for enabling a merchant to provide an instruction to convert fiat currency funds withheld for conversion to cryptocurrency at a time other than a default time, as described herein.

FIG. 17 illustrates an example GUI 1700 for enabling a merchant to provide an instruction to convert fiat currency funds withheld for conversion to cryptocurrency at a time other than a default time. In some examples, as described above, a conversion from a first currency (e.g., fiat currency) to a second currency (e.g., cryptocurrency) can be performed at the time funds are captured for a particular transaction. In some examples, a conversion can be performed after a lapse of a period of time, at a particular frequency, in response to an event, or the like. In some examples, as described above, the payment processing component 114 and/or the cryptocurrency management component 110 can refrain from converting funds withheld from a transaction until a period of time has lapsed. In some examples, such a period of time can correspond to the business hours of the merchant 306. In some examples, a frequency can correspond to an hourly, daily, weekly, etc. conversion period. In some examples, an event can correspond to a date (e.g., end of the month), time (e.g., end of the day), a number of transactions, a designated value, a conversion rate trend (e.g., conversion rate is increasing or decreasing at a rate that satisfies a threshold), a request from a merchant, or the like. In some examples, the payment processing platform can convert funds withheld from transactions for deposit into cryptocurrency wallet accounts of one or more merchants associated with the payment processing platform at a default time (e.g., after a period of time has lapsed, a particular frequency, an occurrence of an event, etc.). In some examples, the merchant 306 can provide an instruction to convert funds prior to the default time or after the default time, for example, via an interaction with the GUI 1700.

In at least one example, the GUI 1700 can include one or more user interface elements 1702 representative of transaction data associated with transactions processed by the payment processing platform for the merchant 306. In at least one example, the GUI 1700 can include one or more user interface elements 1704 that provide an indication of an amount of funds that have been withheld from deposit into the merchant account (i.e., in fiat currency). In at least one example, the GUI 1700 can include one or more user interface elements 1706 that provide data associated with the conversion rate(s) between fiat currency and one or more cryptocurrencies. In at least one example, the merchant 306 can monitor the conversion rate(s) and can interact with an actuation mechanism 1708 associated with the GUI 1700 to effectuate a conversion at a particular time. In at least one example, based at least in part on detecting actuation of the actuation mechanism 1708, the payment processing component 114 can convert the fiat currency to cryptocurrency based at least in part on the current conversion rate and/or can send an instruction to the cryptocurrency management component 110 to convert the fiat currency to cryptocurrency.

Figure 18:
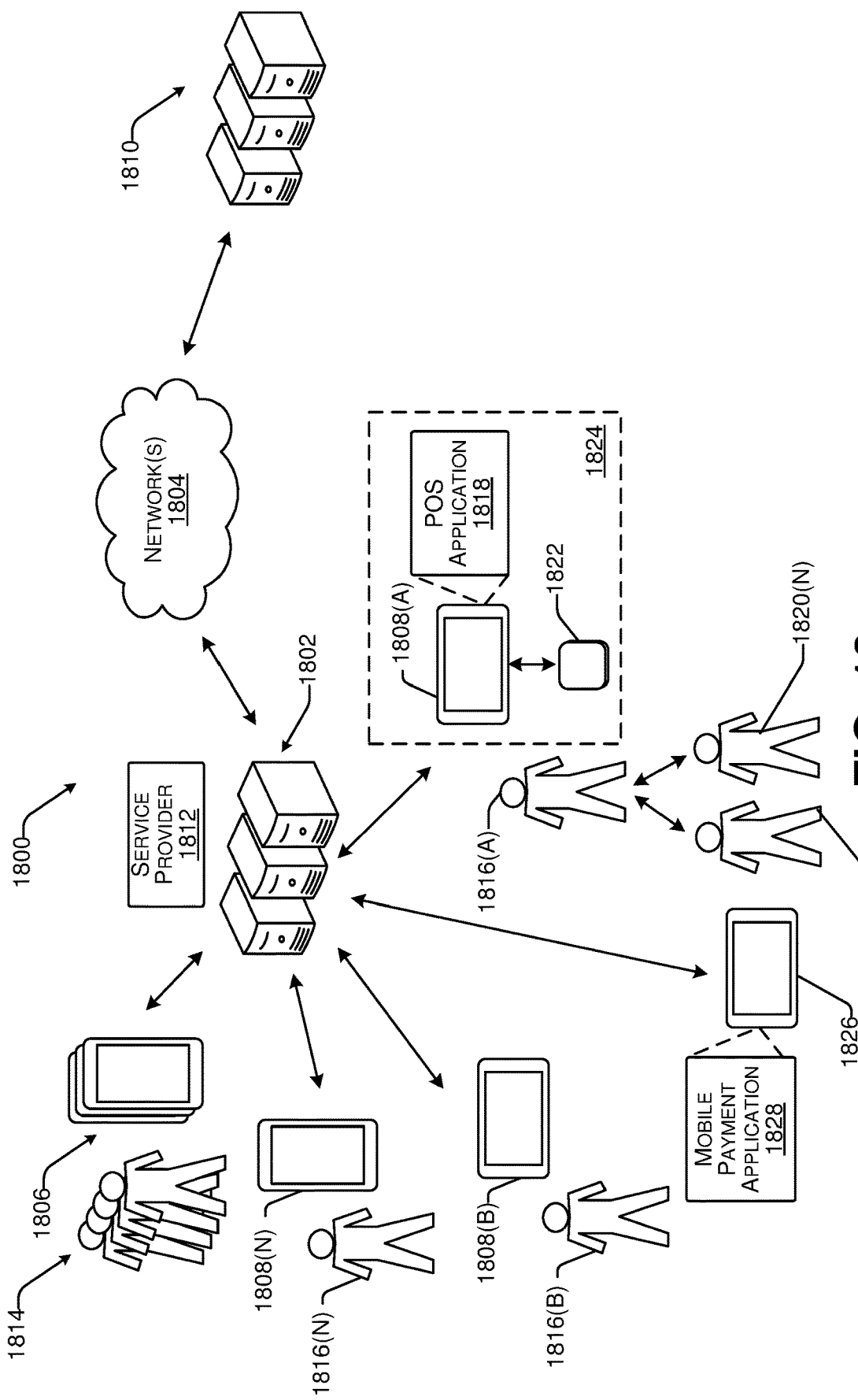
FIG. 18 illustrates an example environment for performing techniques described herein.

FIG. 18 illustrates an example environment 1800. The environment 1800 includes server computing device(s) 1802 that can communicate over network(s) 1804 with user devices 1806 (which, in some examples can be merchant devices 1808 (individually, 1808(A)-1808(N))) and/or server computing device(s) 1810 associated with third-party service provider(s). The server computing device(s) 1802 can be associated with a service provider 1812 that can provide one or more services for the benefit of users 1814, as described below. Actions attributed to the service provider 1812 can be performed by the server computing device(s) 1802.

In at least one example, such as when the P2P payment platform and the payment processing platform are associated with a same service provider (e.g., the service provider 1812), the server computing device(s) 1802 can correspond to the P2P server(s) 102 and/or the payment processing server(s) 104 described above with reference to FIG. 1. In an example where the P2P payment platform and the payment processing platform are not associated with a same service provider, either the P2P server(s) 102 or the payment processing server(s) 104 can be associated with the server computing device(s) 1810 associated with third-party service provider(s). In at least one example, the network(s) 1804 can correspond with the network(s) 106 of FIG. 1.

The environment 1800 can include a plurality of user devices 1806, as described above. The individual of the user devices 1806 can correspond with the user computing device(s) 126, as described above with reference to FIG. 1. Each one of the plurality of user devices 1806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1814. The users 1814, which can correspond to the user(s) 128 of FIG. 1, can be referred to as customers, buyers, merchants, sellers, borrowers, employees, employers, payors, payees, couriers and so on. The users 1814 can interact with the user devices 1806 via user interfaces presented via the user devices 1806. In at least one example, a user interface can be presented via a web browser, or the like. In other examples, a user interface can be presented via an application, such as a mobile application or desktop application, which can be provided by the service provider 1812 or which can be an otherwise dedicated application. In some examples, individual of the user devices 1806 can have an instance or versioned instance of an application, which can be downloaded from an application store, for example, which can present the user interface(s) described herein. Examples of such an application include the mobile payment application 202, the POS application 302, or the like. In at least one example, a user 1814 can interact with the user interface via touch input, spoken input, or any other type of input.

As described above, in at least one example, the users 1814 can include merchants 1816 (individually, 1816(A)-1816(N)). In an example, the merchants 1816 can operate respective merchant devices 1808, which can be user devices 1806 configured for use by merchants 1816. For the purpose of this discussion, a "merchant" can be any entity that offers items (e.g., goods or services) for purchase or other means of acquisition (e.g., rent, borrow, barter, etc.). The merchants 1816 can offer items for purchase or other means of acquisition via brick-and-mortar stores, mobile stores (e.g., pop-up shops, food trucks, etc.), online stores, combinations of the foregoing, and so forth. In some examples, at least some of the merchants 1816 can be associated with a same entity but can have different merchant locations and/or can have franchise/franchisee relationships. In additional or alternative examples, the merchants 1816 can be different merchants. That is, in at least one example, the merchant 1816(A) is a different merchant than the merchant 1816(B) and/or the merchant 1816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1808 can have an instance of a POS application 1818 stored thereon. The POS application 1818 can correspond to the POS application 302 described above with reference to FIG. 3. The POS application 1818 can configure the merchant device 1808 as a POS terminal, which enables the merchant 1816(A) to interact with one or more customers 1820. As described above, the users 1814 can include customers, such as the customers 1820 shown as interacting with the merchant 1816(A). For the purpose of this discussion, a "customer" can be any entity that acquires items from merchants. While only two customers 1820 are illustrated in FIG. 18, any number of customers 1820 can interact with the merchants 1816. Further, while FIG. 18 illustrates the customers 1820 interacting with the merchant 1816(A), the customers 1820 can interact with any of the merchants 1816.

In at least one example, interactions between the customers 1820 and the merchants 1816 that involve the exchange of funds (from the customers 1820) for items (from the merchants 1816) can be referred to as "transactions." In at least one example, the POS application 1818 can determine transaction data associated with the POS transactions. Transaction data can include payment information, which can be obtained from a reader device 1822 associated with the merchant device 1808(A), user authentication data, purchase amount information, point-of-purchase information (e.g., item(s) purchased, date of purchase, time of purchase, etc.), etc. The POS application 1818 can send transaction data to the server computing device(s) 1802. Furthermore, the POS application 1818 can present a UI to enable the merchant 1816(A) to interact with the POS application 1818 and/or the service provider 1812 via the POS application 1818.

In at least one example, the merchant device 1808(A) can be a special-purpose computing device configured as a POS terminal (via the execution of the POS application 1818). In at least one example, the POS terminal may be connected to a reader device 1822, which is capable of accepting a variety of payment instruments, such as credit cards, debit cards, gift cards, short-range communication-based payment instruments, and the like, as described below. In at least one example, the reader device 1822 can plug in to a port in the merchant device 1808(A), such as a microphone port, a headphone port, an audio-jack, a data port, or other suitable port. In additional or alternative examples, the reader device 1822 can be coupled to the merchant device 1808(A) via another wired or wireless connection, such as via a Bluetooth®, BLE, and so on. Additional details are described below with reference to FIG. 18. In some examples, the reader device 1822 can read information from alternative payment instruments including, but not limited to, wristbands and the like.

In some examples, the reader device 1822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1822, and communicate with the server computing device(s) 1802, which can provide, among other services, a payment processing platform. The server computing device(s) 1802 associated with the service provider 1812 can communicate with server computing device(s) 1810, as described below. In this manner, the POS terminal and reader device 1822 may collectively process transaction(s) between the merchants 1816 (e.g., merchant 1816(A)-1816(N)) and customers 1820 (e.g., customer 1820 (A)-1820(N)). In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-ofthe-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1822 of the POS system 1824 are shown as separate devices, in additional or alternative examples, the POS terminal and the reader device 1822 can be part of a single device. In some examples, the reader device 1822 can have a display integrated therein for presenting information to the customers 1820. In additional or alternative examples, the POS terminal can have a display integrated therein for presenting information to the customers 1820. POS systems, such as the POS system 1824, may be mobile, such that POS terminals and reader devices may process transactions in disparate locations across the world. POS systems can be used for processing card-present transactions and card-not-present (CNP) transactions, as described below.

A card-present transaction is a transaction where both a customer 1820 and his or her payment instrument are physically present at the time of the transaction. Card-present transactions may be processed by swipes, dips, taps, or any other interaction between a physical payment instrument (e.g., a card), or otherwise present payment instrument, and a reader device 1822 whereby the reader device 1822 is able to obtain payment data from the payment instrument. A swipe is a card-present transaction where a customer 1820 (A) slides a card, or other payment instrument, having a magnetic strip through a reader device 1822 that captures payment data contained in the magnetic strip. A dip is a card-present transaction where a customer 1820(A) inserts a payment instrument having an embedded microchip (i.e., chip) into a reader device 1822 first. The dipped payment instrument remains in the payment reader until the reader device 1822 prompts the customer 1820(A) to remove the card, or other payment instrument. While the payment instrument is in the reader device 1822, the microchip can create a one-time code which is sent from the POS system 1824 to the server computing device(s) 1810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1820 may tap or hover his or her payment instrument (e.g., card, electronic device such as a smart phone running a payment application, etc.) over a reader device 1822 to complete a transaction via short-range communication (e.g., NFC, RFID, Bluetooth®, BLE, etc.). Short-range communication enables the payment instrument to exchange information with the reader device 1822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

In at least one example, a customer 1820(A) can interact with one of the user devices 1806 (e.g., a customer device 1826). In at least one example, the customer device 1826 can have an instance of a mobile payment application 1828 installed thereon. The mobile payment application 1828 can correspond to the mobile payment application 202 described above with reference to FIG. 2. In at least one example, the mobile payment application 1828 can present one or more user interfaces to enable the customer 1820(A) to send and/or receive funds via a P2P payment platform, as described above. In some examples, the mobile payment application 108 can facilitate cryptocurrency wallet account generation and/or management.

The POS system 1824, the server computing device(s) 1802, and/or the server computing device(s) 1810 may exchange payment information and transaction data to determine whether transactions are authorized. For example, the POS system 1824 may provide encrypted payment data, user authentication data, purchase amount information, point-of-purchase information, etc. (collectively, transaction data) to server computing device(s) 1802 over the network(s) 1804. The server computing device(s) 1802 may send some of the transaction data, as described above and otherwise described herein, to the server computing device(s) 1810. As described above, in at least one example, the server computing device(s) 1810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirers"), issuing banks ("issuers"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1810 associated therewith) can send a fund transfer request to a server computing device of a card payment network (e.g., Mastercard®, VISA®, etc.) to determine whether the transaction is authorized or deficient. In at least one example, the service provider 1812 can serve as an acquirer and connect directly with the card payment network.

The card payment network (e.g., the server computing device(s) 1810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1810 associated therewith) can make a determination as to whether the customer has the capacity to absorb the relevant charge associated with the payment transaction. In at least one example, the service provider 1812 can serve as an issuer and/or can partner with an issuer. The transaction is either approved or rejected by the issuer and/or the card payment network (e.g., the server computing device(s) 1810 associated therewith), and a payment authorization message is communicated from the issuer to the POS device via a path opposite of that described above, or via an alternate path.

As described above, the server computing device(s) 1810, which can be associated with payment service provider(s), may determine whether the transaction is authorized based on the transaction data, as well as information relating to parties to the transaction (e.g., the customer 1820 and/or the merchant 1816(A)). The server computing device(s) 1810 may send an authorization notification over the network(s) 1804 to the server computing device(s) 1802, which may send the authorization notification to the POS system 1824 over the network(s) 1804 to indicate whether the transaction is authorized. The server computing device(s) 1802 may also transmit additional information such as transaction identifiers to the POS system 1824. In one example, the server computing device(s) 1802 may include a merchant application and/or other functional components for communicating with the POS system 1824 and/or the server computing device(s) 1810 to authorize or decline transactions.

Based on the authorization notification that is received by the POS system 1824 from server computing device(s) 1802, the merchant 1816(A) may indicate to the customer 1820 whether the transaction has been approved. In some examples, approval may be indicated at the POS system 1824, for example, at a display of the POS system 1824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1812 can provide, among other services, payment processing platforms, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1814 can access all of the services of the service provider 1812. In other examples, the users 1814 can have gradated access to the services, which can be based on risk tolerance, IDV outputs, subscriptions, and so on. In at least one example, access to such services can be availed to the merchants 1816 via the POS application 1818. In additional or alternative examples, each service can be associated with its own access point (e.g., application, web browser, etc.).

The service provider 1812 can offer payment processing platforms for processing payments on behalf of the merchants 1816, as described above. For example, the service provider 1812 can provision payment processing software, payment processing hardware and/or payment processing platforms to merchants 1816, as described above, to enable the merchants 1816 to receive payments from the customers 1820 when conducting POS transactions with the customers 1820. For instance, the service provider 1812 can enable the merchants 1816 to receive cash payments, payment card payments, and/or electronic payments from customers 1820 for POS transactions and the service provider 1812 can process transactions on behalf of the merchants 1816.

As the service provider 1812 processes transactions on behalf of the merchants 1816, the service provider 1812 can maintain accounts or balances for the merchants 1816 in one or more ledgers. For example, the service provider 1812 can analyze transaction data received for a transaction to determine an amount of funds owed to a merchant 1816(A) for the transaction. In at least one example, such an amount can be a total purchase price less fees charged by the service provider 1812 for providing the payment processing platforms. Based on determining the amount of funds owed to the merchant 1816(A), the service provider 1812 can deposit funds into an account of the merchant 1816(A). The account can have a stored balance, which can be managed by the service provider 1812. The account can be different from a conventional bank account at least because the stored balance is managed by a ledger of the service provider 1812 and the associated funds are accessible via various withdrawal channels including, but not limited to, scheduled deposit, same-day deposit, instant deposit, and a linked payment instrument.

A scheduled deposit can occur when the service provider 1812 transfers funds associated with a stored balance of the merchant 1816(A) to a bank account of the merchant 1816 (A) that is held at a bank or other financial institution (e.g., associated with the server computing device(s) 1810). Scheduled deposits can occur at a prearranged time after a POS transaction is funded, which can be a business day after the POS transaction occurred, or sooner or later. In some examples, the merchant 1816(A) can access funds prior to a scheduled deposit. For instance, the merchant 1816(A) may have access to same-day deposits (e.g., wherein the service provider 1812 deposits funds from the stored balance to a linked bank account of the merchant on a same day as POS transaction, in some examples prior to the POS transaction being funded) or instant deposits (e.g., wherein the service provider 1812 deposits funds from the stored balance to a linked bank account of the merchant on demand, such as responsive to a request). Further, in at least one example, the merchant 1816(A) can have a payment instrument that is linked to the stored balance that enables the merchant to access the funds without first transferring the funds from the account managed by the service provider 1812 to the bank account of the merchant 1816(A).

In at least one example, the service provider 1812 may provide inventory management services. That is, the service provider 1812 may provide inventory tracking and reporting. Inventory management services may enable the merchant 1816(A) to access and manage a database storing data associated with a quantity of each item that the merchant 1816(A) has available (i.e., an inventory). Furthermore, in at least one example, the service provider 1812 can provide catalog management services to enable the merchant 1816 (A) to maintain a catalog, which can be a database storing data associated with items that the merchant 1816(A) has available for acquisition (i.e., catalog management services). In at least one example, the catalog may include a plurality of data items and a data item of the plurality of data items may represent an item that the merchant 1861(A) has available for acquisition. The service provider 1812 can offer recommendations related to pricing of the items, placement of items on the catalog, and multi-party fulfilment of the inventory.

In at least one example, the service provider 1812 can provide business banking services, which allow the merchant 1816(A) to track deposits (from payment processing and/or other sources of funds) into an account of the merchant 1816(A), payroll payments from the account (e.g., payments to employees of the merchant 1816(A)), payments to other merchants (e.g., business-to-business) directly from the account or from a linked debit card, withdrawals made via scheduled deposit and/or instant deposit, etc. Furthermore, the business banking services can enable the merchant 1816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1816 to visualize their cash flow to track their financial health, set aside money for upcoming obligations (e.g., savings), organize money around goals, etc.

In at least one example, the service provider 1812 can provide financing services and products, such as via business loans, consumer loans, fixed term loans, flexible term loans, and the like. In at least one example, the service provider 1812 can utilize one or more risk signals to determine whether to extend financing offers and/or terms associated with such financing offers.

In at least one example, the service provider 1812 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1812 can offer different types of capital loan products. For instance, in at least one example, the service provider 1812 can offer a daily repayment loan product, wherein a capital loan is repaid daily, for instance, from a portion of transactions processed by the payment processing platform on behalf of the borrower. Additionally and/or alternatively, the service provider 1812 can offer a monthly repayment loan product, wherein a capital loan is repaid monthly, for instance, via a debit from a bank account linked to the payment processing platform. The credit risk of the merchant may be evaluated using risk models that take into account factors, such as payment volume, credit risk of similarly situated merchants, past transaction history, seasonality, credit history, and so on.

Additionally or alternatively, the service provider 1812 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1816. The service provider 1812 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1812 (e.g., from payments owed to the merchant from payments processed on behalf of the merchant, funds transferred to the merchant, etc.). The service provider 1812 can offer specific financial products, such as payment instruments, tied specifically to the loan products. For example, in one implementation, the service provider 1812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1812 can provide web-development services, which enable users 1814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1816. In at least one example, the service provider 1812 can recommend and/or generate content items to supplement omni-channel presences of the merchants 1816. That is, if a merchant of the merchants 1816 has a web page, the service provider 1812—via the web-development or other services—can recommend and/or generate additional content items to be presented via other channel(s), such as social media, email, etc.

Furthermore, the service provider 1812 can provide payroll services to enable employers to pay employees for work performed on behalf of employers. In at least one example, the service provider 1812 can receive data that includes time worked by an employee (e.g., through imported timecards and/or POS interactions), sales made by the employee, gratuities received by the employee, and so forth. Based on such data, the service provider 1812 can make payroll payments to employee(s) on behalf of an employer via the payroll service. For instance, the service provider 1812 can facilitate the transfer of a total amount to be paid out for the payroll of an employee from the bank of the employer to the bank of the service provider 1812 to be used to make payroll payments. In at least one example, when the funds have been received at the bank of the service provider 1812, the service provider 1812 can pay the employee, such as by check or direct deposit, often a day, a week, or more after when the work was actually performed by the employee. In additional or alternative examples, the service provider 1812 can enable employee(s) to receive payments via same-day or instant deposit based at least in part on risk and/or reliability analyses performed by the service provider 1812.

Moreover, in at least one example, the service provider 1812 can provide employee management services for managing schedules of employees. Further, the service provider 1812 can provide appointment services for enabling users 1814 to set schedules for scheduling appointments and/or users 1814 to schedule appointments.

In some examples, the service provider 1812 can provide restaurant management services to enable users 1814 to make and/or manage reservations, to monitor front-of-house and/or back-of-house operations, and so on. In such examples, the merchant device(s) 1808 and/or server computing device(s) 1802 can be configured to communicate with one or more other computing devices, which can be located in the front-of-house (e.g., POS device(s)) and/or back-of-house (e.g., kitchen display system(s) (KDS)). In at least one example, the service provider 1812 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1812 can provide fulfilment services, which can use couriers for delivery, wherein couriers can travel between multiple locations to provide delivery services, photography services, etc. Couriers can be users 1814 who can travel between locations to perform services for a requesting user 1814 (e.g., deliver items, capture images, etc.). In some examples, the courier can receive compensation from the service provider 1812. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1812 can receive requests for courier services, automatically assign the requests to active couriers, and communicate dispatch instructions to couriers via user interface (e.g., application, web browser, or other access point) presented via respective devices 1806.

In some examples, the service provider 1812 can provide omni-channel fulfillment services. For instance, if a customer places an order with a merchant and the merchant cannot fulfill the order because one or more items are out of stock or otherwise unavailable, the service provider 1812 can leverage other merchants and/or sales channels that are part of the platform of the service provider 1812 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1812 can enable conversational commerce via conversational commerce services, which can use one or more machine learning mechanisms to analyze messages exchanged between two or more users 1814, voice inputs into a virtual assistant or the like, to determine intents of user(s) 1814. In some examples, the service provider 1812 can utilize determined intents to automate customer service, offer promotions, provide recommendations, or otherwise interact with customers in real-time. In at least one example, the service provider 1812 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1812 (e.g., the server computing device(s) 1802) can provide a P2P payment service, via a P2P payment platform as described herein, that enables P2P payments between two or more users 1814. In at least one example, the service provider 1812 can communicate with instances of a payment application (or other access points) installed on devices 1806 configured for operation by users, such as the customers 1820(A)-1820(N). An example of such a payment application is the mobile payment application 1828 described above, which can be installed on a customer device 1826. In an example, an instance of the payment application executing on a first device operated by a payor can send a request to the service provider 1812 to transfer an amount of funds (e.g., fiat currency or non-fiat currency such as cryptocurrency, securities, and related assets) from an account of the payor to an account of a payee (e.g., a P2P payment). In at least one example, the customer 1820(A) can be a payor and/or a payee (i.e., a user) and the payment processing platform described herein can be a payor and/or a payee on behalf of one or more merchants. The service provider 1812 can facilitate the transfer and can send a notification to an instance of the payment application executing on a second mobile device operated by the payee that the transfer is in process (or has been completed). In some examples, the service provider 1812 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1812 funds the request to payee on behalf of the payor, to speed up the transfer process and compensate for any lags that may be attributed to payor's financial network.

In some implementations, the service provider 1812 can trigger the P2P payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The P2P process can be initiated through a particular application executing on the user devices 1806 (e.g., the mobile payment application 1828).

In some embodiments, the P2P process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the P2P process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1812. For instance, the service provider 1812 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1806 (e.g., mobile device or conventional personal computer (PC)) based on instructions transmitted to and from the server computing device(s) 1802 (which, in such an example can be called a "messaging server"). In some instances, the messaging application can include a payment application with messaging capability that enables users of the payment application to communicate with one another. In such instances, the payment application can be executed on the user device 1806 based on instructions transmitted to and from the server computing device(s) 1802 (e.g., the payment service discussed in this description or another payment service that supports payment transactions).

In at least some embodiments, the P2P process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1812 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a customer 1820(A) may be new to the service provider 1812 such that the customer 1820(A) that has not registered (e.g., subscribed to receive access to one or more services offered by the service provider) with the service provider 1812. The service provider 1812 can offer onboarding services for registering a potential customer 1820(A) with the service provider 1812. In some examples, onboarding can involve presenting various questions, prompts, and the like to a potential customer 1820(A) to obtain information that can be used to generate a profile for the potential customer 1820(A). In at least one example, the service provider 1812 can provide limited or short-term access to its services prior to, or during, onboarding (e.g., a customer of a peer-to-peer payment service can transfer and/or receive funds prior to being fully onboarded, a merchant can process payments prior to being fully onboarded, etc.). In at least one example, responsive to the potential customer 1820(A) providing all necessary information, the potential customer 1820(A) can be onboarded to the service provider 1812. In such an example, any limited or short-term access to services of the service provider 1812 can be transitioned to more permissive (e.g., less limited) or longer-term access to such services.

The service provider 1812 can be associated with IDV services, which can be used by the service provider 1812 for compliance purposes and/or can be offered as a service, for instance to third-party service providers (e.g., associated with the server computing device(s) 1810). That is, the service provider 1812 can offer IDV services to verify the identity of users 1814 seeking to use or using their services. Identity verification requires a customer (or potential customer) to provide information that is used by compliance departments to prove that the information is associated with an identity of a real person or entity. In at least one example, the service provider 1812 can perform services for determining whether identifying information provided by a user 1814 accurately identifies the customer (or potential customer) (i.e., Is the customer who they say they are?).

The service provider 1812 is capable of providing additional or alternative services and the services described above are offered as a sampling of services. In at least one example, the service provider 1812 can exchange data with the server computing device(s) 1810 associated with third-party service providers. Such third-party service providers can provide information that enables the service provider 1812 to provide services, such as those described above. In additional or alternative examples, such third-party service providers can access services of the service provider 1812. That is, in some examples, the third-party service providers can be subscribers, or otherwise access, services of the service provider 1812.

Techniques described herein can be configured to operate in both real-time/online and offline modes. "Online" modes refer to modes when devices are capable of communicating with the service provider 1812 (e.g., the server computing device(s) 1802) and/or the server computing device(s) 1810 via the network(s) 1804. In some examples, the merchant device(s) 1808 are not capable of connecting with the service provider 1812 (e.g., the server computing device(s) 1802) and/or the server computing device(s) 1810, due to a network connectivity issue, for example. In additional or alternative examples, the server computing device(s) 1802 are not capable of communicating with the server computing device(s) 1810 due to network connectivity issue, for example. In such examples, devices may operate in "offline" mode where at least some payment data is stored (e.g., on the merchant device(s) 1808) and/or the server computing device(s) 1802 until connectivity is restored and the payment data can be transmitted to the server computing device(s) 1802 and/or the server computing device(s) 1810 for processing.

In at least one example, the service provider 1812 can be associated with a hub, such as an order hub, an inventory hub, a fulfillment hub and so on, which can enable integration with one or more additional service providers (e.g., associated with the additional server computing device(s) 1810). In some examples, such additional service providers can offer additional or alternative services and the service provider 1812 can provide an interface or other computer-readable instructions to integrate functionality of the service provider 1812 into the one or more additional service providers.

Techniques described herein are directed to services provided via a distributed system of user devices 1806 that are in communication with one or more server computing devices 1802 of the service provider 1812. That is, techniques described herein are directed to a specific implementation—or, a practical application—of utilizing a distributed system of user devices 1806 that are in communication with one or more server computing devices 1802 of the service provider 1812 to perform a variety of services, as described above. The unconventional configuration of the distributed system described herein enables the server computing device(s) 1802 that are remotely-located from end-users (e.g., users 1814) to intelligently offer services based on aggregated data associated with the end-users, such as the users 1814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing platforms and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1812, and those outside of the control of the service provider 1812, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing platforms and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1814 and user devices 1806. Furthermore, such features are changed dynamically based on the profiles of the users involved interacting with the GUIs. As such, techniques described herein are directed to improvements to computing systems.

Figure 19:
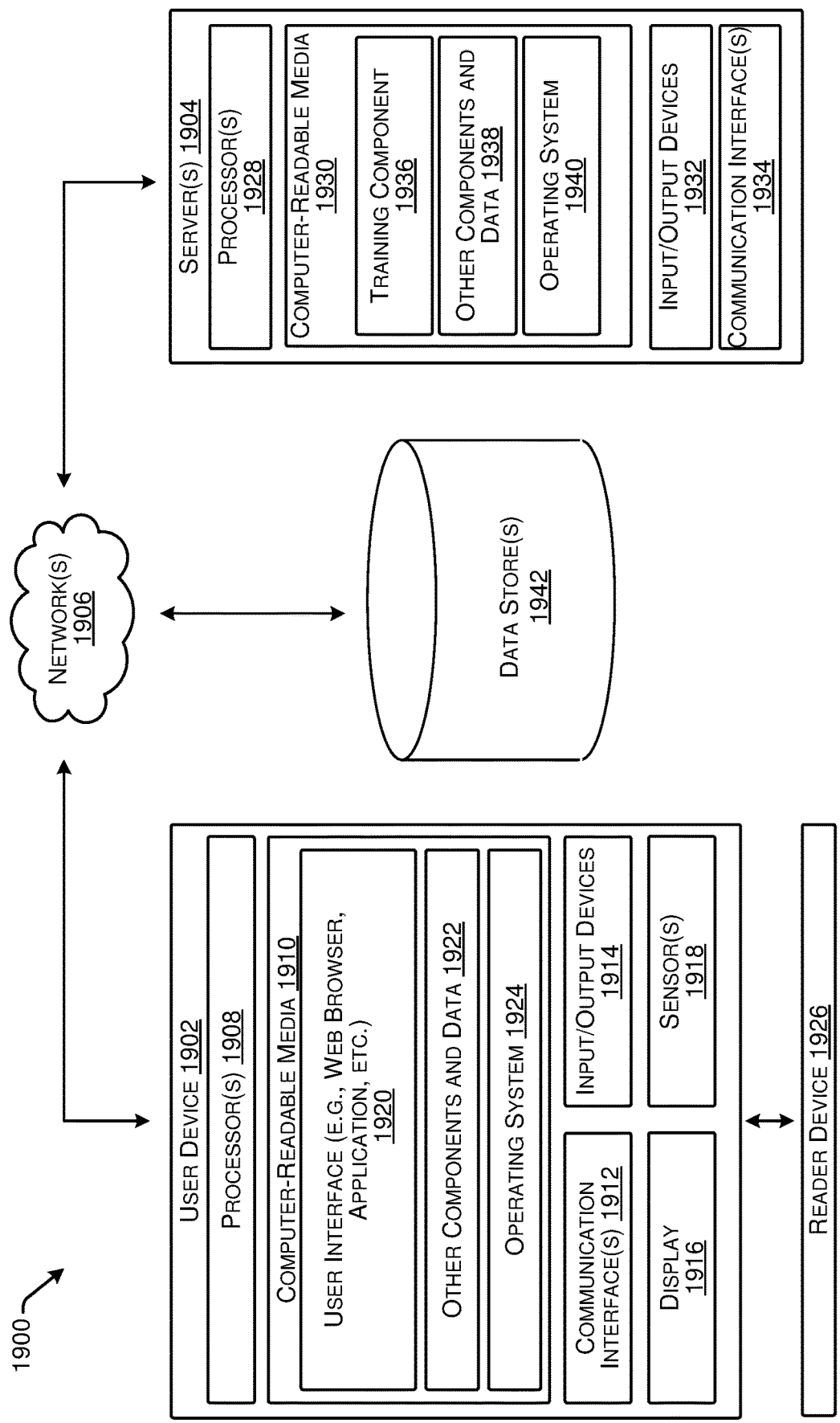
FIG. 19 illustrates additional details associated with the example environment of FIG. 18.

FIG. 19 depicts an illustrative block diagram illustrating a system 1900 for performing techniques described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 18.

In at least one example, the user computing device(s) 128 of FIG. 1 can correspond to the user device 1902. Additionally or alternatively, the user computing devices 204 and/or 206, of FIG. 2, and/or the merchant computing device 304, of FIG. 3, can correspond to the user device 1902. In at least one example, the P2P server(s) 102 and/or the payment processing server(s) 104 can correspond to the server(s) 1904. In at least one example, the network(s) 106 can correspond to the network(s) 1906.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipulate signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, modules or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other networked devices. In at least one example, the user interface 1920 can be presented via a web browser, or the like. In other examples, the user interface 1920 can be presented via an application, such as a mobile application or desktop application, which can be provided by a service provider 1812 associated with the server(s) 1904, or which can be an otherwise dedicated application. For example, the user interface 1920 can be presented via the mobile payment application 202 or the POS application 302, described above with reference to FIG. 2 or 3, respectively. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other modules and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch. In at least one example, the sensor(s) 140 can correspond to the sensor(s) 1918 described herein.

In some example, the GPS device can be used to identify a location of a user. In at least one example, the location of the user can be used by the service provider 1812, described above, to provide one or more services. That is, in some examples, the service provider 1812 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1714 and/or for sending users 1714 notifications regarding available appointments with merchant(s) located proximate to the users 1714. In at least one example, location can be used for taking payments from nearby customers when they leave a geofence, or location can be used to initiate an action responsive to users 1714 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments and/or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment processing platform and/or P2P payment platform and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more modules and/or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one module for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 196, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program modules, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the service provider 1812 and/or payment processing platform. Functional components stored in the computer-readable media 1930 can optionally include a training component 1936 and one or more other components and data 1938.

The training component 1936 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1902 and/or the server(s) 1904 for use at a time after the data models have been trained (e.g., at runtime).

The one or more other components and data 1938 can include the P2P processing component 108, the cryptocurrency management component 110, the payment processing component 114, and/or the cryptocurrency management component 116, the functionality of which is described, at least partially, above. Further, the one or more other components and data 1938 can include programs, drivers, etc., and the data used or generated by the functional components. Further, the server(s) 1904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1930 can additionally include an operating system 1940 for controlling and managing various functions of the server(s) 1904.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network (s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

In at least one example, the system 1900 can include data store(s) 1942 that can be configured to store data that is accessible, manageable, and updatable. In at least one example, the data store(s) 112, 120, and/or 400 can correspond to the data store(s) 1942. In some examples, the data store(s) 1942 can be integrated with the user device 1902 and/or the server(s) 1904. In other examples, as shown in FIG. 19, the data store(s) 1942 can be located remotely from the server(s) 1904 and can be accessible to the server(s) 1904. The data store(s) 1942 can comprise multiple databases and/or servers connected locally and/or remotely via the network(s) 1906.

In at least one example, the data store(s) 1942 can include an asset storage and/or store user account(s), merchant account(s), and/or customer account(s), as described above. In some examples, the data store(s) 1942 can store a private blockchain. In some examples, the data store(s0 142 can store additional or alternative data such as inventory data and/or catalog data. Inventory data can be stored in an inventory database, which can store data associated with a quantity of each item that a merchant has available to the merchant. Furthermore, catalog data can be stored in a catalog database, which can store data associated with items that a merchant has available for acquisition.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts or swim lane diagrams showing example processes involving techniques as described herein. The processes illustrated are described with reference to FIGS. 1-4, 18, and 19 for convenience and ease of understanding. However, the processes illustrated are not limited to being performed using components described in FIGS. 1-4, 18, and 19, and such components are not limited to performing the processes illustrated herein.

Furthermore, in some examples, the processes described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes can be combined in whole or in part with each other or with other processes.

Further, the GUIs described above are non-limiting examples of GUIs that can be presented via computing devices. In additional or alternative examples, additional or alternative content can be presented via the GUIs and/or additional or alternative configurations can be imagined. As such, the GUIs are provided for illustrative purposes and should not be construed as limiting.

Example Clauses

A. A payment processing platform configured to interact with a peer-to-peer (P2P) payment platform, the payment processing platform comprising: a point-of-sale (POS) application, executable by a POS device, provided by the payment processing platform, and configured to: present a user interface to enable a merchant to designate one or more accounts for distribution of funds received from transactions conducted via the POS application; receive, via an interaction with the user interface, a request to receive at least a first portion of the funds in cryptocurrency; send the request to receive at least the first portion of the funds in cryptocurrency to one or more server computing devices associated with the payment processing platform; generate transaction data associated with the transactions between the merchant and customers; and send the transaction data to the one or more server computing devices associated with the payment processing platform; and the one or more server computing devices associated with the payment processing platform configured to: receive, from the POS application, the request to receive at least the first portion of the funds in cryptocurrency; send, to one or more server computing devices associated with the P2P payment platform, a request for first account information associated with a cryptocurrency wallet account for the merchant; receive the first account information associated with the cryptocurrency wallet account from the one or more server computing devices associated with the P2P payment platform, wherein the P2P payment platform maintains private keys associated with the cryptocurrency wallet account on behalf of the merchant; associate, in a data store maintained by the PPS, the first account information associated with the cryptocurrency wallet account with second account information associated with a merchant account of the merchant; receive, from the POS application, the transaction data and payment authorization requests to authorize payment for the transactions using the transaction data; upon capturing the funds associated with the payment authorization requests: facilitating, via the one or more server computing devices associated with the P2P payment platform, deposit of the first portion of the funds to the cryptocurrency wallet account for the merchant; and depositing a second portion of the funds as fiat currency into the merchant account.

B. The payment processing platform of clause A, wherein the one or more server computing devices associated with the payment processing platform are further configured to: receive, from the one or more server computing devices associated with the P2P payment platform, an indication that the merchant is not associated with any cryptocurrency wallet accounts of the P2P payment platform; cause a configuration user interface to be presented via the POS application, wherein the configuration user interface requests merchant data for creating the cryptocurrency wallet account; receiving merchant data from the POS application; and sending the merchant data to the server computing devices of the P2P payment platform, wherein the first account information is received based at least in part on sending the merchant data to the server computing devices of the P2P payment platform.

C. The payment processing platform of clause A or B, wherein the POS application is further configured to: receive, via the interaction with the user interface, an indication of an amount of funds associated with the first portion of the funds; and send the indication of the amount of funds associated with the first portion of the funds to the one or more server computing devices associated with the payment processing platform.

D. The payment processing platform of any of clauses A-C, wherein the one or more server computing devices associated with the payment processing platform are further configured to determine the first portion and the second portion using a machine-trained model.

E. A method, implemented in part by one or more computing devices of a payment processing platform (PPP), comprising: receiving, by the one or more computing devices of the PPP and from a merchant having a merchant account with the PPP, a request to receive funds in cryptocurrency, wherein the funds are associated with one or more transactions conducted via point-of-sale (POS) software provided by the PPP; based at least in part on receiving the request, accessing, by the one or more computing devices of the PPP and via a payment making platform (PMP), a cryptocurrency wallet account for the merchant; associating, by the one or more computing devices of the PPP and in a data store maintained by the PPP, the merchant account with the cryptocurrency wallet account; receiving, by the one or more computing devices of the PPP and via the POS software associated with the merchant, one or more payment authorization requests associated with the one or more transactions; and causing, by the one or more computing devices of the PPP, (i) a first portion of the funds associated with the one or more payment authorization requests to be deposited as cryptocurrency into the cryptocurrency wallet account and (ii) a second portion of the funds associated with the one or more payment authorization requests to be deposited as fiat currency into the merchant account.

F. The method of clause E, wherein the PMP maintains private keys associated with the cryptocurrency wallet account on behalf of the merchant.

G. The method of clause E or F, wherein the PMP is a third-party PMP, and wherein the third-party PMP maintains private keys associated with the cryptocurrency wallet account on behalf of the merchant.

H. The method of any of clauses E-G, wherein the request to receive the funds in cryptocurrency is associated with an indication of a percentage of the funds to be received in cryptocurrency, and wherein the first portion is determined based at least in part on the percentage.

I. The method of any of clauses E-H, further comprising determining the first portion of the funds based at least in part on an output of a machine-trained model, wherein the machine-trained model is trained based at least in part on historical transaction data and historical cryptocurrency deposits associated with at least one of the merchant or other merchants associated with the PPP.

J. The method of any of clauses E-I, further comprising determining the first portion of the funds based at least in part on at least one of a current cryptocurrency price, a predicted cryptocurrency price, or merchant data associated with the merchant.

K. The method of any of clauses E-J, further comprising determining the first portion of the funds based at least in part on determining an amount of the funds to withhold from each transaction of the one or more transactions.

L. The method of any of clauses E-K, further comprising determining the first portion of the funds based at least in part on determining an amount of the funds to withhold from a batch of the one or more transactions.

M. The method of any of clauses E-L, wherein prior to causing the first portion of the funds to be deposited in the cryptocurrency wallet account, converting the first portion of the funds from fiat currency into cryptocurrency.

N. The method of any of clauses E-M, wherein prior to causing the first portion of the funds to be deposited in the cryptocurrency wallet account, sending the first portion of the funds to the PMP in fiat currency with an instruction to convert the first portion of the funds from fiat currency into cryptocurrency.

O. A system associated with a payment processing platform (PPP), the system comprising: one or more processors; and one or more non-transitory computer-readable media storing instructions that, when executed by the one or more processors, cause the system to perform operations comprising: receiving, by one or more computing devices of the PPP and from a merchant having a merchant account with the PPP, a request to receive funds in cryptocurrency, wherein the funds are associated with one or more transactions conducted via point-of-sale (POS) software provided by the PPP; based on the request, accessing, by the one or more computing devices of the PPP and via a payment making platform (PMP), a cryptocurrency wallet account for the merchant; associating, by the one or more computing devices of the PPP and in a data store maintained by the PPP, the merchant account with the cryptocurrency wallet account; receiving, by the one or more computing devices of the PPP and via the POS software associated with the merchant, one or more payment authorization requests associated with the one or more transactions; and causing, by the one or more computing devices of the PPP, (i) a first portion of the funds associated with the one or more payment authorization requests to be deposited as cryptocurrency into the cryptocurrency wallet account and (ii) a second portion of the funds associated with the one or more payment authorization requests to be deposited as fiat currency into the merchant account.

P. The system of clause O, wherein the request to receive funds in cryptocurrency is associated with a unique identifier of the merchant, and wherein the unique identifier is associated with the cryptocurrency wallet account for the merchant.

Q. The system of clause O or P, the operations further comprising determining the first portion of the funds based at least in part on at least one of a current cryptocurrency price, a predicted cryptocurrency price, or merchant data associated with the merchant.

R. The system of any of clauses O-Q, the operations further comprising determining the first portion of the funds based at least in part on determining an amount of the funds to withhold from each transaction of the one or more transactions.

S. The system of any of clauses O-R, the operations further comprising determining the first portion of the funds based at least in part on determining an amount of the funds to withhold from a batch of the one or more transactions.

T. The system of clause S, the operations further comprising determining the batch of the one or more transactions based at least in part on one or more of a time lapsed, an amount accrued, a time of day, or an indication from the merchant.

U. A peer-to-peer (P2P) payment platform configured to interact with a payment processing platform, the P2P payment platform comprising: a mobile payment application, executable by a user computing device, provided by the P2P payment platform, and configured to: receive, via a user interface, a request to generate a cryptocurrency wallet account for the user; and send, to one or more server computing devices associated with the P2P payment platform, the request to generate the cryptocurrency wallet account for the user; and the one or more server computing devices associated with the P2P payment platform configured to: receive the request to generate the cryptocurrency wallet account from the mobile payment application; generate the cryptocurrency wallet account in response to receiving the request to generate the cryptocurrency wallet account from the mobile payment application, wherein the cryptocurrency wallet account is associated with first account information, and wherein the P2P payment platform maintains private keys associated with the cryptocurrency wallet account on behalf of the user; receive, from one or more server computing devices associated with a payment processing platform and in response to an indication to allocate at least a first portion of funds generated from payment received for transactions processed by the payment processing platform to the cryptocurrency wallet account for the user, a request for the first account information associated with the cryptocurrency wallet account for the user; send the first account information associated with the cryptocurrency wallet account to the one or more server computing devices associated with the payment processing platform, wherein based at least in part on sending the first account information to the one or more server computing devices associated with the payment processing platform, the first account information is associated with second account information of a merchant account of the user; and receive, from the one or more server computing devices associated with the payment processing platform, a request to deposit the first portion of the funds into the cryptocurrency wallet account, wherein a second portion of funds is retained by the payment processing platform for deposit into the merchant account as fiat currency.

V. The P2P payment platform of clause U, wherein the cryptocurrency wallet account is associated with a unique identifier of the user, and wherein the request for the first account information is associated with the unique identifier.

W. The P2P payment platform of clause U or V, wherein the cryptocurrency wallet account is associated with a stored balance of fiat currency maintained by the P2P payment platform and, wherein the one or more server computing devices associated with the payment processing platform are further configured to receive a request to deposit a third portion of the funds into the stored balance of fiat currency as fiat currency.

X. The P2P payment platform of clause W, wherein the one or more server computing devices associated with the payment processing platform are further configured to: receive, from the mobile payment application, a request for payment to another user associated with the P2P payment platform; and transferring at least one of cryptocurrency funds associated with the cryptocurrency wallet account or fiat currency funds associated with the stored balance of fiat currency to an account of the other user.

Y. A method, implemented at least in part by one or more computing devices associated with a payment making platform (PMP), the method comprising: receiving, from one or more computing devices associated with a payment processing platform (PPP) and in response to an indication to allocate at least a first portion of funds generated from payment received for transactions processed by the PPP to a cryptocurrency wallet account for a user, a request for first account information associated with the cryptocurrency wallet account for the user; sending the first account information associated with the cryptocurrency wallet account to the one or more computing devices associated with the PPP, wherein based at least in part on sending the first account information to the one or more computing devices associated with the PPP, the first account information is associated with second account information of a merchant account of the user; and receiving, from the one or more computing devices associated with the PPP, a request to deposit a first portion of the funds into the cryptocurrency wallet account, wherein a second portion of funds is retained by the PPP for deposit into the merchant account as fiat currency.

Z. The method of clause Y, further comprising: receiving, from a mobile payment application of the user and provided by the PMP, a request to generate the cryptocurrency wallet account; and generating the cryptocurrency wallet account in response to receiving the request to generate the cryptocurrency wallet account from the mobile payment application.

AA. The method of clause Y or Z, further comprising: determining that the user is not associated with a cryptocurrency wallet account; sending, to a mobile payment application of the user and provided by the PMP, a request for information to generate the cryptocurrency wallet account; and generating the cryptocurrency wallet account based at least in part on receiving the information from the mobile payment application.

AB. The method of any of clauses Y-AA, further comprising: determining that the user is not associated with a cryptocurrency wallet account; sending, to the one or more computing devices associated with the PPP, a request for information to generate the cryptocurrency wallet account; and generating the cryptocurrency wallet account based at least in part on receiving the information from the one or more computing devices associated with the PPP.

AC. The method of any of clauses Y-AB, wherein the first portion is a percentage designated by the user via a point-of-sale application provided by the PPP.

AD. The method of any of clauses Y-AC, wherein the first portion is determined based at least in part on a current cryptocurrency price, a predicted cryptocurrency price, or user data of the user.

AE. The method of any of clauses Y-AD, wherein the cryptocurrency wallet account is associated with a unique identifier of the user, and wherein the request for the first account information is associated with the unique identifier.

AF. The method of any of clauses Y-AE, wherein the request to deposit the first portion of the funds into the cryptocurrency wallet account is associated with cryptocurrency funds as converted by the PPP.

AG. The method of any of clauses Y-AF, wherein the request to deposit the first portion of the funds into the cryptocurrency wallet account is associated with a request to convert fiat currency into cryptocurrency, the method further comprising converting the funds into cryptocurrency prior to depositing the funds into the cryptocurrency wallet account.

AH. A system associated with a payment making platform (PMP), the system comprising: one or more processors; and one or more non-transitory computer-readable media storing instructions that, when executed by the one or more processors, causes the system to perform operations comprising: receiving, from one or more computing devices associated with a payment processing platform (PPP) and in response to an indication to allocate at least a first portion of funds generated from payment received for one or more transactions processed by the PPP to a cryptocurrency wallet account for a user, a request for first account information associated with the cryptocurrency wallet account for the user; sending the first account information associated with the cryptocurrency wallet account to the one or more computing devices associated with the PPP, wherein based at least in part on sending the first account information to the one or more computing devices associated with the PPP, the first account information is associated with second account information of a merchant account of the user; and receiving, from the one or more computing devices associated with the PPP, a request to deposit a first portion of the funds into the cryptocurrency wallet account, wherein a second portion of funds is retained by the PPP for deposit into the merchant account as fiat currency.

AI. The system of clause AH, wherein the request is associated with a single transaction of the one or more transactions.

AJ. The system of clause AH or AI, wherein the request is associated with a batch of transactions of the one or more transactions.

AK. The system of any of clauses AH-AJ, wherein the cryptocurrency wallet account is associated with a unique identifier of the user, and wherein the request for the first account information is associated with the unique identifier.

AL. The system of any of clauses AH-AK, wherein the request to deposit the first portion of the funds into the cryptocurrency wallet account is associated with cryptocurrency funds as converted by the PPP.

AM. The system of any of clauses AH-AL, wherein the request to deposit the first portion of the funds into the cryptocurrency wallet account is associated with a request to convert fiat currency into cryptocurrency, the operations further comprising converting the funds into cryptocurrency prior to depositing the funds into the cryptocurrency wallet account.

AN. The system of any of clauses AH-AM, wherein the PMP maintains private keys associated with the cryptocurrency wallet account on behalf of the user.

While the clauses above are described with respect to one particular implementation, it should be understood that, in the context of this document, the content of the clauses above can also be implemented via a method, device, system, a computer-readable medium, and/or another implementation. Additionally, any of clauses A-AN may be implemented alone or in combination with any other one or more of the clauses A-AN.

The invention claimed is:

1. A payment service comprising one or more computing devices, the one or more computing devices configured to:
receive, from a user device associated with a first user, an indication of a preference of the first user associated with allocation of proceeds received by the first user in association with one or more payment authorization requests;
receive, via a payment application executing on the user device, a payment authorization request of the one or more payment authorization requests, wherein the payment authorization request is associated with one or more transactions between the first user and a second user;
determine, based at least in part on the preference of the first user, a first portion of proceeds received by the first user in association with the payment authorization request to be allocated for deposit into a cryptocurrency wallet of the first user;
determine, based at least in part on the preference of the first user, a second portion of the proceeds received by the first user in association with the one or more payment authorization request to be allocated for deposit as fiat currency into a user account of the first user; and
cause (i) the first portion of the proceeds to be deposited as cryptocurrency into the cryptocurrency wallet and (ii) the second portion of the proceeds to be deposited as fiat currency into the user account, wherein the user account is associated with the cryptocurrency wallet in a data store maintained by the payment service.

2. The payment service of claim 1, wherein determining at least one of the first portion or the second portion is further based at least in part on application of a machine-trained model.

3. The payment service of claim 2, wherein the machine-trained model is trained based at least in part on historical transaction data and historical cryptocurrency deposits associated with at least the first user.

4. The payment service of claim 1, wherein the cryptocurrency wallet of the first user is maintained at least in part by an internal ledger of the payment service separate from a public cryptocurrency blockchain.

5. The payment service of claim 1, wherein the one or more computing devices are further configured to:
prior to causing the first portion to be deposited into the cryptocurrency wallet, convert the first portion from fiat currency into cryptocurrency based at least in part on an exchange rate as determined by an external exchange.

6. The payment service of claim 1, wherein the payment service maintains private keys associated with the cryptocurrency wallet on behalf of the first user.

7. The payment service of claim 1, wherein determining at least one of the first portion or the second portion is further based at least in part on at least one of a current cryptocurrency price, a predicted cryptocurrency price, or user data associated with the first user.

8. The payment service of claim 1, wherein the preference indicates at least one of a fixed number of transactions after which to initiate a conversion of fiat currency to cryptocurrency or a particular date and time on which to initiate a conversion of fiat currency to cryptocurrency.

9. The payment service of claim 1, wherein the preference is associated with an indication of a percentage of the proceeds to be received in cryptocurrency, and wherein the first portion is determined based at least in part on the percentage.

10. A method, implemented in part by one or more computing devices of a payment service, comprising:
receiving, by the one or more computing devices from a user device associated with a first user, an indication of a preference of the first user associated with allocation of proceeds received by the first user in association with one or more payment authorization requests;
receiving, by the one or more computing devices and via a payment application executing on the user device, a payment authorization request of the one or more payment authorization requests, wherein the payment authorization request is associated with one or more transactions between the first user and a second user;
determining, by the one or more computing devices and based at least in part on the preference of the first user, a first portion of proceeds received by the first user in association with the payment authorization request to be allocated for conversion into a first asset type comprising at least one of a security, cryptocurrency, or non-fiat currency;
determining, by the one or more computing devices and based at least in part on the preference of the first user, a second portion of the proceeds received by the first user in association with the payment authorization request to be allocated for deposit as a second asset type comprising fiat currency into a user account of the first user; and
causing, by the one or more computing devices, (i) the first portion of the proceeds to be converted into the first asset type and (ii) the second portion of the proceeds to be deposited as fiat currency into the user account, wherein the first asset type is associated with an asset type account associated with the user account.

11. The method of claim 10, wherein the user account is associated with a cryptocurrency wallet in a data store maintained by the payment service, and wherein the cryptocurrency wallet is maintained at least in part by an internal ledger of the payment service separate from a public cryptocurrency blockchain.

12. The method of claim 10, wherein the first user is a merchant and the payment application comprises a point-of-sale application executing on a merchant device associated with the merchant.

13. A system associated with a payment service, the system comprising:
one or more processors; and
one or more non-transitory computer-readable media storing instructions that, when executed by the one or more processors, cause the system to perform operations comprising:
receiving, by one or more computing devices and from a user device associated with a user, an indication of a preference of the user associated with allocation of proceeds received by the user in association with one or more payment authorization requests;
receiving, by the one or more computing devices and via a payment application executing on the user device, a payment authorization request of the one or more payment authorization requests, wherein the payment authorization request is associated with one or more transactions;
determining, by the one or more computing devices and based at least in part on the preference of the user, a first portion of proceeds received by the user in association with the payment authorization request to be allocated for deposit into a first account of the user;
determining, by the one or more computing devices and based at least in part on the preference of the user, a second portion of the proceeds received by the user in association with the payment authorization request to be allocated for deposit into a second account of the user; and
causing, by the one or more computing devices, (i) the first portion of the proceeds to be deposited into the first account and (ii) the second portion of the proceeds to be deposited into the second account.

14. The system of claim 13, wherein determining at least one of the first portion or the second portion is further based at least in part on at least one of a current cryptocurrency price, a predicted cryptocurrency price, or merchant data associated with the user.

15. The system of claim 13, wherein the user is a merchant.

16. The system of claim 13, wherein at least one of the one or more transactions comprises a peer-to-peer transaction, a purchase of securities, a purchase of cryptocurrency, a commercial paper transaction, or a purchase by a customer from a merchant.

17. The system of claim 13, wherein causing the first portion to be deposited into the first account comprises causing the first portion to be deposited as cryptocurrency into a cryptocurrency wallet, and wherein the cryptocurrency wallet is maintained at least in part by an internal ledger separate from a public cryptocurrency blockchain.

18. The system of claim 13, wherein the first account is associated with a first asset class and the second account is associated with a second asset class.

19. The system of claim 13, wherein the first account is associated with at least one of cryptocurrency, securities, commercial paper, fiat currency, or non-fiat currency.

20. The system of claim 13, the operations further comprising:
   prior to causing the first portion of the proceeds to be deposited into the first account, converting, by the one or more computing devices, the first portion of the proceeds from a first currency to a second currency, wherein the second currency is associated with the first account.

\* \* \* \* \*